US005731140A

United States Patent [19]
Kamio et al.

[11] Patent Number: 5,731,140
[45] Date of Patent: Mar. 24, 1998

[54] PYRAZOLYLAZOPHENOL DYE

[75] Inventors: Takayoshi Kamio; Nobuo Seto; Hironori Hiyoshi, all of Kanagawa, Japan

[73] Assignee: Fuji Photo Film Co., Ltd., Kanagawa, Japan

[21] Appl. No.: 742,152

[22] Filed: Oct. 31, 1996

[30] Foreign Application Priority Data

Oct. 31, 1995 [JP] Japan ................... 7-305218

[51] Int. Cl.$^6$ ............................. G03C 8/10; G03C 8/20; G03C 8/22
[52] U.S. Cl. ................ 430/562; 430/203; 430/222; 430/223; 430/225; 430/226
[58] Field of Search ................... 430/223, 225, 430/562, 226, 222, 203

[56] References Cited

U.S. PATENT DOCUMENTS

| | | | |
|---|---|---|---|
| 4,301,070 | 11/1981 | Giles et al. | 260/155 |
| 4,529,692 | 7/1985 | Ono et al. | 430/223 |
| 5,021,334 | 6/1991 | Koya | 430/223 |
| 5,037,731 | 8/1991 | Vetter et al. | 430/223 |

FOREIGN PATENT DOCUMENTS

| | | |
|---|---|---|
| 0205983 | 12/1986 | European Pat. Off. . |
| 0 177 982 | 11/1988 | European Pat. Off. .......... G03C 5/54 |
| 0378174 | 7/1990 | European Pat. Off. . |
| 3408500 | 9/1984 | Germany . |

OTHER PUBLICATIONS

Chemical Abstract, vol. 102, No. 21, May 27, 1985, abstract no. 102:185004v.

*Bulletine of the Chemical Society of Japan*, vol. 66, Oct. 1993, pp. 2927–2930, *Studies on Fused Azoles: Synthesis of Several New Polyfunctionally Substituted Fused Pyrazoles*.

*Primary Examiner*—Richard L. Schilling
*Attorney, Agent, or Firm*—Sughrue, Mion, Zinn, Macpeak & Seas, PLLC

[57] ABSTRACT

A pyrazolylazophenol dye exhibiting excellent spectral characteristics and having high fastness to light, heat, air or chemicals, and a color light-sensitive material containing an image forming compound comprising the dye, which releases a magenta dye exhibiting excellent spectral characteristics and having high fastness to light, heat, air or chemicals.

7 Claims, No Drawings

PYRAZOLYLAZOPHENOL DYE

FIELD OF THE INVENTION

The present invention relates to a novel 4-(5-pyrazolylazo)phenol dye exhibiting excellent absorption characteristics and having high fastness to light, heat, air or chemicals. The present invention further relates to a color light-sensitive material comprising an image forming compound containing a novel 4-(5-pyrazolylazo)phenol dye or a precursor thereof.

BACKGROUND OF THE INVENTION

Pyrazolylazophenol dyes are partly described in *Bull. Chem. Soc. Jpn.*, 66, 2927 (1993). However, since the compounds are synthesized as a synthesis intermediate, and have bad absorption characteristics and low fastness to light, heat, air or chemicals, the compounds cannot be deemed to have functions as a dye.

On the other hand, a color diffusion transfer photographic process using an azo dye image forming compound which provides, as a result of development under a basic condition, an azo dye having diffusibility different from that of the image forming compound itself, is conventionally known. For example, as an image forming compound which releases a magenta dye, those described in JP-A-49-114424, JP-A-50-115528, JP-A-55-4028, JP-A-61-273542, JP-A-4-331954, and U.S. Pat. Nos. 3,932,380 and 3,931,144 are known.

However, the compounds described in these prior documents provides the dyes which are insufficient in spectral characteristics so as to cause a problem in color reproduction and is low in the fastness to light, heat, air or chemicals, and there has been no desirable compound which satisfies all of the requirements. Therefore, there has been great demand to improve the characteristics of such a compound.

SUMMARY OF THE INVENTION

An object of the present invention is to provide a magenta dye exhibiting excellent spectral characteristics and having high fastness to light, heat, air or chemicals. Another object of the present invention is provide a color light-sensitive material containing an image forming compound which releases a magenta dye exhibiting excellent spectral characteristics and having high fastness to light, heat, air or chemicals.

As a result of extensive investigations, the present inventors have found that the 4-(5-pyrazolylazo)phenol dye represented by the following formula (1) can effectively achieve the above-described objects and overcome the drawbacks of the prior art.

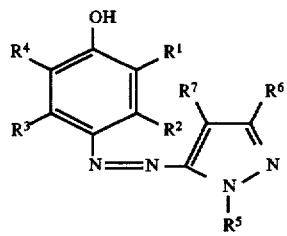

(1)

wherein $R^1$, $R^2$, $R^3$ and $R^4$ each independently represents a hydrogen atom, a cyano group, a carboxyl group, a sulfo group, a nitro group, a halogen atom, an alkyl group, an aryl group, a heterocyclic group, an acyl group, a sulfonyl group, an alkoxy group, an aryloxy group, a heterocyclic oxy group, a silyloxy group, an alkylthio group, an arylthio group, a heterocyclic thio group, a carbamoyl group, a sulfamoyl group, an acylamino group, a sulfonylamino group, an alkoxycarbonylamino group, an aryloxycarbonylamino group, an alkoxycarbonyloxy group, a ureido group, a carbamoyloxy group, a sulfamoylamino group, an amino group, an alkoxycarbonyl group, an aryloxycarbonyl group, an acyloxy group, an aryloxycarbonyloxy group or a sulfonyloxy group; $R^3$ and $R^4$ may be combined to form a ring structure; $R^5$ represents a hydrogen atom, an alkyl group, an aryl group or a heterocyclic group; $R^6$ represents a group defined for $R^5$, a cyano group or an alkylthio group; and $R^7$ represents a cyano group, a nitro group, an alkoxycarbonyl group or a carbamoyl group. The above-described substituent may further be substituted by a substituent.

The present inventors have further found that the color light-sensitive material comprising a support having thereon at least one image forming compound represented by the following formula (2) can satisfactorily overcome the drawbacks of prior art and effectively achieve the above-described objects.

$$(\text{Dye-X})_q\text{—Y} \qquad (2)$$

wherein Dye represents a dye moiety containing one or more 4-(5-pyrazolylazo)phenol dyes represented by formula (1) or precursors thereof; X represents a mere bond or linking group which is dissociated corresponding to or inversely corresponding to the development of the color light-sensitive material, Y represents a group having a property of causing difference in the diffusibility of dye components corresponding to or inversely corresponding to the reaction of a light-sensitive silver salt having imagewise a latent image; Dye bonds to X at the position of at least one of $R^1$, $R^2$, $R^3$, $R^4$, $R^5$ and $R^6$ in formula (1); q represents 1 or 2; and when q is 2, the Dye-X groups may be the same or different.

DETAILED DESCRIPTION OF THE INVENTION

Formula (1) is described in detail below.

In the formula, $R^1$, $R^2$, $R^3$, and $R^4$ each represents a hydrogen atom, a cyano group, a carboxyl group, a sulfo group, a nitro group, a halogen atom (e.g., fluorine, chlorine, bromine, iodine), an alkyl group (an alkyl group having 12 or less, preferably 8 or less carbon atoms, which may be substituted, e.g., methyl, trifluoromethyl, benzyl, dimethylaminomethyl, ethoxycarbonylmethyl, acetylaminomethyl, ethyl, carboxyethyl, allyl, n-propyl, iso-propyl, n-butyl, t-butyl, t-pentyl, cyclopentyl, n-hexyl, t-hexyl, cyclohexyl, t-octyl, n-decyl, n-undecyl, n-dodecyl), an aryl group (an aryl group having 18 or less, preferably 10 or less carbon atoms, which may be substituted, e.g., phenyl, naphthyl, 3-hydroxyphenyl, 3-chlorophenyl, 4-acetylaminophenyl, 2-methanesulfonylphenyl, 4-methoxyphenyl, 4-methanesulfonylphenyl, 2,4-dimethylphenyl), a heterocyclic group (a heterocyclic residue having 18 or less, preferably 10 or less carbon atoms, which may be substituted, e.g., 1-imidazolyl, 2-furyl, 2-pyridyl, 3-pyridyl, 3,5-dicyano-2-pyridyl, 5-tetrazolyl, 5-phenyl-1-tetrazolyl, 2-benzothiazolyl, 2-benzimidazolyl, 2-benzoxazolyl, 2-oxazolin-2-yl, morpholino), an acyl group (an acyl group having 12 or less, preferably 8 or less carbon atoms, which may be substituted, e.g., acetyl, propionyl, butyroyl, iso-butyroyl, 2,2-dimethylpropionyl, benzoyl, 3,4-dichlorobenzoyl, 3-acetylamino-4-methoxybenzoyl, 4-methylbenzoyl), a sulfonyl group (a sulfonyl group having 12 or less, preferably 8 or less carbon atoms, which may be substituted, e.g., methanesulfonyl, ethanesulfonyl, chloromethanesulfonyl, propanesulfonyl, butanesulfonyl, n-octanesulfonyl, n-dodecanesulfonyl, benzenesulfonyl, 4-methylphenylsulfonyl), an alkoxy group (an alkoxy group having 12 or less, preferably 8 or less carbon atoms, which may be substituted, e.g., methoxy, ethoxy, n-propyloxy, isopropyloxy, cyclohexylmethoxy), an aryloxy or heteocyclic oxy group (an aryloxy or heterocyclic oxy group having 18 or less, preferably 10 or less carbon atoms, which may be substituted, e.g., phenoxy, naphthyloxy, 4-acetylaminophenoxy, pyrimidin-2-yloxy, 2-pyridyloxy), a silyloxy group (a silyloxy group having 10 or less, preferably 7 or less carbon toms, which may be substituted, e.g., trimethylsilyloxy, tert-butyldimethylsilyloxy), an alkylthio group (an alkylthio group having 12 or less, preferably 8 or less carbon atoms, which may be substituted, e.g., methylthio, ethylthio, n-butylthio, n-octylthio, t-octylthio, ethoxycarbonylmethylthio, benzylthio, 2-hydroxyethylthio), an arylthio or heterocyclic thio group (an arylthio or heterocyclic thio group having 18 or less, preferably 10 or less carbon atoms, which may be substituted, e.g., phenylthio, 4-chlorophenylthio, 2-n-butoxy-5-t-octylphenylthio, 4-nitrophenylthio, 2-nitrophenylthio, 4-acetylaminophenylthio, 1-phenyl-5-tetrazolylthio, 5-methanesulfonylbenzothiazol-2-yl), a carbamoyl group (a carbamoyl group having 12 or less, preferably 8 or less carbon atoms, which may be substituted, e.g., carbamoyl, methylcarbamoyl, dimethylcarbamoyl, bis(2-methoxyethyl) carbamoyl, diethylcarbamoyl, cyclohexylcarbamoyl, di-n-octylcarbamoyl), a sulfamoyl group (a sulfamoyl group having 12 or less, preferably 8 or less carbon atoms, which may be substituted, e.g., sulfamoyl, methylsulfamoyl, dimethylsulfamoyl, bis(2-methoxyethyl)sulfamoyl, diethylsulfamoyl, di-n-butylsulfamoyl, methyl-n-octylsulfamoyl, 3-ethoxypropylmethylsulfamoyl, N-phenyl-N-methylsulfamoyl), an acylamino group (an acylamino group having 12 or less, preferably 8 or less carbon atoms, which may be substituted, e.g., acetylamino, 2-carboxybenzoylamino, 3-nitrobenzoylamino, 3-diethylaminopropanoylamino, acryloylamino), a sulfonylamino group (a sulfonylamino group having 12 or less, preferably 8 or less carbon atoms, which may be substituted, e.g., methanesulfonylamino, benzenesulfonylamino, 2-methoxy-5-n-methylbenzenesulfonylamino), an alkoxycarbonylamino group (an alkoxycarbonylamino group having 12 or less, preferably 8 or less carbon atoms, which may be substituted, e.g., methoxycarbonylamino, ethoxycarbonylamino, 2-methoxyethoxycarbonylamino, isobutoxycarbonylamino, benzyloxycarbonylamino, t-butoxycarbonylamino, 2-cyanoethoxycarbonylamino), an alkoxycarbonyloxy group (an alkoxycarbonyloxy group having 12 or less, preferably 8 or less carbon atoms, which may be substituted, e.g., methoxycarbonyloxy, ethoxycarbonyloxy, methoxyethoxycarbonyloxy), an aryloxycarbonylamino group (an aryloxycarbonylamino group having 12 or less, preferably 8 or less carbon atoms, which may be substituted, e.g., phenoxycarbonylamino, 2,4-nitrophenoxycarbonylamino, 4-t-butoxyphenoxycarbonylamino), a ureido group (a ureido group having 12 or less, preferably 8 or less carbon atoms, which may be substituted, e.g., methylaminocarbonylamino, morpholinocarbonylamino, diethylaminocarbonylamino, N-ethyl-N-phenylaminocarbonylamino, 4-cyanophenylaminocarbonylamino, 4-methanesulfonylaminocarbonylamino), a carbamoyloxy group (a carbamoyloxy group having 12 or less, preferably 8 or less carbon atoms, which may be substituted, e.g., dimethylaminocarbonyloxy, pyrrolidinocarbonyloxy), a sulfamoylamino group (a sulfamoylamino group having 12 or less, preferably 8 or less carbon atoms, which may be substituted, e.g., diethylaminosulfonylamino, di-n-butylaminosulfonylamino, phenylaminosulfonylamino), an amino group (an amino group having 12 or less, preferably 8 or less carbon atoms, which may be substituted, e.g., amino, methylamino, dimethylamino, ethylamino, ethyl-3-carboxypropylamino, ethyl-2-sulfoethylamino, phenylamino, methylphenylamino, methyloctylamino), an alkoxycarbonyl group (an alkoxycarbonyl group having 10 or less, preferably 6 or less carbon atoms, which may be substituted, e.g., methoxycarbonyl, ethoxycarbonyl, methoxyethoxycarbonyl), an aryloxycarbonyl group (an aryloxycarbonyl group having 15 or less, preferably 10 or less carbon atoms, which may be substituted, e.g., phenoxycarbonyl, p-methoxyphenoxycarbonyl), an acyloxy group (an acyloxy group having 12 or less, preferably 8 or less carbon atoms, which may be substituted, e.g., acetoxy, benzoyloxy, 2-butenoyloxy, 2-methylpropanoyloxy), an aryloxycarbonyloxy group (an aryloxycarbonyloxy group having 12 or less, preferably 8 or less carbon atoms, which may be substituted, e.g., phenoxycarbonyloxy, 3-cyanophenoxycarbonyloxy, 4-acetoxyphenoxycarbonyloxy, 4-t-butoxycarbonylaminophenoxycarbonyloxy) or a sulfonyloxy group (a sulfonyloxy group having 12 or less, preferably 8 or less carbon atoms, which may be substituted, e.g., phenylsulfonyloxy, methanesulfonyloxy, chloromethanesulfonyloxy, 4-chlorophenylsulfonyloxy, dodecylsulfonyloxy).

Among these, preferred are a hydrogen atom, a halogen atom, an alkyl group, a cyano group, an alkoxy group, an acylamino group, a ureido group, an alkoxycarbonylamino group, a sulfamoyl group, a carbamoyl group and an alkoxycarbonyl group.

$R^5$ represents a hydrogen atom, an alkyl group (an alkyl group having 12 or less, preferably 8 or less carbon atoms, which may be substituted, e.g., methyl, trifluoromethyl, acetylaminomethyl, ethyl, carboxyethyl, allyl, n-propyl, isopropyl, n-butyl, t-butyl, t-pentyl, cyclopentyl, n-hexyl, t-hexyl, cyclohexyl, t-octyl, n-decyl), an aryl group (an aryl group having 18 or less, preferably 10 or less carbon atoms, which may be substituted, e.g., phenyl, naphthyl, 3-hydroxyphenyl, 3-chlorophenyl, 4-acetylaminophenyl, 2-methanesulfonylphenyl, 4-methoxyphenyl, 2,4-dimethylphenyl) or a heterocyclic group (a heterocyclic group having 18 or less, preferably 10 or less carbon atoms, which may be substituted, e.g., 1-imidazolyl, 2-furyl, 2-pyridyl, 2-thienyl).

Among these, preferred are an alkyl group and a phenyl group.

$R^6$ represents a group defined for $R^5$ (namely, a hydrogen atom, an alkyl group, an aryl group or a heterocyclic group), a cyano group or an alkylthio group (an alkylthio group having 12 or less, preferably 8 or less carbon atoms, e.g., methylthio, ethylthio, n-butylthio, benzylthio).

Among these, preferred are a hydrogen atom and an alkyl group.

$R^7$ represents a cyano group, a nitro group, an alkoxycarbonyl group (an alkoxycarbonyl group having 10 or less, preferably 6 or less carbon atoms, which may be substituted, e.g., methoxycarbonyl, ethoxycarbonyl, methoxyethoxycarbonyl), a carbamoyl group (a carbamoyl group having 12 or less, preferably 8 or less carbon atoms, which may be substituted, e.g., carbamoyl, methylcarbamoyl, dimethylcarbamoyl, ethylcarbamoyl, phenylcarbamoyl).

Among these, preferred is a cyano group.

The dye where $R^3$ and $R^4$ are combined to each other to form a ring structure, is represented by the following formula (3) or (4):

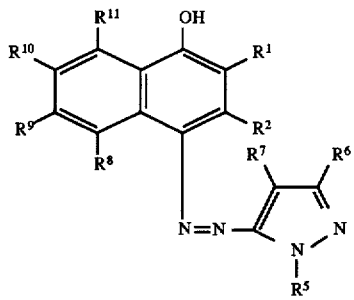
(3)

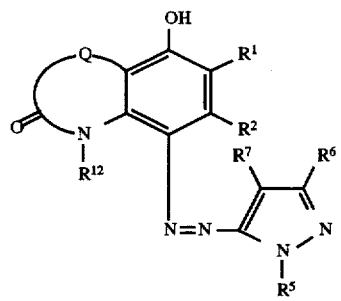
(4)

wherein $R^1$, $R^2$, $R^5$, $R^6$ and $R^7$ have the same meanings as defined in formula (1); $R^8$, $R^9$, $R^{10}$ and $R^{11}$ have the same meaning as defined for $R^1$ in formula (1); $R^{12}$ represents a hydrogen atom or an alkyl group (having 12 or less carbon atoms); and Q represents an atomic group necessary for forming a 5-, 6- or 7-membered ring.

A preferred embodiment of the dye represented by formula (3) is as follows:

$R^1$ is a hydrogen atom, an acylamino group (having from 2 to 12 carbon atoms), a sulfamoyl group (having from 1 to 12 carbon atoms), a carbamoyl group (having from 2 to 12 carbon atoms) or a sulfonylamino group (having from 1 to 12 carbon atoms); $R^2$ is a hydrogen atom; $R^8$ and $R^{11}$ each is a hydrogen atom, a sulfonylamino group (having from 1 to 12 carbon atoms), an acylamino group (having from 2 to 12 carbon atoms), an alkoxycarbonylamino group (having from 2 to 12 carbon atoms); $R^9$ and $R^{10}$ each is a hydrogen atom; and $R^5$, $R^6$ and $R^7$ each is a group the same as the preferred substituent described in formula (1).

A preferred embodiment of the dye represented by formula (4) is as follows:

$R^1$ is a hydrogen atom, an acylamino group (having from 2 to 12 carbon atoms); $R^2$ is a hydrogen atom; $R^{12}$ is a hydrogen atom; Q is —C($R^{13}$)($R^{14}$)— or —C($R^{13}$)($R^{14}$)—C($R^{15}$)($R^{16}$)— wherein $R^{13}$, $R^{14}$, $R^{15}$ and $R^{16}$ each represents a hydrogen atom or an alkyl group (having from 1 to 6 carbon atoms).

When the dye of the present invention is used in a diffusion transfer image formation process, the dye is used as an image forming compound represented by the following formula:

$$(\text{Dye-X})_q\text{—Y} \quad (2)$$

In formula (2), Dye represents a dye moiety containing one or more 4-(5-pyrazolylazo)phenol dyes represented by formula (1) or precursors thereof; X represents a mere bond or linking group which is dissociated corresponding to or inversely corresponding to the development of the color light-sensitive material; Y represents a group having a property of causing difference in the diffusibility of dye components corresponding to or inversely corresponding to the reaction of a light-sensitive silver salt having imagewise a latent image; Dye bonds to X at the position of at least one of $R^1$, $R^2$, $R^3$, $R^4$, $R^5$ and $R^6$ in formula (1) of claim 1.

q represents 1 or 2, and when q is 2, the Dye-X groups may be the same or different.

The compound represented by formula (2) is described in detail below.

q is 1 or 2, and when q is 2, the Dye-X groups may be the same or different. q is preferably 1. Dye bonds to X at the position of at least one of $R^1$, $R^2$, $R^3$, $R^4$, $R^5$ and $R^6$ in formula (1).

Examples of the precursor of the dye represented by Dye include a dye temporarily shifted in absorption, and specific examples thereof are described in U.S. Pat. Nos. 4,310,612 and 3,579,334 and JP-A-57-158638.

X may basically bond to any site of the Dye moiety. Representative examples of the linking group represented by X include a group represented by —N($R^{17}$)— (wherein $R^{17}$ represents a hydrogen atom, an alkyl group or a substituted alkyl group), —SO$_2$—, —CO—, an alkylene group, a substituted alkylene group, a phenylene group, a substituted phenylene group, a naphthylene group, a substituted naphthylene group, —O—, —SO— and a group obtained by combining two or more divalent residues of these groups. Among these, preferred are a group represented by —NR$^{17}$—SO$_2$—, a group represented by —NR$^{17}$—CO— and a group represented by —R$^{18}$—(L)$_k$—(R$^{19}$)$_p$—, wherein $R^{18}$ and $R^{19}$ each represents an alkylene group, a substituted alkylene group, a phenylene group, a substituted phenylene group, a naphthylene group or a substituted naphthylene group; L represents —O—, —CO—, —SO—, —SO$_2$—, —SO$_2$NH—, —NHSO$_2$—, —CONH— or —NHCO—; k represents 0 or 1; and p represents 1 or 0.

A combination of —NR$^{17}$—SO$_2$— or —NR$^{17}$—CO— with —R$^{18}$—(L)$_k$—(R$^{19}$)$_p$— is also preferred.

The Dye moiety and the Y moiety are preferably bonded in the form of Dye-SO$_2$NH—Y.

Y is described below.

Y represents a group having properties of breaking the Y—X bond corresponding to or inversely corresponding to the light-sensitive silver halide having a latent image. Such a group is known in the field of photographic chemistry using diffusion transfer of a dye and examples thereof are described in U.S. Pat. No. 5,021,334 (corresponding to JP-A-2-184852).

Y is described in detail. The formulae are described including X.

(1) First, Y includes a negative acting releaser which releases a photographically useful group corresponding to development.

Known examples of Y classified in the negative acting releaser include a group of releasers which each releases a photographically useful group from an oxidation product.

Y of this type is preferably represented by the following formula (Y-1).

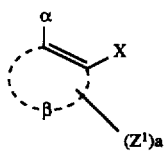

(Y-1)

wherein β represents a nonmetallic atom group necessary for forming a benzene ring, the benzene ring may be condensed with a saturated or unsaturated carbon ring or heterocyclic ring; α represents —OZ² or —NHZ³, wherein Z² represents a hydrogen atom or a group which generates a hydroxyl group by hydrolysis; and Z³ represents a hydrogen atom, an alkyl group, an aryl group or a group which generates an amino group by hydrolysis; Z¹ represents an alkyl group, an aryl group, an aralkyl group, an alkoxy group, an alkylthio group, an aryloxy group, an arylthio group, an acyl group, a sulfonyl group, an acylamino group, a sulfonylamino group, a carbamoyl group, a sulfamoyl group, a ureido group, a urethane group, a heterocyclic group, which groups each may have a substituent, a cyano group or a halogen group; The symbol a represents a positive integer; and when two or more Z¹ groups are present, they may be the same or different. In formula (Y-1), —X is a group represented by —NHSO₂Z⁴, wherein Z⁴ represents a divalent group.

Among the groups represented by formula (Y-1), preferred are represented by formula (Y-2) or (Y-3).

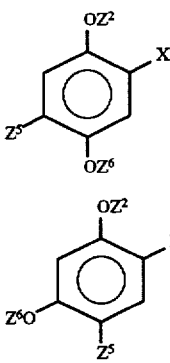

wherein Z² and X each has the same meaning as defined in formula (Y-1); and Z⁵ and Z⁶ each represents an alkyl group, an aryl group or an aralkyl group, which groups each may have a substituent.

More preferably, Z⁵ is a secondary or tertiary alkyl group and the total carbon number of Z⁵ and Z⁶ is from 20 to 50.

Specific examples thereof include those described in U.S. Pat. Nos. 4,055,428 and 4,336,322, JP-A-51-113624, JP-A-16131, JP-A-56-71061, JP-A-56-71060, JP-A-56-71072, JP-A-56-73057, JP-A-57-650, JP-A-57-4043, JP-A-59-60439, JP-B-56-17656 and JP-B-60-25780.

Another example of Y is a group represented by formula (Y-4).

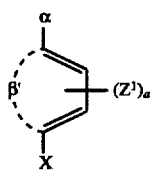

wherein α, X, Z¹ and the symbol a each has the same meaning as defined in formula (Y-1); and β' represents a nonmetallic atom group necessary for forming a benzene ring, and the benzene ring may be condensed with a saturated or unsaturated carbon ring or heterocyclic ring.

Among the groups represented by formula (Y-4), preferred are those where α is —OZ² and β' forms a naphthalene skeleton. Specific examples thereof include those described in U.S. Pat. Nos. 3,928,312 and 4,135,929.

Examples of the releaser which releases a photographically useful group by the same reaction as in the case of formula (Y-1) or (Y-2), include the groups described in JP-A-51-104343, JP-A-53-46730, JP-A-54-130122, JP-A-57-85055, JP-A-53-3819, JP-A-54-48534, JP-A-49-64436, JP-A-57-20735, JP-B-48-32129, JP-B-48-39165 and U.S. Pat. No. 3,443,934.

The compound which releases a photographically useful group from an oxidation product in a different mechanism, includes hydroquinone derivatives represented by formulae (Y-5) and (Y-6).

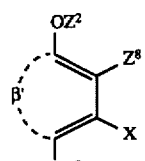

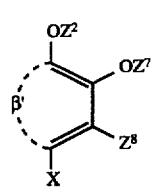

wherein β' has the same meaning as defined in formula (Y-4); Z² has the same meaning as defined in formula (Y-1); Z⁷ has the same meaning as Z²; Z⁸ represents a substituent described for Z¹ or a hydrogen atom; and Z² and Z⁷ may be the same or different. Specific examples of the compound are described in U.S. Pat. No. 3,725,062.

The above-described hydroquinone derivative releaser may have a nucleophilic group in the molecule. Specific examples thereof are described in JP-A-4-97347.

Other examples of Y include p-hydroxydiphenylamine derivatives described in U.S. Pat. No. 3,443,939 and hydrazine derivatives described in U.S. Pat. Nos. 3,844,785 and 4,684,604, and Research Disclosure, No. 128, page 22.

The negative acting releaser further includes those represented by the following formula (Y-7).

Coup-X   (Y-7)

wherein Coup represents a group of coupling with an oxidation product of a p-phenylenediamine or a p-aminophenol, namely, a group known as a photographic coupler. Specific examples thereof include those described in British Patent 1,330,524.

(2) Next, as Y of another type, a positive acting releaser which releases a photographically useful group inversely corresponding to development is described.

The positive acting releaser includes releasers which each exerts functions upon reduction at the time of processing. Preferred examples of Y of this type include those represented by the following formula (Y-8).

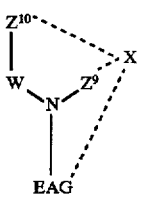

(Y-8)

wherein EAG represents a group of accepting an electron from a reducing substance; N represents a nitrogen atom; W represents an oxygen atom, a sulfur atom or —NZ$^{11}$—, wherein the N—W bond is cleaved when EAG accepts an electron and Z$^{11}$ represents an alkyl group or an aryl group; Z$^9$ and Z$^{10}$ each represents a mere bond or a substituent other than a hydrogen atom; the solid line indicates that the groups are bonded; and the dashed line indicates that at least one pair is bonded.

Among the groups represents by formula (Y-8), preferred are those represented by formula (Y-9).

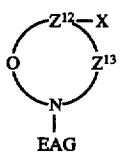

(Y-9)

wherein O represents an oxygen atom (namely, W in formula (Y-8) is an oxygen atom); Z$^{12}$ represents an atomic group having properties such that a heterocyclic ring containing the N—O bond is formed and subsequent to the cleavage of the N—O bond, the Z$^{12}$—X bond is broken; Z$^{12}$ may have a substituent or may be condensed with a saturated or unsaturated ring; and Z$^{13}$ represents —CO— or —SO$_2$—.

Among the groups represented by formula (Y-9), more preferred are those represented by formula (Y-10).

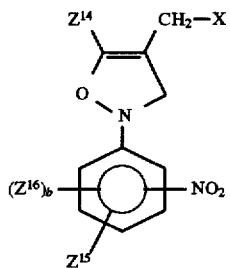

(Y-10)

wherein Z$^{14}$ represents an alkyl group, an aryl group or an aralkyl group; Z$^{15}$ represents a carbamoyl group or a sulfamoyl group; Z$^{16}$ represents an alkyl group, an aryl group, an aralkyl group, an alkoxy group, an alkylthio group, an aryloxy group, an arylthio group, a halogen atom, a cyano group or a nitro group; the symbol b represents an integer of from 0 to 3; and the substitution site of the nitro group in the formula is the ortho- or para-position to the nitrogen atom.

Most preferred are those where Z$^{15}$ is a carbamoyl or sulfamoyl group substituted by an alkyl group having from 12 to 30 carbon atoms.

Specific examples of Y of this type are described in JP-A-62-215270 and U.S. Pat. No. 4,783,396.

Other examples of the positive acting releaser which exerts functions upon reduction, include BEND compounds described in U.S. Pat. Nos. 4,139,379 and 4,139,389. Carquin compounds described in British Patent 11,445 and releasers described in JP-A-54-126535 and JP-A-57-84453.

When the releaser to be reduced as represented by Y of formula (Y-8) is used, a reducing agent is used in combination, however, an LDA compound containing a reducing group in the same molecule may also be used. This is described in U.S. Pat. No. 4,551,423.

The positive acting releaser also includes those which are incorporated into a light-sensitive material as a reducing agent and deactivated upon oxidation at the time of processing.

Examples of the releaser of this type include Fields compounds described in JP-A-51-63618 and U.S. Pat. No. 3,980,479 and Hinshaw compounds described in JP-A-49-111628, JP-A-52-4819 and U.S. Pat. No. 4,199,354.

Examples of Y of this type also include a group represented by formula (Y-11).

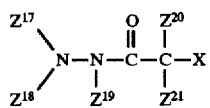

(Y-11)

wherein Z$^{17}$ and Z$^{19}$ each represents a hydrogen atom, a substituted or unsubstituted acyl, alkoxycarbonyl or aryloxycarbonyl group; Z$^{18}$ represents an alkyl group, an aryl group, an aralkyl group, an acyl group, an alkoxycarbonyl group, an aryloxycarbonyl group, a carbamoyl group, a sulfonyl group or a sulfamoyl group; Z$^{20}$ and Z$^{21}$ each represents a hydrogen atom, a substituted or unsubstituted alkyl, aryl or aralkyl group. Specific examples of the group include those described in JP-A-62-245270 and JP-A-63-46450.

The positive acting releaser having a different mechanism includes a thiazolidine type releaser. Specific examples thereof are described in U.S. Pat. No. 4,468,451 and JP-A-7-159962.

Specific examples of the dye represented by formula (1) for use in the present invention are described below, however, the present invention is by no means limited thereto.

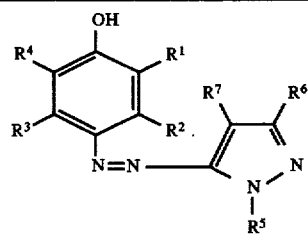

| Dye No. | R$^1$ | R$^2$ | R$^3$ | R$^4$ | R$^5$ | R$^6$ | R$^7$ |
|---|---|---|---|---|---|---|---|
| 1 | Cl | H | Cl | H | Ph | H | CN |
| 2 | " | " | " | " | " | CH$_3$ | " |

-continued

| | | | | | | | | |
|---|---|---|---|---|---|---|---|---|
| 3 | " | Cl | " | Cl | " | | " | " |
| 4 | " | H | H | " | (p-methoxyphenyl) | | " | |
| 5 | " | " | " | " | (2,5-dichloro-4-sulfamoylphenyl) | | H | |
| 6 | " | " | " | " | (2-chloro-5-sulfamoylphenyl) | | " | |
| 7 | " | " | " | " | $CH_3$ | | $CH_3$ | |
| 8 | " | " | " | " | Ph | | $t$-$C_4H_9$ | |
| 9 | " | " | " | " | $-CH_2CONHCH_3$ | | " | |
| 10 | " | " | " | " | $-CH_2CH_2OH$ | | Ph | |
| 11 | Br | H | H | H | Ph | | H | CN |
| 12 | Cl | " | Cl | " | " | | " | " |
| 13 | $-OCH_3$ | " | H | $-OCH_3$ | " | | " | " |
| 14 | F | " | F | H | " | | $CH_3$ | " |
| 15 | $-NHCOCH_3$ | " | $-NHCOCH_3$ | " | " | | " | " |
| 16 | " | " | $CH_3$ | Cl | (p-tolyl) | | " | " |
| 17 | $-NHCOCF_3$ | " | " | " | " | | " | " |
| 18 | $-NHCOPh$ | " | " | " | $n$-$C_4H_9$ | | $t$-$C_4H_9$ | " |
| 19 | $-NHCOC_{12}H_{25}$ | " | " | " | " | | " | " |
| 20 | $-NHCONHCH_3$ | " | " | " | $CH_3$ | | Ph | " |
| 21 | $-CONH$-Ph | H | H | $-NHCOCH_3$ | Ph | | H | CN |
| 22 | $-CONH-C_4H_9$ | " | " | " | " | | " | " |
| 23 | $-CONHC_{12}H_{25}$ | " | " | H | " | | $C_2H_5$ | " |
| 24 | Ph | " | " | Ph | Ph | | " | " |
| 25 | $-COOC_2H_5$ | " | " | " | " | | $-SCH_3$ | " |
| 26 | $-CONHPh$ | " | $CH_3$ | H | " | | " | " |
| 27 | Cl | " | Cl | " | " | | $-CN$ | " |
| 28 | $OCH_3$ | " | $CH_3$ | $OCH_3$ | " | | H | $-COOC_2H_5$ |
| 29 | $-NHCOCH_3$ | " | " | $-NHCOCH_3$ | " | | " | $-CONHC_2H_5$ |
| 30 | CN | " | H | " | " | | $CH_3$ | $-NO_2$ |

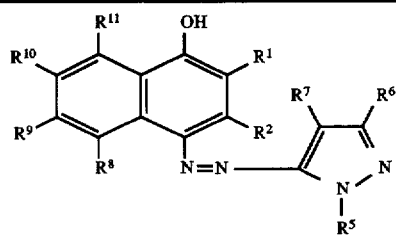

| Dye No. | $R^1$ | $R^2$ | $R^8$ | $R^9$ | $R^{10}$ | $R^{11}$ | $R^5$ | $R^6$ | $R^7$ |
|---|---|---|---|---|---|---|---|---|---|
| 31 | H | H | $-NHSO_2CH_3$ | H | H | H | Ph | $t$-$C_4H_9$ | CN |

-continued

| | | | | | | | | |
|---|---|---|---|---|---|---|---|---|
| 32 | —CONHC$_4$H$_9$ | " | " | " | " | " | —C$_4$H$_9$ | " | —COOC$_2$H$_5$ |
| 33 | " | " | —NHCOOC$_4$H$_9$ | " | " | " | CH$_3$ | " | —CONHC$_2$H$_5$ |
| 34 | " | " | " | " | " | " | (4-methoxyphenyl) | H | " |
| 35 | —CONHC$_{12}$H$_{25}$ | " | —NHSO$_2$CH$_3$ | " | " | " | " | CH$_3$ | " |

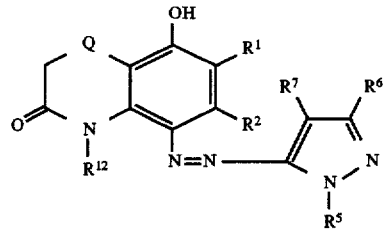

| Dye No. | R$^1$ | R$^2$ | R$^{12}$ | Q | R$^5$ | R$^6$ | R$^7$ |
|---|---|---|---|---|---|---|---|
| 36 | —NHCOC$_4$H$_9$(t) | H | CH$_3$ | —C(CH$_3$)$_2$— | Ph | H | CN |
| 37 | " | " | H | " | " | CH$_3$ | " |
| 38 | " | " | " | —CH$_2$—C(CH$_3$)$_2$— | CH$_3$ | " | —COOC$_2$H$_5$ |
| 39 | —CONHC$_4$H$_9$ | " | " | —C(CH$_3$)$_2$— | Ph | H | CN |
| 40 | " | " | " | " | " | " | " |

Specific examples of the image forming compound represented by formula (2) for use in the present invention are set forth below, however, the present invention is by no means limited thereto.

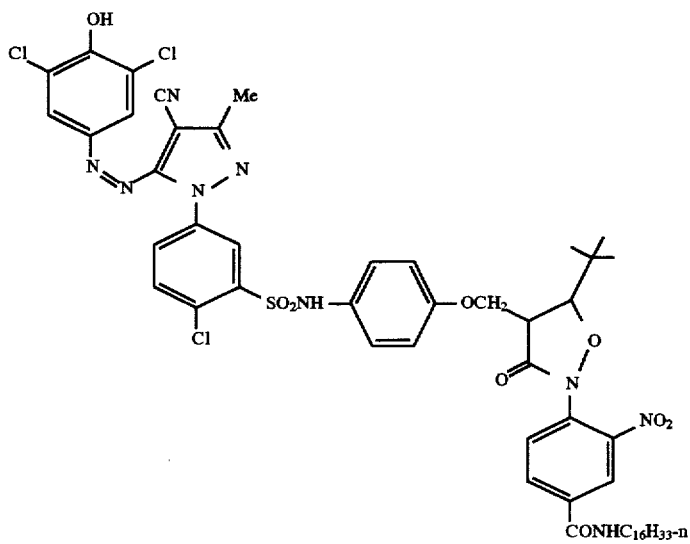

41

42
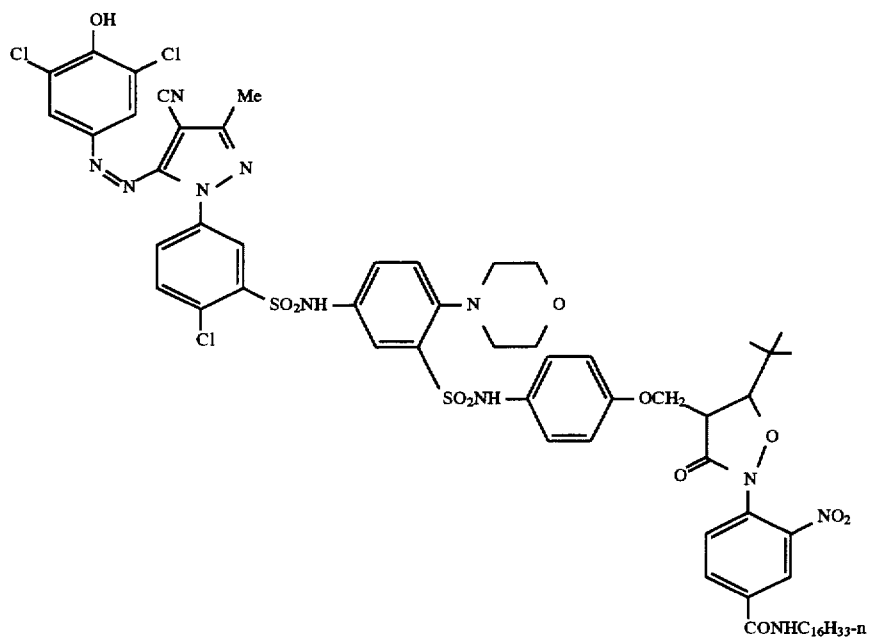
43
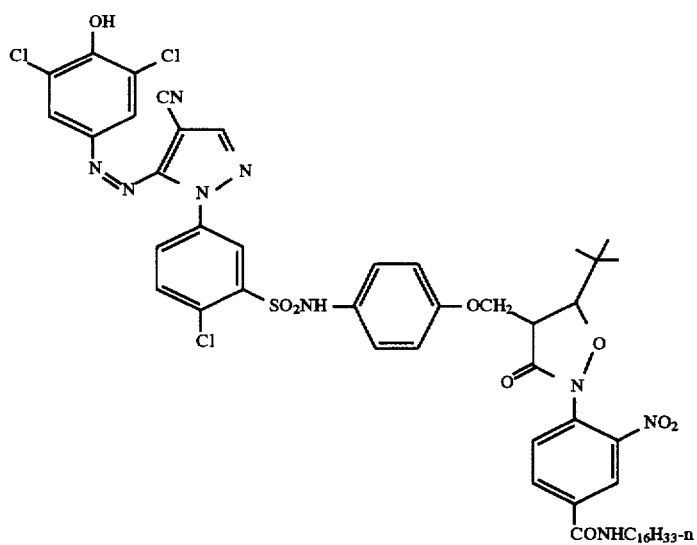

-continued
44
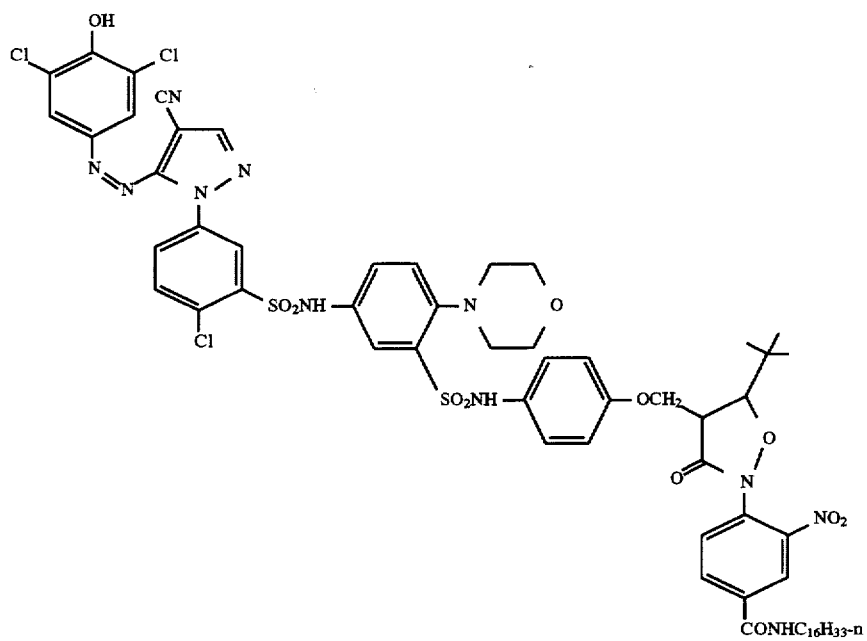
45
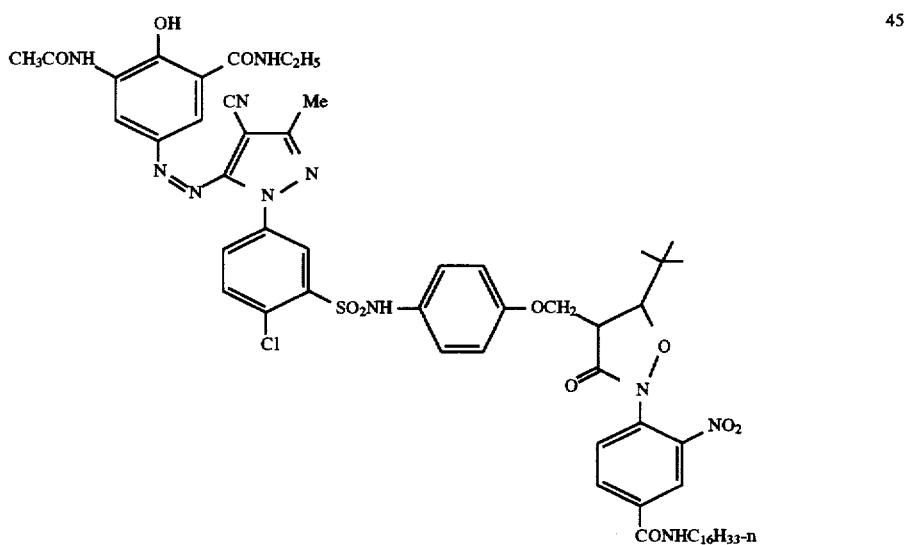
46
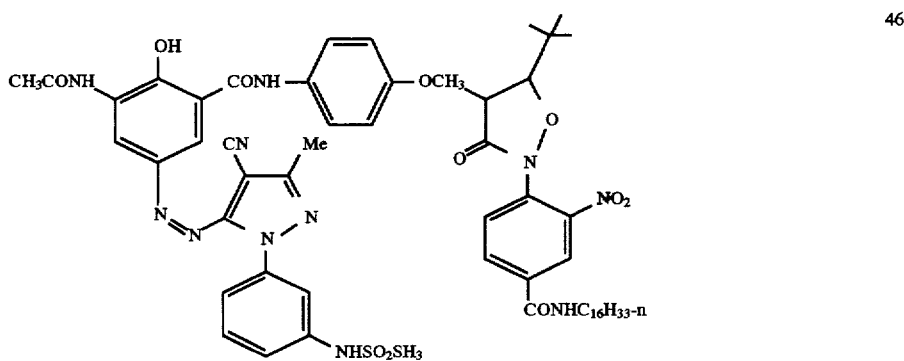

-continued
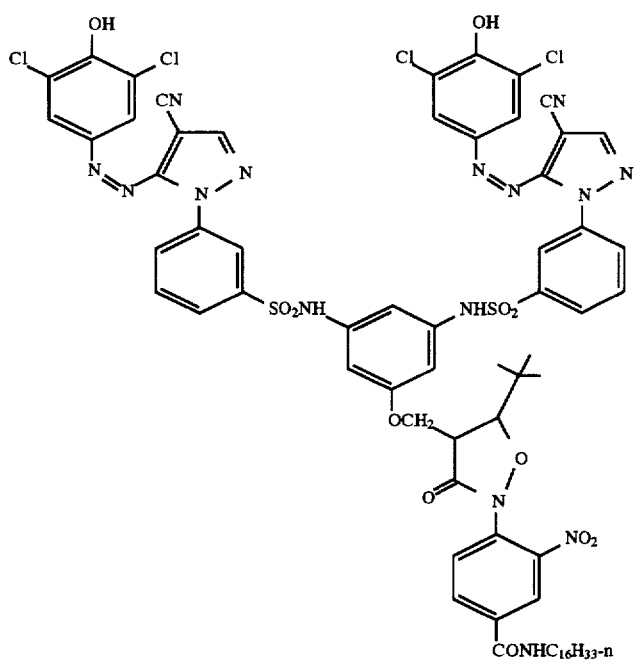
47
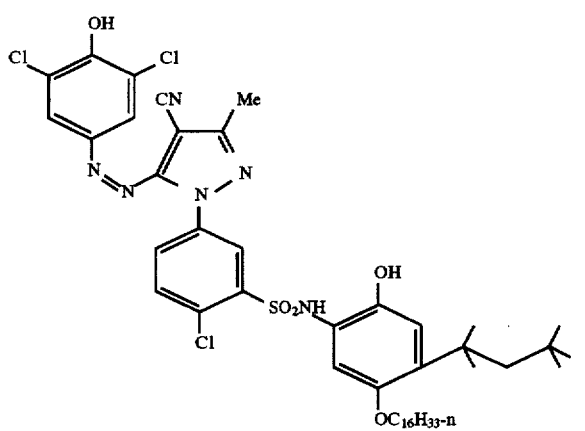
48
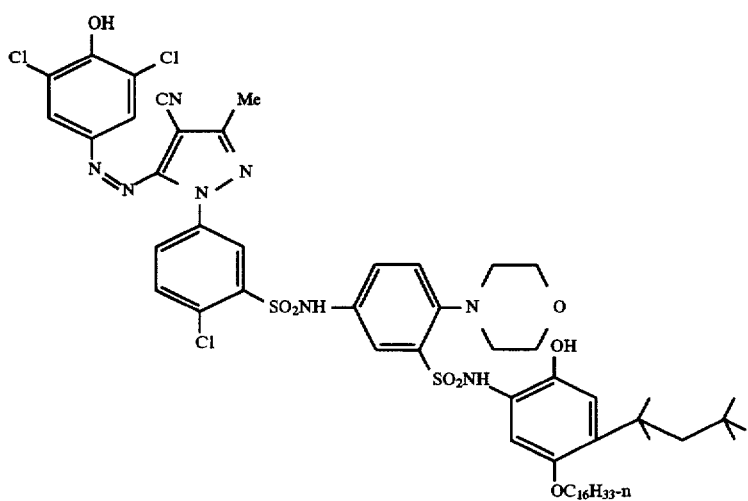
49

50
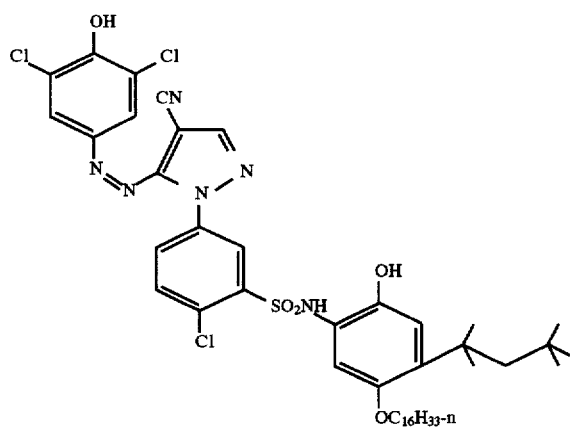
51
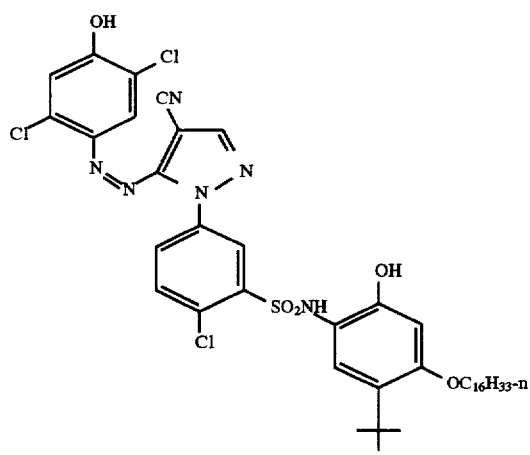
52
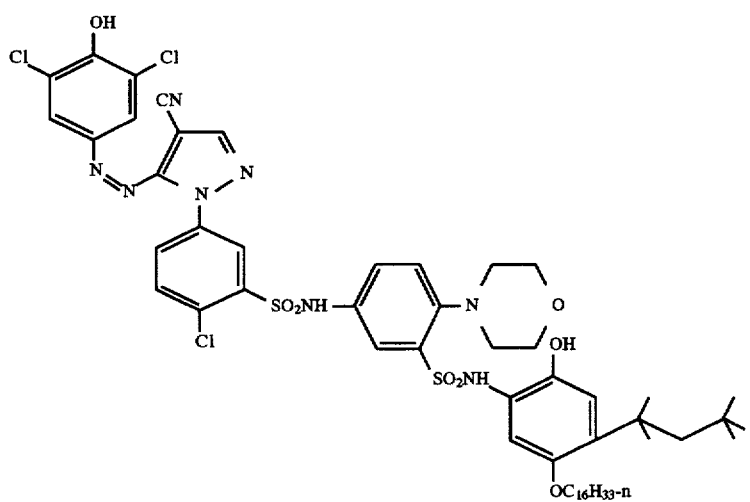

-continued
53
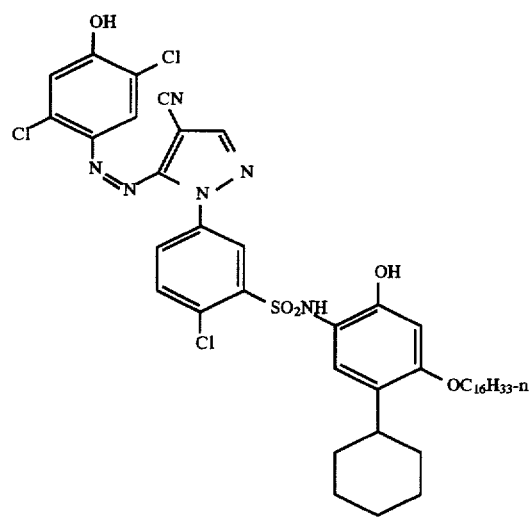
54
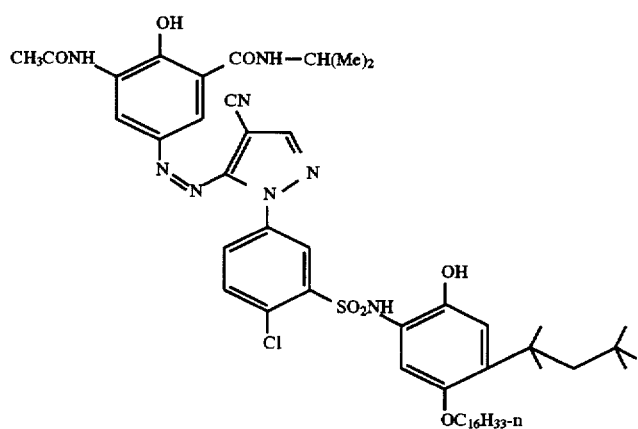
55
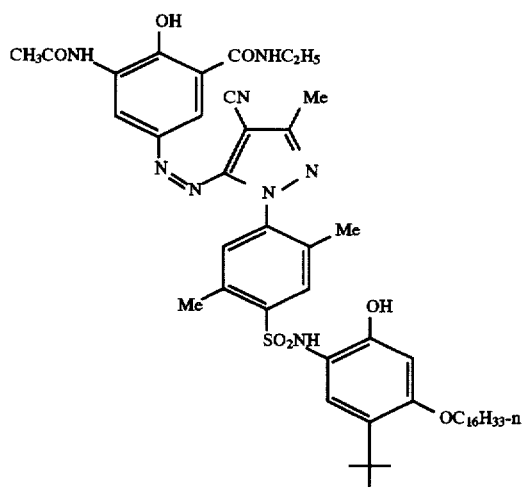

-continued
56
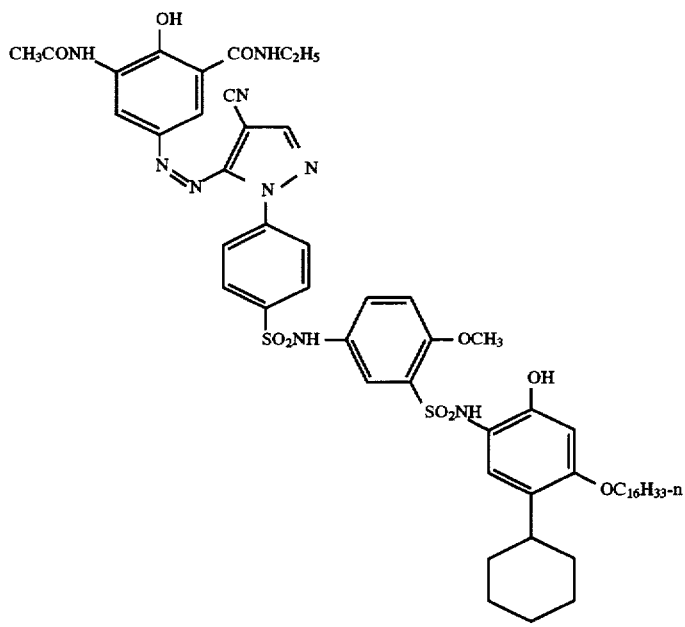
57
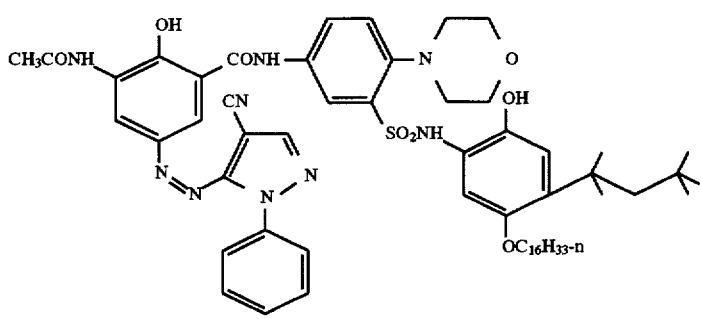
58
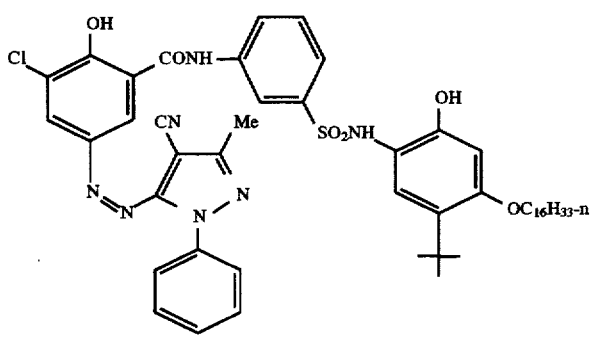
59
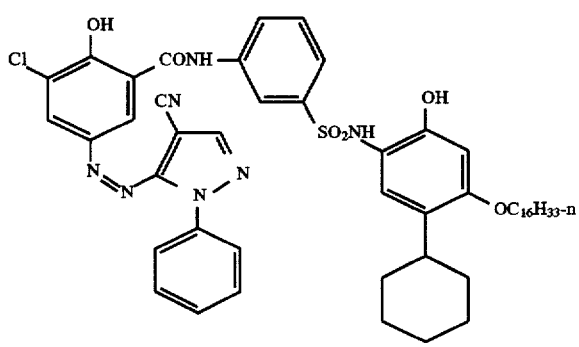

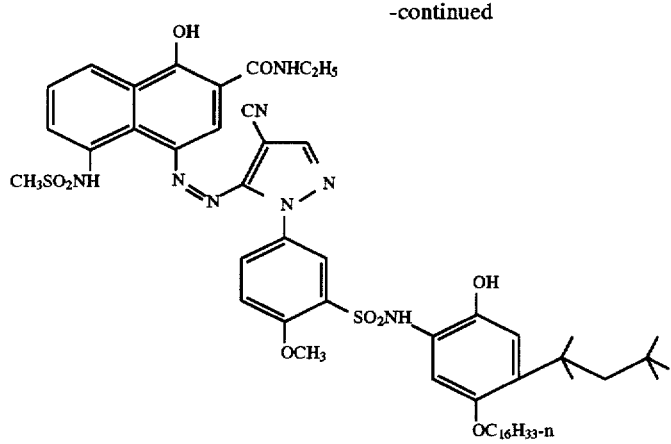

60

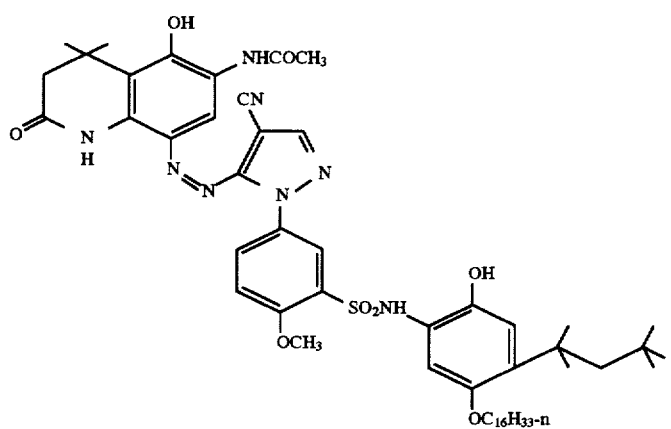

61

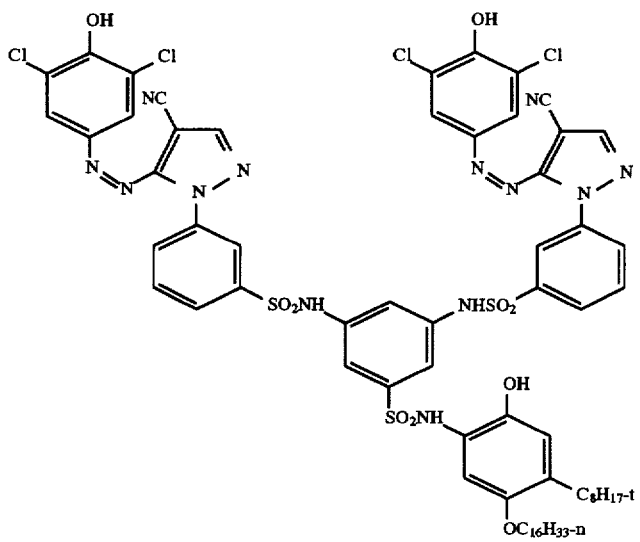

62

The synthesis method of the dye for use in the present invention is described below.

In the synthesis of the dye of the present invention, a phenol as a coupler component and a diazonium salt of a 5-aminopyrazole are subjected to coupling reaction to accomplish the dye skeleton. Synthesis of 5-aminopyrazoles may be performed by referring to the methods described in *Dyes and Pigments*, 3, 81–121 (1982) and references cited therein.

Representative synthesis examples are described below.

SYNTHESIS EXAMPLE 1

Synthesis of Dye (1)

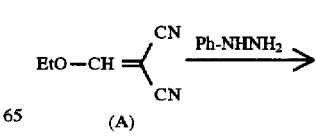

(A)

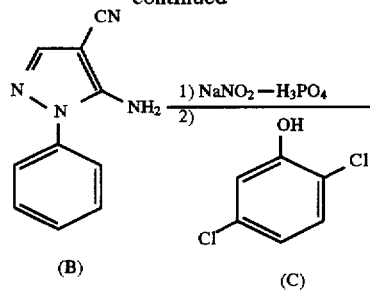

Into 40 ml of ethanol, 12.2 g of ethoxymethylene malononitrile (A) and 10.8 g of phenylhydrazine were dissolved and refluxed under heating for 30 minutes. After completion of the reaction, the mixture was cooled to room temperature, n-hexane was added thereto, and crystals deposited were collected by filtration to obtain 15.6 g of aminopyrazole (B).

Then, 9.2 g of aminopyrazole (B) was dissolved into 90 ml of phosphoric acid and thereto, 4 g of sodium nitrite was added at 10° C. or lower over 30 minutes. The mixture was continuously stirred for one hour and a diazo solution was prepared.

Into 200 ml of methanol, 8.15 g of 2,5-dichlorophenol (C) was dissolved, and thereto the diazo solution obtained above was gradually added at 15° C. or lower. The mixture was continuously stirred for one hour, water was added thereto, crystals deposited were collected by filtration, and the crude crystals obtained were recrystallized from acetone-methanol to obtain 10.6 g of Dye (1).

λmax(DMF)=537 nm

SYNTHESIS EXAMPLE 2
Synthesis of Dye (27)

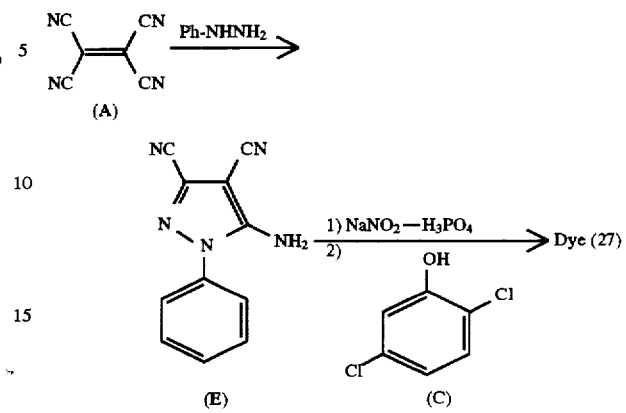

To a solution containing 5.4 g of phenylhydrazine and 50 ml of ethanol, 6.4 g of tetracyanoethylene was added under ice cooling, the mixture was stirred at room temperature for one hour, then at 50° C. for one hour and again ice cooled, and crystals deposited were separated by filtration to obtain 6.8 g of aminopyrazole (E).

Into 40 ml of phosphoric acid, 2.1 g of aminopyrazole (E) was dissolved, thereto 0.8 g of sodium nitrite was gradually added at 5° C. or lower, and the mixture was continuously stirred for one hour to prepare a diazo solution.

Into 50 ml of methanol, 1.63 g of 2,5-dichlorophenol (C) was dissolved, and thereto the diazo solution obtained above was gradually added at 10° C. or lower. After stirring the mixture for one hour, water was added, crystals deposited were collected by filtration, and crystals obtained were recrystallized from ethanol-water to obtain 1.7 g of Dye (27).

λmax(DMF)=541 nm

Synthesis of Compound (41)

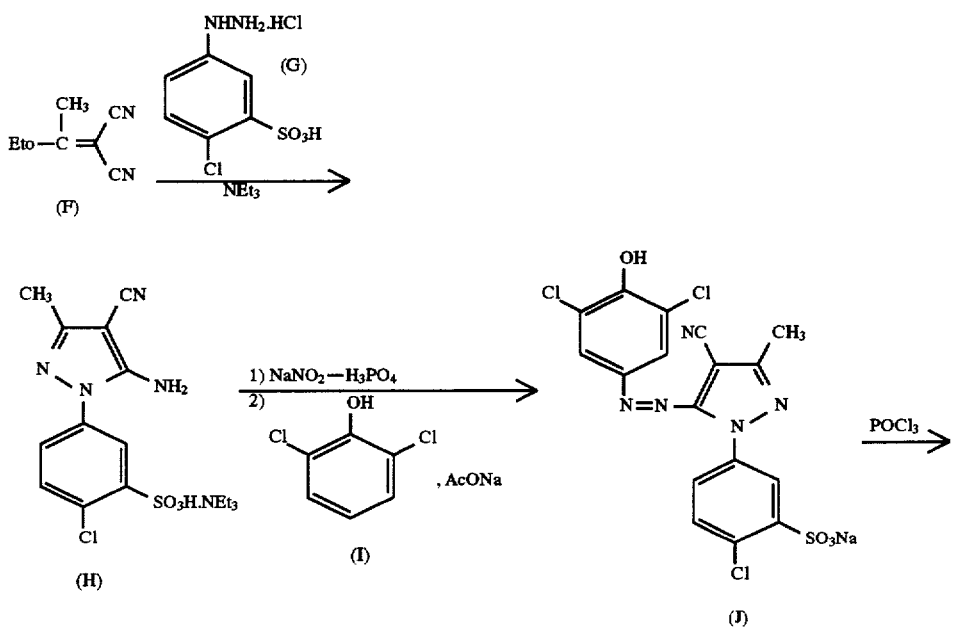

-continued
Synthesis of Compound (41)

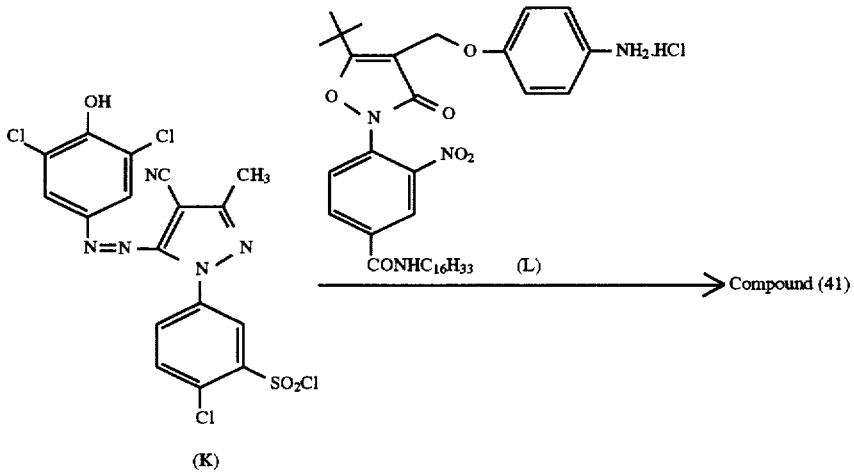

To a solution containing 25.9 g of Compound (G), 28 ml of triethylamine and 300 ml of methanol, 13.6 g of Compound (F) was added, and the mixture was refluxed under heating for 30 minutes. After completion of the reaction, the reaction solution was concentrated under reduced pressure to obtain an oily product. Then, iso-propanol was added thereto, and crystals obtained were collected by filtration to obtain 29.6 g of aminopyrazole (H).

Into 50 ml of phosphoric acid, 12.4 g of aminopyrazole (H) was dissolved, and thereto 2.4 g of nitrous acid was gradually added at 10° C. or lower. The mixed solution was continuously stirred for one hour to prepare a diazo solution.

To a mixture of 4.9 g of 2,6-dichlorophenol, 60 g of sodium acetate and 200 ml of methanol, the azo solution prepared above was gradually added at 15° C. or lower. The mixture was continuously stirred for one hour, then brine was added thereto, and crystals deposited were collected by filtration to obtain 13.8 g of azo dye (J).

To a solution containing 10 ml of dimethylacetamide and 50 ml of acetonitrile, 12.8 g of Dye (J) was added, and thereto 20 ml of phosphorus oxychloride was added dropwise under ice cooling. After reacting the mixture at 50° C. for 2 hours, the reaction solution was poured into ice water and crystals deposited were collected by filtration to obtain 8.4 g of sulfonyl chloride (K).

Into 50 ml of dimethylacetamide, 5.1 g of sulfonyl chloride (K) and 6.9 g of Compound (L) were dissolved, and thereto 5 ml of α-picoline was added dropwise. After the reaction for one hour, water was added to the reaction solution, crystals deposited were collected by filtration, and crude crystals obtained were subjected to silica gel column chromatograph to obtain 6.2 g of Compound (41).

λmax(DMF)=553.5 nm

The above-described image forming compound and hydrophobic additives such as an image formation accelerator which is described below, can be incorporated into layers of the light-sensitive element by a known method described, for example, in U.S. Pat. No. 2,322,027. In this case, a high boiling point organic solvent as described in JP-A-59-83154, JP-A-59-178451, JP-A-59-178452, JP-A-59-178453, JP-A-59-178454, JP-A-59-178455 and JP-A-59-178457 may be used in combination, if desired, with a low boiling point organic solvent having a boiling point of from 50° to 160° C.

The high boiling point organic solvent is used in an amount of 10 g or less, preferably 5 g or less, per 1 g of the dye image forming compound used.

A dispersion method using a polymer material described in JP-B-51-39853 and JP-A-51-59943 may also be used.

In the case of a compound which is substantially insoluble in water, other than the above-described method, the compound may be incorporated as a fine particle dispersion in binder.

In dispersing a hydrophobic substance in a hydrophilic colloid, various surfactants may be used. For example, surfactants described in JP-A-59-157636, pages (37) to (38), may be used.

In the present invention, a dye donating compound represented by the following formula (5) can be used in combination.

DYE-Y     (5)

wherein DYE represents a dye or a precursor thereof, and Y represents a component which gives a compound different in diffusibility from the compound. Depending on the function of Y, the compound is roughly classified into a negative compound which becomes diffusible at the silver developed area, and a positive compound which becomes diffusible at the undeveloped area.

Specific examples of the negative Y include those which are oxidized upon development to cleave, thereby releasing a diffusible dye.

Specific examples of Y are described in U.S. Pat. No. 3,928,312 cited in JP-A-2-32335, from page (15), right upper column, line 18 to page (15), left lower column, line 20.

Among the groups Y as a negative dye releasing redox compound, preferred is an N-substituted sulfamoyl group (the N-substitution group includes groups derived from an aromatic hydrocarbon ring or a heterocyclic ring).

With respect to representative examples of Y, the positive compound and other type of compounds, description in JP-A-2-32335, from page (16), left upper column, to page (17), right lower column, line 7 can be applied.

In the case where the dye donating compound which can be used in combination in the present invention is a dye donating compound to be reduced, a reducing agent (sometimes referred to as an electron donor) is used.

The reducing agent may be supplied from the exterior or may be previously incorporated into the light-sensitive material. Further, a reducing agent precursor which itself has no reducibility but exerts reducibility by the action of a nucleophilic reagent or heat during the development process, can also be used.

Examples of the electron donor for use in the present invention include electron donors and electron donor precursors described in U.S. Pat. No. 4,500,626, columns 49 to 50, U.S. Pat. No. 4,483,914, columns 30 to 31, U.S. Pat. Nos. 4,330,617 and 4,590,152, JP-A-60-140335, pages (17) to (18), JP-A-57-40245, JP-A-56-138736, JP-A-59-178458, JP-A-59-53831, JP-A-59-182449, JP-A-59-182450, JP-A-60-119555, JP-A-60-128436 to JP-A-60-128439, JP-A-60-198540, JP-A-60-181742, JP-A-61-259253, JP-A-62-244044, JP-A-62-131253 to JP-A-62-131256, and European Patent Application 220746A2, pages 78 to 96.

Combinations of various electron donors described in U.S. Pat. No. 3,039,869 may also be used.

When the dye donating compound of the present invention is nondiffusible, or when the reducing agent used in combination with the dye donating compound to be reduced of the present invention is nondiffusible, an electron transfer agent may be used.

The electron transfer agent or precursor thereof may be selected from the above-described electron donors and precursors thereof. The electron transfer agent or precursor thereof preferably has mobility greater than that of the nondiffusible electron donor. Particularly useful examples of the electron transfer agent include 1-phenyl-3-pyrazolidones and aminophenols.

The nondiffusible electron donor for use in combination with the electron transfer agent may be any of the above-described reducing agents as long as it does not substantially move in layers of the light-sensitive material, and preferred examples thereof include hydroquinones, sulfonamidophenols, sulfonamidonaphthols and compounds described as the electron donor in JP-A-53-110827.

The electron transfer agent may be supplied from the exterior or may be previously incorporated into the light-sensitive material.

The dye donating compound which can be used in the present invention is preferably incorporated into the same layer as the light-sensitive silver halide emulsion, however it may be incorporated into any layer if it is in the reactive state directly or through the electron transfer agent. For example, if a colored dye donating compound is present in the lower layer of the silver halide emulsion layer, reduction in the sensitivity can be prevented. In the present invention, the above-described dye donating compound can be used in a wide range of amount, and it is used in an amount of from 0.01 to 5 mol, preferably from 0.05 to 1 mol, per 1 mol of Ag.

The above-described dye donating compound can be used in a diffusion transfer type color photographic light-sensitive material. As the development and image formation process thereof, a method of developing a processing composition in the vicinity of room temperature or a method of performing heat development by supplying a slight amount of water or by incorporating a thermal solvent, may be used.

A color diffusion transfer method is described below.

A representative form of the film unit for use in the color diffusion transfer method is such that an image receiving element (dye fixing element) and a light-sensitive element are laminated on one transparent support and after completion of the transferred image, the light-sensitive element needs not be peeled off from the image receiving element.

More specifically, the image receiving element comprises at least one mordant layer and in a preferred embodiment of the light-sensitive element, a combination of a blue-sensitive emulsion layer, a green-sensitive emulsion layer and a red-sensitive emulsion layer, a combination of a green-sensitive emulsion layer, a red-sensitive emulsion layer and an infrared-sensitive emulsion layer, or a combination of a blue-sensitive emulsion layer, a red-sensitive emulsion layer and an infrared-sensitive emulsion layer is used, and a yellow dye donating substance, a magenta dye donating substance and a cyan dye donating substance are contained in respective emulsion layers (the term "infrared-sensitive emulsion layer" as used herein means an emulsion layer having sensitivity to light of 700 nm or more, particularly 740 nm or more). Between the mordant layer and the light-sensitive layer or the dye donating substance-containing layer, a white reflecting layer containing a solid pigment such as titanium oxide is provided so that the transferred image can be viewed through the transparent support.

In order to complete development in a bright room, a light-shielding layer may further be provided between the white reflection layer and the light-sensitive layer. Or, if desired, in order to achieve peeling of the whole or a part of the light-sensitive element from the image-receiving element, a release layer may be provided at an appropriate position (such an embodiment is described, for example, in JP-A-56-67840 and Canadian Patent 674,082).

Another embodiment of the lamination type material requiring peeling is a color diffusion transfer photographic film unit described in JP-A-63-226649, comprising a white support having thereon at least (a) a layer having a neutralization function, (b) a dye image-receiving layer, (c) a release layer and (d) a layer which comprises a light-sensitive element consisting in sequence of at least one silver halide emulsion layer combined with a dye image forming substance, an alkali processing composition containing a light-shielding agent, and a transparent cover sheet, and has a light-shielding function on the side opposite to the side where the processing composition of the emulsion layer is developed.

In an embodiment dispensed with peeling, the above-described light-sensitive element is coated on one transparent support, a white reflection layer is coated thereon, and an image receiving layer is laminated further thereon. An embodiment where an image receiving element, a white reflection layer, a release layer and a light-sensitive element are laminated on the same support, and the light-sensitive element is intentionally peeled off from the image receiving element, is described in U.S. Pat. No. 3,730,718.

The representative embodiment of separately coating a light-sensitive element and an image receiving element on two respective supports is roughly classified into two groups, one group is a peeling type and another is a non-peeling type. More specifically, in a preferred embodiment of a peeling type film unit, at least one image receiving layer is coated on one support and a light-sensitive element is coated on a support having a light-shielding layer, and although the light-sensitive layer coated surface and the mordant layer coated surface do not face to each other before completion of the exposure, they are designed so that the light-sensitive layer coated surface is turned over after completion of the exposure to be superposed on the image receiving layer coated surface. After completion of the transferred image in the mordant layer, the light-sensitive element is soon peeled off from the image receiving element.

In a preferred embodiment of a non-peeling type film unit, at least one mordant layer is coated on a transparent support, a light-sensitive element is coated on a support having a transparent or light-shielding layer, and the light-sensitive layer coated surface and the mordant layer coated surface are superposed to face to each other.

The above-described embodiments each may further be combined with a container (processing element) containing an alkaline processing solution and capable of rupture under pressure. In particular, in the non-peeling type film unit comprising an image receiving element and a light-sensitive element laminated on one support, the processing element is preferably disposed between the light-sensitive element and the cover sheet superposed thereon. In the case of an embodiment where a light-sensitive element and an image receiving element are separately coated on two supports, respectively, the processing element is preferably disposed between the light-sensitive element and the image receiving element at latest at the time of development. The processing element preferably contains, depending upon the form of the film unit, a light-shielding agent (e.g., carbon black, dye capable of color change according to pH) and/or a white pigment (e.g., titanium oxide). Further, in a color diffusion transfer type film unit, a neutralization timing mechanism comprising a combination of a neutralizing layer and a neutralization timing layer is preferably integrated into the cover sheet, the image receiving element or the light-sensitive element.

The image receiving element used in the color diffusion transfer method is described in more detail below.

The image receiving element in the color diffusion transfer method preferably comprises at least one layer containing a mordant (mordant layer). Mordants known in the photographic field can be used. Specific examples thereof are described in British patents 2,011,912, 2,056,101 and 2,093,041, U.S. Pat. Nos. 4,115,124, 4,273,853 and 4,282,305, JP-A-59-232340, JP-A-60-118834, JP-A-60-128443, JP-A-60-122940, JP-A-60-122921 and JP-A-60-235134.

In addition, the image receiving element for the color diffusion transfer method can use various additives appropriately and the additives are described together in the item of the dye fixing element (image receiving element) for the heat developable color diffusion transfer method.

The light-sensitive element in the color diffusion transfer method is described below.

With respect to the silver halide emulsion, the spectral sensitizing dye, the emulsion layer, the superposed layer structure for full color, the processing composition, and the film unit for the color diffusion transfer method and the constituting layers thereof, description in JP-A-2-32335, from page (17), right lower column, line 8 to page (20), right lower column, line 19, can be applied.

The release layer in the color diffusion transfer method is described below.

The release layer for use in the present invention may be provided after processing at any position in the light-sensitive sheet within the unit. Examples of the release material include those described in JP-A-47-8237, JP-A-59-220727, JP-A-49-4653, U.S. Pat. Nos. 3,220,835 and 4,359,518, JP-A-49-4334, JP-A-50-65133, JP-A-45-24075, and U.S. Pat. Nos. 3,227,550, 2,759,825, 4,401,746 and 4,366,227. Specific examples thereof include water-soluble (or alkali-soluble) cellulose derivatives such as hydroxyethyl cellulose, cellulose acetate phthalate, plasticized methyl cellulose, ethyl cellulose, cellulose nitrate and carboxymethyl cellulose, various natural polymers such as alginic acid, pectin and gum arabic, and various modified gelatins such as acetylated gelatin and phthalated gelatin. Further, polyvinyl alcohol, polyacrylate, polymethyl methacrylate and copolymers thereof may also be used.

Among these release materials, cellulose derivatives are preferred and hydroxyethyl cellulose is particularly preferred.

In addition to the water-soluble cellulose derivatives, particulate matters such as an organic polymer can be used as the release material.

Examples of the organic polymer for use in the present invention include polymer latexes having an average particle size of from 0.01 to 10 μm, such as polyethylene, polystyrene, polymethyl methacrylate, polyvinyl pyrrolidone and butyl acrylate. However, a light-reflecting hollow polymer latex with the inside containing air and the outside comprising a material comprising an organic polymer, is preferably used.

The above-described light-reflecting hollow polymer latex can be synthesized by the method described in JP-A-61-151646.

The heat developing color diffusion transfer method is described below.

The heat developable color light-sensitive material of the present invention fundamentally comprises a reducing agent, a binder and a dye donating compound on a support, and if desired, an organic metal salt oxidizing agent may be further contained.

These components are added to the same layer in many cases, however, these components may be dividedly added to separate layers as long as they are in the reactive state. For example, when a colored dye donating compound to be reduced is present in the lower layer of the silver halide emulsion, reduction in sensitivity can be prevented. The electron donor is preferably incorporated into the heat developable light-sensitive material, however, it may be supplied from the exterior, for example, by diffusing it from the dye fixing element which will be described later.

In order to obtain colors over a wide range within the chromaticity diagram using three primary colors of yellow, magenta and cyan, at least three silver halide emulsion layers having sensitivity in different spectral regions are used in combination. For example, a three layer combination of a blue-sensitive layer, a green-sensitive layer and a red-sensitive layer, and a three layer combination of a green-sensitive layer, a red-sensitive layer and an infrared-sensitive layer may be used. Respective light-sensitive layers may be arranged in any order and various arrangement orders known for normal type color light-sensitive materials may be used. Further, each of these light-sensitive layers may be divided into two or more layers, if desired, as described in JP-A-1-252954.

The heat developable light-sensitive material may have various auxiliary layers such as a protective layer, an subbing layer, an interlayer, a yellow filter layer, an antihalation layer and a back layer.

Specific examples thereof include an subbing layer as described in U.S. Pat. No. 5,051,335, an interlayer having a solid pigment as described in JP-A-1-167838 and JP-A-61-20943, an interlayer having a reducing agent or a DIR compound as described in JP-A-1-120553, JP-A-5-34884 and JP-A-2-64634, an interlayer having an electron transfer agent as described in U.S. Pat. Nos. 5,017,454 and 5,139,919 and JP-A-2-235044, a protective layer having a reducing agent as described in JP-A-4-249245, and a layer comprising a combination of these layers. The protective layer is preferably divided into two layers. In the heat developable light-sensitive material, various additives need be added also to the protective layer in many cases and accordingly, the layer is reduced in strength and readily scratched. Therefore, in order to increase the layer strength, the protective layer is preferably divided into two layers and the outermost layer is preferably reduced in the addition amount of additives (particularly oil-soluble components) to the binder and has a binder-rich composition. When the support is a polyethylene laminate paper containing a white pigment such as titanium oxide, the back layer is preferably designed to have an antistatic function and a surface resistivity of $10^{12}$ $\Omega$.cm or less.

The silver halide emulsion (emulsion containing light-sensitive silver halide) of the present invention may have various forms. Examples thereof include regular grains having a regular crystal form such as cubic, octahedral or tetradecahedral form, and grains having an irregular crystal form, such as tabular grain, spherical grain and potato-shaped grain. The light-sensitive silver halide which can be used in respective light-sensitive layers of the present invention may be any of silver chloride, silver bromide, silver iodobromide, silver chlorobromide, silver chloroiodide and silver chloroiodobromide. The silver halide emulsion may be either a surface latent image type emulsion or an internal latent image type emulsion. The internal latent image type emulsion is used as a direct reverse emulsion in combination with a nucleating agent or a light fogging agent. The emulsion also may be a so-called core/shell emulsion having phases different between the grain inside and the grain surface. The silver halide emulsion maybe monodisperse or polydisperse, and a monodisperse emulsion may be admixed. A method of mixing emulsions different in sensitivity (described, for example, in JP-A-1-167744) is preferably used for controlling the gradation. The grain size is from 0.1 to 2 μm, preferably from 0.2 to 1.5 μm.

The light-sensitive silver halide emulsion for use in the present invention is preferably a core/shell emulsion. Further, a monodisperse emulsion having a coefficient of variation of 20% or less described in JP-A-3-110555 is preferred.

Specific examples thereof include silver halide emulsions described in U.S. Pat. No. 4,500,626, column 50, U.S. Pat. No. 4,628,021, Research Disclosure (hereinafter simply referred to as "RD"), 36544 (1994), JP-A-62-253159, JP-A-3-110555, JP-A-2-236546, JP-A-1-167743, JP-A-6-332093, JP-A-6-301129, JP-A-6-230491, JP-A-6-194768, JP-A-6-194766 and European Patent Application 618484A, and any of them can be used.

During the process for preparing the light-sensitive silver halide emulsion of the present invention, so-called desalting, i.e., removing excessive salts is preferably performed. The desalting may be performed by a Nudel water washing method where gelatin is gelled, or by a precipitation method using an inorganic salt comprising polyvalent anions (e.g., sodium sulfate), an anionic surfactant, an anionic polymer (e.g., sodium polystyrenesulfonate), or a gelatin derivative (e.g., aliphatic acylated gelatin, aromatic acylated gelatin, aromatic carbamoylated gelatin). A precipitation method is preferably used.

The light-sensitive silver halide emulsion for use in the present invention may contain a heavy metal such as iridium, rhodium, platinum, cadmium, zinc, thallium, lead, iron and osmium, for various purposes. These compounds may be used individually or in combination of two or more thereof. The addition amount varies depending upon the use purpose, however, it is generally on the order of from $10^{-9}$ to $10^{-3}$ mol per 1 mol of silver halide. The compound may be uniformly incorporated into a grain or may be localized in the inside or on the surface of a grain. Specifically, emulsions described in JP-A-2-236542, JP-A-1-116637, JP-A-6-258755, JP-A-6-235992 and JP-A-5-181246 are preferably used.

In the grain formation step of the light-sensitive silver halide emulsion of the present invention, a rhodanate, an ammonia, a tetra-substituted thioether compound, an organic thioether derivative described in JP-B-47-11386, or a sulfur-containing compound described in JP-A-53-144319 may be used as a silver halide solvent.

With respect to other conditions, description in P. Glafkides, Chimie et Physique Photographique, Paul Montel (1967), G. F. Duffin, Photographic Emulsion Chemistry, The Focal Press (1966), and V. L. Zelikman et al, Making and Coating Photographic Emulsion, The Focal Press (1964), may be referred to. More specifically, any of an acid process, a neutral process and an ammonia process may be used, and a soluble silver salt may be reacted with a soluble halogen salt by a single jet method, a double jet method or a combination thereof. In order to obtain a monodisperse emulsion, a double jet method is preferably used.

A reverse mixing method of forming grains in the presence of excessive silver ions may also be used. Further, as one of the double jet method, a so-called controlled double jet method of maintaining the pAg in the liquid phase where silver halide is produced, constant may be used.

In order to accelerate growth of grains, the concentration, the amount and the addition rate of silver salt and halogen salt added may be increased (see, JP-A-55-142329, JP-A-55-158124, U.S. Pat. No. 3,650,757).

The reaction solution may be stirred by any known stirring method. Further, the temperature and the pH of the reaction solution during formation of silver halide grains may be desirably selected depending upon the purpose. The pH is preferably from 2.2 to 7.0, more preferably from 2.5 to 6.0.

The light-sensitive silver halide emulsion is usually a silver halide emulsion subjected to chemical sensitization. The chemical sensitization of the light-sensitive silver halide emulsion of the present invention may be performed using a sulfur sensitization method, a reduction sensitization method, a noble metal sensitization method or a selenium sensitization method, which are known for the emulsion for normal light-sensitive materials, and these methods may be used individually or in combination (see, for example, in JP-A-3-110555 and JP-A-5-241267). The chemical sensitization may also be performed in the presence of a nitrogen-containing heterocyclic compound (see, JP-A-62-253159).

At the chemical sensitization, the pH is preferably from 5.3 to 10.5, more preferably from 5.5 to 8.5, and the pAg is preferably from 6.0 to 10.5, more preferably from 6.8 to 9.0.

The light-sensitive silver halide for use in-the present invention is coated in an amount of from 1 mg/m$^2$ to 10 g/m$^2$ in terms of silver.

The additives for use in these steps and known photographic additives which can be used in the present invention are described RD No. 36544, ibid., No. 18716 and ibid. No. 307105, and the pertinent portions thereof are shown in the Table below.

| Kinds of Additives | RD36544 | RD18716 | RD307105 |
|---|---|---|---|
| 1. CHemical sensitizer | pp. 510–511 | p. 648, right col. | p. 866 |
| 2. Sensitivity increasing agent | | p. 648, right col. | |
| 3. Spectral sensitizer, supersensitizer | pp. 511–514 | p. 648, right col.-p. 649, right col. | pp. 866–868 |
| 4. Brightening agent | p. 514 | p. 648, right col. | p. 868 |

| Kinds of Additives | RD36544 | RD18716 | RD307105 |
|---|---|---|---|
| 5. Antifoggant, stabilizer | pp. 515–517 | p. 649, right col. | pp. 868–870 |
| 6. Light absorber, filter dye, UV absorbent | pp. 517–518 | p. 649, right col.-p. 650, left col. | p. 873 |
| 7. Dye image stabilizer | p. 527 | p. 650, left col. | p. 872 |
| 8. Hardening agent | p. 508 | p. 651, left col. | p. 874–875 |
| 9. Binder | p. 507 | p. 651, left col. | pp. 873–874 |
| 10. Plasticizer, lubricant | p. 519 | p. 650, right col. | p. 876 |
| 11. Coating aid, surfactant | p. 519 | p. 650, right col. | pp. 875–876 |
| 12. Antistatic agent | p. 520 | p. 650, right col. | pp. 876–877 |
| 13. Matting agent | p. 521 | | pp. 878–879 |

Gelatin is advantageously used as protective colloid for use in the preparation of emulsion of the present invention or as a binder in constituent layers of other light-sensitive materials or dye fixing elements. However, other hydrophilic binders may be used. Examples thereof include those described in the above-described *Research Disclosures* and JP-A-64-13546, pages (71) to (75). More specifically, a transparent or translucent hydrophilic binder is preferred and examples thereof include protein or cellulose derivatives such as gelatin and a gelatin derivative, natural compounds such as polysaccharides including starch, gum arabic, dextran and pluran, and synthesis polymer compounds such as polyvinyl alcohol, polyvinyl pyrrolidone and an acrylamide polymer. Further, highly water-absorptive polymers described in JP-A-62-245260, namely, homopolymers of a vinyl monomer having —COOM or —SO$_3$M (wherein M represents a hydrogen atom or an alkali metal), and copolymers of these vinyl monomers or of the vinyl monomer with other vinyl monomer (e.g., sodium methacrylate, ammonium methacrylate, Sumikagel L-5H produced by Sumitomo Chemical Co., Ltd.) may also be used. These binders may be used in combination of two or more thereof. In particular, a combination of gelatin with the above-described binder is preferred. The gelatin may be selected depending upon various purposes from lime-processed gelatin, acid-processed gelatin, delimed gelatin reduced in the content of calcium or the like, and gelatin subjected to oxidation treatment to reduce the methionine residue, and these may also preferably used in combination.

In using a system where heat development is performed by supplying a slight amount of water, by using the above-described highly water-absorptive polymer, water can be swiftly absorbed. Further, when the highly water-absorptive polymer, a polyvinyl alcohol or a polysaccharide as described in JP-A-7-36163 is used in the dye fixing layer or a protective layer thereof, the transferred dye is prevented from retransferring from the dye fixing element to others.

In the present invention, the binder is suitably coated in an amount of preferably 20 g/m$^2$ or less, more preferably 10 g/m$^2$ or less, still more preferably 7 g/m$^2$ or less.

The constituent layers (including back layer) of the light-sensitive material or the dye fixing element may contain various polymer latexes for the purpose of improving layer properties, such as dimensional stabilization, curling prevention, adhesion prevention, layer cracking prevention and prevention of increase or reduction in sensitivity due to pressure. Specific examples thereof include polymer latexes described in JP-A-62-245258, JP-A-62-136648 and JP-A-62-110066, and any of these can be used. In particular, when a polymer latex having a low glass transition temperature (40° C. or lower) is used, cracking of the mordant layer can be prevented, and when a polymer latex having a high glass transition temperature is used in the back layer, an effect of curling prevention can be obtained.

In the present invention, a development inhibitor-releasing redox compound can be used. For example, those described in JP-A-61-213847, JP-A-62-260153, JP-A-2-68547, JP-A-2-110557, JP-A-2-253253 and JP-A-1-150135 can be used.

The synthesis example of the development inhibitor-releasing redox compound which can be used in the present invention is described, for example, in JP-A-61-213847, JP-A-62-260153, U.S. Pat. No. 4,684,604, JP-A-1-269936, U.S. Pat. Nos. 3,379,529, 3,620,746, 4,377,634 and 4,332,878, JP-A-49-129536, JP-A-56-153336 and JP-A-56-153342.

The development inhibitor-releasing redox compound of the present invention is used in an amount of from $1\times10^{-6}$ to $5\times10^{-2}$ mol, preferably from $1\times10^{-5}$ is to $1\times10^{-2}$ mol, per 1 mol of silver halide. The development inhibitor-releasing redox compound for use in the present invention may be dissolved in an appropriate water-miscible organic solvent such as alcohols (e.g., methanol, ethanol, propanol, fluorinated alcohol), ketones (e.g., acetone, methyl ethyl ketone), dimethylformamide, dimethylsulfoxide and methyl cellosolve, before use.

Also, the compound may be dissolved by an already well known emulsion dispersion method using an oil such as dibutyl phthalate, tricresyl phosphate, glyceryl triacetate or diethyl phthalate, or an auxiliary solvent such as ethyl acetate or cyclohexanone, and then mechanically formed into an emulsion dispersion before use. Or, powder of the development inhibitor-releasing redox compound is dispersed in water by means of a ball mill, a colloid mill or ultrasonic wave, before use.

The development inhibitor-releasing redox compound can be used in combination with a releasing aid. Examples thereof are described in JP-A-3-293666.

In dispersing a hydrophobic compound in a hydrophilic colloid, various surfactants may be used. Examples thereof include surfactants described in JP-A-59-157636, pages (37) to (38).

In the present invention, compounds capable of achieving activation of development of the light-sensitive material and at the same time stabilization of the image can be used. Specific examples of compounds which are preferably used are described in U.S. Pat. No. 4,500,626, columns 51 and 52.

In the system where an image is formed by diffusion transfer of a dye, a dye fixing element is used together with the light-sensitive material. The dye fixing element may be separately coated on a support different from the light-sensitive material or may be coated on the same support as the light-sensitive material. With respect to the interrelation between the light-sensitive material and the dye fixing element, the relation to the support and the relation to the white reflecting layer, the relations described in U.S. Pat. No. 4,500,626, column 57, can be applied also to the present invention.

The dye fixing element which is preferably used in the present invention comprises at least one layer containing a mordant and a binder. The mordant may be one known in the photographic field and specific examples thereof include mordants described in U.S. Pat. No. 4,500,626, columns 58 to 59, and JP-A-61-88256, pages (32) to (41), JP-A-62-244043 and JP-A-62-244036. Also, a dye acceptable polymer compound as described in U.S. Pat. No. 4,463,079 may be used.

The dye fixing element may comprise, if desired, an auxiliary layer such as a protective layer, a release layer and a curling preventive layer. The protective layer is advantageously provided.

The constituent layers of the light-sensitive material and the dye fixing element may contain a plasticizer, a lubricant, or a high boiling point organic solvent as a releasability improver of the light-sensitive material from the dye fixing element. Specific examples thereof include those described in JP-A-62-253159, page (25), and JP-A-62-245253.

Further, for the above-described purposes, various silicone oils (all silicone oils including dimethyl silicone oil and modified silicone oils obtained by introducing various organic groups into dimethyl siloxane) can be used. Effective examples thereof include various modified silicone oils, particularly carboxy-modified silicone (trade name: X-22-3710), described in Modified Silicone Oil (Technical Data), P6-18B, issued by Shin-Etsu Silicone Co., Ltd.

Further, silicone oils described in JP-A-62-215953 and JP-A-63-46449 are also effective.

The light-sensitive material or the dye fixing element may use a discoloration inhibitor. Examples of the discoloration inhibitor include an antioxidant, an ultraviolet absorbent and a certain kind of metal complex.

Examples of the antioxidant include chroman compounds, coumaran compounds, phenol compounds (e.g., hindered phenols), hydroquinone derivatives, hindered amine derivatives and spiroindane compounds. Further, compounds described in JP-A-61-159644 are also effective.

Examples of the ultraviolet absorbent include benzotriazole compounds (described, for example, in U.S. Pat. No. 3,533,794), 4-thiazolidone compounds (described, for example, in U.S. Pat. No. 3,352,681), benzophenone compounds (described, for example, in JP-A-46-2784), and the compounds described in JP-A-54-48535, JP-A-62-136641 and JP-A-61-88256. Ultraviolet absorptive polymers described in JP-A-62-260152 are also effective.

Examples of the metal complex include the compounds described in U.S. Pat. Nos. 4,241,155, 4,245,018 (columns 3 to 36) and 4,254,195 (columns 3 to 8), JP-A-62-174741, JP-A-61-88256, pages (27) to (29), JP-A-63-199248, JP-A-1-75568 and JP-A-1-74272.

Examples of useful discoloration inhibitors are described in JP-A-62-215272, pages (125) to (137).

In order to prevent discoloration of the dye transferred onto the dye fixing element, the discoloration inhibitor may be previously incorporated into the dye fixing element or may be supplied to the dye fixing element from the exterior such as the light-sensitive material.

The above-described antioxidant, ultraviolet absorbent and metal complex may be used in combination with one another.

The light-sensitive material or the dye fixing element may contain a fluorescent brightening agent. In particular, the fluorescent brightening agent is preferably incorporated into the dye fixing element or supplied thereto from the exterior such as the light-sensitive material. Examples thereof include the compounds described in K. Veenkataraman (compiler), The Chemistry of Synthetic Dyes, Chap. 8, and JP-A-61-143752. Specific examples thereof include stilbene compounds, coumarin compounds, biphenyl compounds, benzoxazolyl compounds, naphthalimide compounds, pyrazoline compounds and carbostyryl compounds.

The fluorescent brightening agent may be used in combination with a discoloration inhibitor.

Examples of the hardening agent for use in the constituent layers of the light-sensitive material or the dye fixing element include the hardening agents described in U.S. Pat. No. 4,678,739, column 41, JP-A-59-116655, JP-A-62-245261 and JP-A-61-18942. Specific examples thereof include aldehyde hardening agents (e.g., formaldehyde), aziridine hardening agents, epoxy hardening agents, vinyl sulfone hardening agents (e.g., N,N'-ethylene-bis (vinylsulfonylacetamido)ethane), N-methylol hardening agents (e.g., dimethylolurea) and polymer hardening agents (e.g., the compounds described in JP-A-62-234157). In particular, vinyl sulfone hardening agents described in JP-A-3-114043 are preferably used.

The constituent layers of the light-sensitive material or the dye fixing element can use various surfactants for various purposes, such as to serve as a coating aid, to improve releasability, to improve slipperiness, to prevent electro static charge or to accelerate development. Specific examples of the surfactant are described in JP-A-62-173463 and JP-A-62-183457.

The constituent layers of the light-sensitive material or the dye fixing element may contain an organic fluoro compound so as to improve slipperiness, to prevent electro static charge or to improve releasability. Representative examples of the organic fluoro compound include fluorine surfactants, oily fluorine compounds such as fluorine oil, and hydrophobic fluorine compounds such as solid fluorine compound resin (e.g., tetrafluoroethylene resin), described in JP-B-57-9053, columns 8 to 17, JP-A-61-20944 and JP-A-62-135826.

The light-sensitive material or the dye fixing element may use a matting agent. Examples of the matting agent include the compounds described in JP-A-61-88256, page (29), such as silicon dioxide, polyolefin and polymethacrylate, and the compounds described in JP-A-63-274944 and JP-A-63-274952, such as benzoguanamine resin bead, polycarbonate resin bead and AS resin bead.

In addition, the constituent layers of the light-sensitive material or the dye fixing element may contain a thermal solvent, a defoaming agent, an antiseptic/antimold or colloidal silica. Specific examples of these additives are described in JP-A-61-88256, pages (26) to (32).

In the present invention, the constituent layers of the light-sensitive material and/or the dye fixing element may use an image formation accelerator. The image formation accelerator has functions of accelerating the oxidation-reduction reaction of a silver salt oxidizing agent with a reducing agent, accelerating the reaction such as production of a dye from a dye donating material, decomposition of a dye or release of a diffusible dye, or accelerating transfer of a dye from the light-sensitive material layer to the dye fixing layer. The image formation accelerator is classified in view of its physicochemical functions into a base or base precursor, a nucleophilic compound, a high boiling point organic solvent (oil), a thermal solvent, a surfactant and a compound interactive with silver or silver ion. However, these materials each generally has a composite function and usually provides several acceleration effects described above at the same time. This is described in detail in U.S. Pat. No. 4,678,739, columns 38 to 40.

The base precursor includes salts of an organic acid which is decarboxylated by heat, with a base, and compounds which release an amine by intramolecular nucleophilic substitution reaction, Rossen rearrangement or Beckmann rearrangement. Specific examples thereof are described in U.S. Pat. No. 4,511,493 and JP-A-62-65038.

In a system where heat development and transfer of a dye are simultaneously performed in the presence of a slight amount of water, the base and/or the base precursor are preferably incorporated into the dye fixing element so as to increase preservability of the light-sensitive material.

In the present invention, a combination of a difficultly soluble metal compound described in European Unexamined Patent Publication 210,660 and U.S. Pat. No. 4,740, 445, with a compound (called a complex forming compound) capable of complex forming reaction with a metal ion constituting the difficultly soluble metal compound, is used. Specific examples of the combination are described in JP-A-2-269338, pages (2) to (6). Particularly preferred compounds as the difficultly soluble metal compound are zinc hydroxide, zinc oxide and a combination of these two compounds.

The light-sensitive material and/or the dye fixing element may use various development stopping agents so as to always obtain a constant image against fluctuation of the processing temperature and the processing time upon development.

The term "development stopping agent" as used herein means a compound which, after proper development, swiftly neutralizes the base or reacts with the base to reduce the base concentration in the layer to thereby stop the development, or a compound which interact with silver or silver salt to inhibit development. Specific examples thereof include acid precursors which release an acid upon heating, electrophilic compounds which undergo substitution reaction with the base present together upon heating, nitrogen atom-containing heterocyclic compounds, mercapto compounds and precursors thereof. The development stopping agent is more specifically described in JP-A-62-253159, pages (31) to (32).

The support used in the light-sensitive material or the dye fixing element of the present invention is one capable of withstanding the processing temperature. In general, paper and synthetic polymer (film) are used. Specific examples thereof include polyethylene terephthalate, polycarbonate, polyvinyl chloride, polystyrene, polypropylene, polyimide, celluloses (e.g., triacetyl cellulose), those obtained by incorporating a pigment such as titanium oxide into the above-described film, film processed synthetic paper formed from polypropylene or the like, mixed paper formed from synthetic resin pulp such as polyethylene, and natural pulp, Yankee paper, baryta paper, coated paper (particularly, cast-coated paper), metals, cloths and glasses.

These may be used individually or may be used as a support having laminated on one surface thereof or on both surfaces thereof a synthetic polymer such as polyethylene.

In addition, the supports described in JP-A-62-253159, pages (29) to (31) can be used.

On the surface of the support, a hydrophilic binder and an antistatic agent such as a semiconductor metal oxide (e.g., alumina sol or tin oxide) or carbon black may be coated.

Examples of the method for exposing and recording an image on the light-sensitive material include a method of directly photographing a scene or a person using a camera, a method of exposing an image through a reversal film or negative film using a printer or an enlarger, a method of scan exposing an original through a slit using an exposing apparatus of a copying machine, a method of exposing image information through electric signals by emitting light from a light emitting diode or various lasers, and a method of outputting image information on an image display apparatus such as CRT, liquid crystal display, electroluminescense display or plasma display and exposing an image directly or through an optical system.

The light source for use in recording an image on the light-sensitive material may be a light source described in U.S. Pat. No. 4,500,626, column 56, such as natural light, tungsten lamp, light emitting diode, laser light source and CRT light source, as described above.

Further, image exposure may be performed using a wavelength conversion element in which a nonlinear optical material is combined with a coherent light source such as laser. The term "nonlinear optical material" as used herein means a material capable of creating nonlinearity between polarization and electric field, to be generated when a strong photoelectric field such as laser light is given. Inorganic compounds such as lithium niobate, potassium dihydrogenphosphate (KDP), lithium iodate and $BaB_2O_4$, urea derivatives, nitroaniline derivatives, nitropyridine-N-oxide derivatives such as 3-methyl-4-nitropyridine-N-oxide (POM), and compounds described in JP-A-61-53462 and JP-A-62-210432 are preferably used. Known examples of the shape of the wavelength conversion element include a single crystal optical wageguide type element and a fiber type element, and either element is useful.

The above-described image information can use image signals Obtained from a video camera or electronic still camera, television signals such as the Nippon Television Signal Code (NTSC), image signals obtained by dividing an original into plural pixels with a scanner, or image signals formed by using a computer such as CG or CAD.

The light-sensitive material and/or the dye-fixing element may have an electrically conductive heating element layer as a heating means for the heat development or diffusion transfer of a dye. In this case, heating elements described in JP-A-61-145544 may be used as a transparent or opaque heating element. The above-described electrically conductive layer functions also as an antistatic layer.

The heating temperature in the heat-development step may be from about 50° C. to about 250° C., but a temperature of from about 80° C. to about 180° C. is particularly useful. The diffusion transfer of a dye may be performed simultaneously with the heat development or after completion of the heat development. In the latter case, the transfer of a dye may be made at a heating temperature in the transfer step of from the temperature in the heat development step to room temperature, however, a temperature of from 50° C. to a temperature about 10° C. lower than the temperature in the heat-development step is more preferred.

Transfer of a dye may be effected only by heat, but a solvent may also be used so as to accelerate transfer of a dye. Further, as described in detail in JP-A-59-218443 and JP-A-61-238056, a method of simultaneously or continuously performing development and transfer in the presence of a small amount of a solvent (in particular, water) under heating is also useful. In this method, the heating temperature is preferably from 50° C. to the boiling point of the solvent. For example, when the solvent is water, the temperature is preferably from 50° to 100° C.

Examples of the solvent used for accelerating development and/or transferring a diffusible dye to the dye fixing layer include water and a basic aqueous solution containing an inorganic alkali metal salt or an organic base (examples of the base include those described in the item of the image formation accelerator). In addition, a low boiling point solvent or a mixed solution of a low boiling point solvent with water or a basic aqueous solution can also be used. Further, the solvent may contain a surfactant, an antifoggant or a complex-forming compound with a difficultly soluble metal salt.

The solvent can be used in either or both of the dye fixing element and the light-sensitive material. The amount of the solvent used may be small as equal to or less than the weight of the solvent corresponding to the maximum swollen volume of all coated layers (particularly, equal to or less than the weight obtained by subtracting the weight of all coated layers from the weight of the solvent corresponding to the maximum swollen volume of all coated layers).

The solvent is applied to the light-sensitive layer or the dye fixing layer, for example, by the method described in JP-A-61-147244, page (26). The solvent encapsulated in a microcapsule may be previously incorporated into either or both of the light-sensitive material and the dye-fixing material.

In order to accelerate transfer of a dye, a method of incorporating a hydrophilic thermal solvent which is solid at room temperature but melts at a high temperature, into the light-sensitive material or the dye-fixing element may also be used. The hydrophilic thermal solvent may be incorporated into either or both of the light-sensitive material and the dye-fixing element. The layer to which the solvent is added may be any of the emulsion layer, the interlayer, the protective layer and the dye-fixing layer, but the solvent is preferably incorporated into the dye-fixing layer and/or layer(s) adjacent thereto.

Examples of the hydrophilic thermal solvent include ureas, pyridines, amides, sulfonamides, imides, alcohols, oximes and other heterocyclic compounds.

Also, in order to accelerate transfer of a dye, a high boiling point organic solvent may be incorporated into the light-sensitive material and/or the dye fixing element.

Heating in the development and/or transfer step may be performed by putting the material into contact with a heated block or plate, or with a hot plate, a hot presser, a hot roller, a halogen lamp heater or an infrared or far infrared lamp heater or by passing the material through a high temperature atmosphere.

With respect to the pressurizing conditions and the application method of pressure in superposing,the light-sensitive element on the dye fixing element to closely adhere to each other, the method described in JP-A-61-147244, page 27, can be used.

In processing the photographic elements of the present invention, any of various heat-developing apparatuses can be used. For example, apparatuses described in JP-A-59-75247, JP-A-59-177547, JP-A-59-181353, JP-A-60-18951, JP-U-A-62-25944 (the term "JP-U-A" as used herein means an "unexamined published Japanese utility model application"), JP-A-3-131856, and JP-A-3-131851 are preferably used.

The present invention will be described below with reference to the Examples, however, the present invention should not be construed as being limited thereto.

EXAMPLE 1

The preparation method of a dispersion of zinc hydroxide is described below.

To 100 ml of a 4% aqueous gelatin solution, 12.5 g of zinc hydroxide having an average particle size of 0.2 µm, 1 g of carboxymethyl cellulose as a dispersant, and 0.1 g of sodium polyacrylate were added, and the mixture was ground in a mill for 30 minutes using glass beads having an average particle size of 0.75 mm. The glass beads were separated to obtain a zinc hydroxide dispersion.

The preparation method of a dispersion of an electron transfer agent is described below.

To a 5% aqueous gelatin solution, 10 g of an electron transfer agent shown below, 0.4 g of carboxymethyl cellulose (Celogen 6A, trade name, produced by Dai-Ichi Kogyo Seiyaku Co., Ltd.) and 0.2 g of an anionic surfactant shown below were added, and the mixture was ground in a mill for 60 minutes using glass beads having an average particle size of 0.75 mm. The glass beads were separated to obtain an electron transfer agent dispersion having an average particle size of 0.35 µm.

Electron transfer agent:

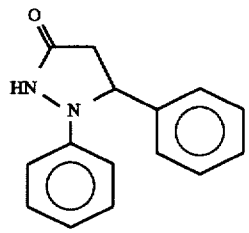

Anionic surfactant:

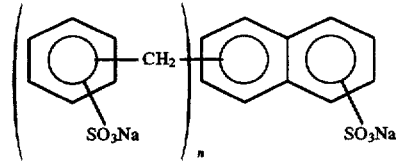

The preparation method of a dye trapping agent dispersion is described below.

To a mixed solution containing 108 ml of a polymer latex (solid content: 13%) shown below, 20 g of a surfactant shown below and 1,232 ml of water, under stirring, 600 ml of a 5% aqueous solution of an anionic surfactant shown below was added over 10 minutes. The thus obtained dispersion was concentrated and desalted to 500 ml using an ultrafiltration nodule. Then, 1,500 ml of water was added and the same operation was again repeated to obtain 500 g of a dye trapping agent dispersion.

Polymer Latex:

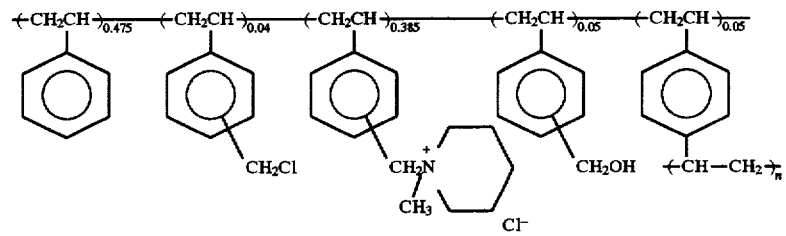

Surfactant:

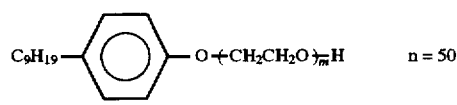  n = 50

Anionic Surfactant:

$$\begin{array}{c} CH_2COOC_6H_{13} \\ | \\ NaO_3S-CHCooC_6H_{13} \end{array}$$

The preparation method of a gelatin dispersion of a hydrophobic additive is described below.

A gelatin dispersion of each of a cyan dye donating compound, a magenta dye donating compound, a yellow dye donating compound and an electron donor is prepared according to the formulation in Table 1. More specifically, each oil phase component was dissolved under heating at about 60° C. to form a uniform solution, an aqueous phase component heated at about 60° C. was added to the solution, and the components was mixed under stirring and then dispersed in a homogenizer for 13 minutes at 12,000 rpm. Water was added thereto and the mixture was stirred to obtain a homogenous dispersion.

Further, the gelatin dispersion of each of the magenta dye donating compound and the cyan dye donating compound was subjected to repetition of dilution with water and concentration using an ultrafiltration module (Ultra-filtration Module ACV-3050, manufactured by Asahi Chemical Industry Co., Ltd.) to reduce the weights of ethyl acetate and methyl ethyl ketone to 1/6 of the weights in Table 1.

TABLE 1

|  | Cyan | Magenta | Yellow | Electron Donor |
|---|---|---|---|---|
| Oil phase |  |  |  |  |
| Dye Donating Compound (1) | 9.05 g | — | — | — |
| Dye Donating Compound (2) | 6.19 g | — | — | — |
| Dye Donating Compound (3) | — | 15.5 g | — | — |
| Dye Donating Compound (4) | — | — | 9.77 g | — |
| Dye Donating Compound (5) | — | — | 0.027 g | — |
| Electron Donor (1) | 4.36 g | 5.73 g | 4.21 g | — |
| Electron Donor (2) | — | — | — | 13.9 g |
| Electron Donor (3) | — | 0.26 g | 0.54 g | — |
| Electron Transfer Agent Precursor | 1.42 g | 1.42 g | 0.86 g | — |
| Compound (1) | 0.18 g | 0.22 g | 0.21 g | — |
| Compound (2) | 1.53 g | 1.94 g | — | — |
| Compound (3) | 1.52 g | 1.94 g | — | — |
| Development Inhibitor Precursor | — | — | — | 2.63 g |
| High Boiling Point Solvent (1) | 1.91 g | 1.94 g | 3.67 g | — |
| High Boiling Point Solvent (2) | 7.60 g | 7.73 g | 3.67 g | 2.93 g |
| High Boiling Point Solvent (3) | — | — | — | 2.94 g |
| Surfactant (2) | 1.55 g | 0.52 g | 1.50 g | 0.45 g |
| Ethyl acetate | 37.9 ml | 38.0 ml | 25.0 ml | 18.0 ml |
| Methyl ethyl ketone | 58.8 ml | 59.1 ml | — | — |
| Aqueous phase |  |  |  |  |
| Lime-processed gelatin | 10.0 g | 10.0 g | 10.0 g | 10.0 g |
| Citric acid | — | — | — | 0.06 g |
| Carboxymethyl cellulose | — | 1.0 g | — | — |
| Sodium hydrogensulfite | — | 0.04 g | — | 0.15 g |
| Water | 150 ml | 150 ml | 120 ml | 100 ml |
| Water | 140 ml | 160 ml | 125 ml | 65 ml |

TABLE 1-continued

|  | Cyan | Magenta | Yellow | Electron Donor |
|---|---|---|---|---|

Dye Donating Compound (1):

Dye Donating Compound (2):

Dye Donating Compound (3):

Dye Donating Compound (4):

TABLE 1-continued

| | Cyan | Magenta | Yellow | Electron Donor |
|---|---|---|---|---|

Dye Donating Compound (5):

[Chemical structure: A complex dye structure featuring a phenol ring with OH, (t)C₈H₁₇, and OC₁₆H₃₃ substituents, connected via NHSO₂ linkages to an O(CH₂)₂OCH₃-substituted phenyl, further linked through SO₂NH to a naphthalene bearing OH and NHCOC₂H₅ groups, with an azo linkage (N=N) to a phenyl ring substituted with CH₃O₂S and CN]

Electron Donor (1):

[Chemical structure: Bis-phenol type compound with two 2,5-dihydroxyphenyl groups connected by a CH(C₁₁H₂₃ⁿ) bridge]

Electron Donor (2):

[Chemical structure: A 2,5-dihydroxyphenyl ring with NHCOCH(C₈H₁₇ⁿ)(C₆H₁₃ⁿ) and ⁿC₁₁H₂₃C(O)- substituents]

Electron Donor (3):

[Chemical structure: Naphthalene with OH, CON(C₈H₁₇ⁿ)₂, and NHSO₂Ph substituents]

Electron Transfer Agent Precursor:

[Chemical structure: A pyrazolidine derivative with a phenyl group, N-phenyl, and a 3-methylbenzoyloxy group]

Compound (1):

[Chemical structure: An isoxazolone derivative with CH₃, a 2-nitro-4-(N-methyl-N-hexadecyl)sulfamoylphenyl substituent on N, and a CH₂S-linked phenyltetrazole]

TABLE 1-continued

| | Cyan | Magenta | Yellow | Electron Donor |
|---|---|---|---|---|

Compound (2):

[Structure: benzotriazole linked to hydroxyphenyl with tert-butyl group]

Compound (3):

[Structure: chloro-benzotriazole linked to hydroxyphenyl with tert-butyl and CH₂CH₂CO₂C₈H₁₇ groups]

High Boiling Point Solvent (1):

[Structure: (cyclohexyl-O)₃P=O]

Development Inhibitor Precursor:

[Structure: tetrazole-thio linked to dihydroxyphenyl-NHCO-phenyl with NHCOC₁₅H₃₁ groups]

High Boiling Point Solvent (2):

[Structure: phthalate diester with two cyclohexyl groups]

High Boiling Point Solvent (3):

$$CH_3(CH_2)_7CH\underset{\displaystyle O}{\overset{\displaystyle \diagdown \diagup}{-}}CH(CH_2)_7COOCH_2\overset{C_2H_5}{\underset{\|}{C}}HC_4H_9$$

Surfactant (2):

$C_nH_{2n+1}$—[phenyl]—$SO_3Na$  n ≈ 12.6

Preparation of a light-sensitive silver halide emulsion is described below.

Light-Sensitive Silver Halide Emulsion (1) (for red-sensitive emulsion layer)

To a well stirred aqueous gelatin solution (obtained by adding 20 g of gelatin, 0.5 g of potassium bromide, 2.5 g of sodium chloride and 15 mg of Chemical (A) shown below to 700 ml of water and kept at 42° C.), Solution (I) and Solution (II) shown in Table 2 were added simultaneously at a constant flow rate over 8 minutes. Eight minutes after completion of the addition of Solution (I) and Solution (II), an aqueous solution of a gelatin dispersion of dyes (containing 1.9 g of gelatin, 127 mg of Dye (a) shown below, 253 mg of Dye (b) shown below and 8 mg of Dye (c) shown below in 160 ml of water and kept at 35° C.) was added.

After 2 minutes, Solution (III) and Solution (IV) shown in Table 2 were further added simultaneously at a constant flow rate over 32 minutes.

The mixture was washed with water and desalted by a usual method, 22 g of a lime-processed ossein gelatin and 50 mg of Chemical (B) shown below were added, the pH and the pAg were adjusted to 6.2 and 7.8, respectively, optimal chemical sensitization was conducted at 68° C. by adding 4-hydroxy-6-methyl-1,3,3a,7-tetrazaindene and then adding sodium thiosulfate and chloroauric acid, and after adding Antifoggant (1) shown below, 80 mg of Chemical (C) and 3 g of Chemical (D), the mixture was cooled. As a result, 635 g of a monodisperse cubic silver chlorobromide emulsion having an average grain size of 0.21 μm was obtained.

Chemical (A):

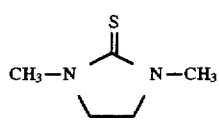

Chemical (B):

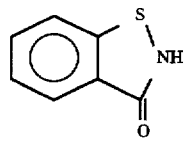

Chemical (C):

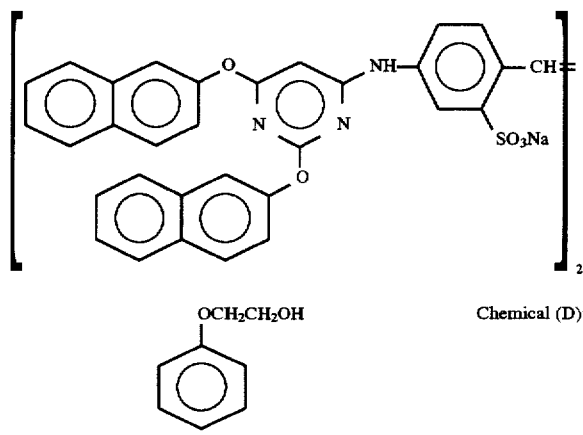

Chemical (D):

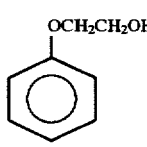

TABLE 2

|  | Solution (I) | Solution (II) | Solution (III) | Solution (IV) |
|---|---|---|---|---|
| AgNO$_3$ | 20.0 g | — | 80.0 g | — |
| NH$_4$NO$_3$ | 0.19 g | — | 0.19 g | — |
| KBr | — | 9.9 g | — | 45.1 g |
| NaCl | — | 2.1 g | — | 5.4 g |
|  | Water to make 110 ml | Water to make 110 ml | Water to make 250 ml | Water to make 250 ml |

Dye (a):

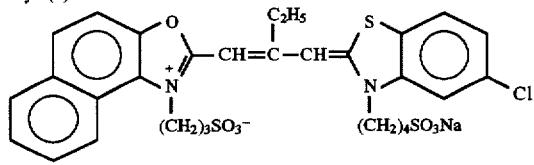

Dye (b):

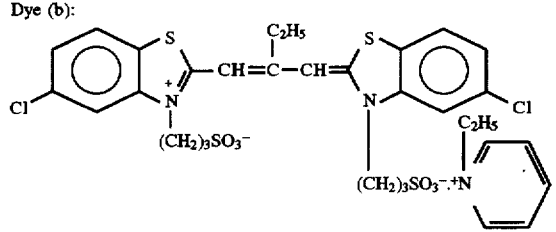

Dye (c):

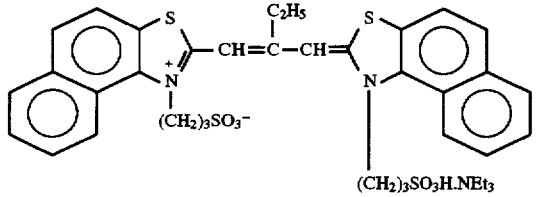

Light-Sensitive Silver Halide Emulsion (2) (for red-sensitive emulsion layer)

To a well stirred aqueous gelatin solution (obtained by adding 20 g of gelatin, 0.3 g of potassium bromide, 9 g of sodium chloride and 15 mg of Chemical (A) described above to 700 ml of water and kept at 53° C.) Solution (I) and Solution (II) shown in Table 3 were added simultaneously at a constant flow rate over 10 minutes. Six minutes after completion of the addition of Solution (I) and Solution (II), an aqueous solution of a gelatin dispersion of dyes (containing 1.2 g of gelatin, 77 mg of Dye (a) described above, 153 mg of Dye (b) described above, and 5 mg of Dye (c) described above, in 115 ml of water and kept at 45° C.) was added. After 4 minutes, Solution (III) and Solution (IV) shown in Table 3 were further added simultaneously at a constant flow rate over 30 minutes.

The mixture was washed with water and desalted by a usual method, 33 g of a lime-processed ossein gelatin and 50 mg of Chemical (B) described above were added, the pH and the pAg were adjusted to 6.2 and 7.8, respectively, optimal chemical sensitization was conducted at 68° C. by adding 4-hydroxy-6-methyl-1,3,3a,7-tetrazaindene and then adding sodium thiosulfate and chloroauric acid, and after adding Antifoggant (1) described above, 80 mg of Chemical (C) and 3 g of Chemical (D), the mixture was cooled. As a result, 635 g of a monodisperse cubic silver chlorobromide emulsion having an average grain size of 0.45 μm was obtained.

TABLE 3

|  | Solution (I) | Solution (II) | Solution (III) | Solution (IV) |
|---|---|---|---|---|
| AgNO$_3$ | 20.0 g | — | 80.0 g | — |
| NH$_4$NO$_3$ | 0.19 g | — | 0.19 g | — |
| KBr | — | 12.2 g | — | 42.0 g |
| NaCl | — | 2.6 g | — | 5.2 g |
|  | Water to make 120 ml | Water to make 120 ml | Water to make 225 ml | Water to make 225 ml |

Light-Sensitive Silver Halide Emulsion (3) (for green-sensitive emulsion layer)

To a well stirred aqueous gelatin solution (obtained by adding 20 g of gelatin, 0.5 g of potassium bromide, 5 g of sodium chloride and 15 mg of Chemical (A) described above to 690 ml of water and kept at 41° C.), Solution (I) and Solution (II) shown in Table 4 were added simultaneously at a constant flow rate over 8 minutes. After 10 minutes, Solution (III) and Solution (IV) shown in Table 4 were further added simultaneously at a constant flow rate over 32 minutes. One minute after completion of the addition of Solution (III) and Solution (IV), a methanol solution of a dye (containing 280 mg of Dye (d) shown below in 47 ml of methanol and kept at 30° C.) was added collectively.

The mixture was washed with water and desalted by a usual method, 22 g of a lime-processed ossein gelatin, 50 mg of Chemical (B) described above and 3 g of Chemical (D) described above were added, the pH and the pAg were-adjusted to 6.0 and 7.1, respectively, optimal chemical sensitization was conducted at 60° C. by adding 4-hydroxy-6-methyl-1,3,3a,7-tetrazaindene and then adding sodium thiosulfate, and after adding Antifoggant (1) shown below, the mixture was cooled. As a result, 635 g of a monodisperse cubic silver chlorobromide emulsion having an average grain size of 0.23 μm was obtained.

TABLE 4

|  | Solution (I) | Solution (II) | Solution (III) | Solution (IV) |
|---|---|---|---|---|
| $AgNO_3$ | 20.0 g | — | 80.0 g | — |
| $NH_4NO_3$ | 0.06 g | — | 0.06 g | — |
| KBr | — | 4.9 g | — | 22.6 g |
| NaCl | — | 4.5 g | — | 16.6 g |
| $K_2IrCl_4$ | — | 0.008 mg | — | — |
|  | Water to make 110 ml | Water to make 110 ml | Water to make 240 ml | Water to make 240 ml |

Dye (d):

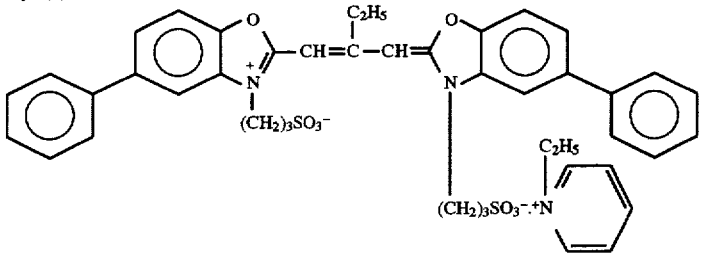

Light-Sensitive Silver Halide Emulsion (4) (for green-sensitive emulsion layer)

To a well stirred aqueous gelatin solution (obtained by adding 20 g of gelatin, 0.3 g of potassium bromide, 9 g of sodium chloride and 7.5 mg of Chemical (A) described above to 710 ml of water and kept at 63° C.), Solution (I) and Solution (II) shown in Table 5 were added simultaneously at a constant flow rate over 10 minutes. After 10 minutes, Solution (III) and Solution (IV) shown in Table 5 were further added simultaneously at a constant flow rate over 20 minutes. One minute after completion of the addition of Solution (III) and Solution (IV), a methanol solution of a dye (containing 170 mg of Dye (d) described above in 35 ml of methanol and kept at 46° C.) was added collectively.

The mixture was washed with water and desalted by a usual method, 33 g of a lime-processed ossein gelatin, 50 mg of Chemical (B) described above and 3 g of Chemical (D) described above were added, the pH and the pAg were adjusted to 6.0 and 7.2, respectively, optimal chemical sensitization was conducted at 60° C. by adding 4-hydroxy-6-methyl-1,3,3a,7-tetrazaindene and then adding sodium thiosulfate and chloroauric acid, and after adding Antifoggant (1) shown below, the mixture was cooled. As a result, 635 g of a monodisperse cubic silver chlorobromide emulsion having an average grain size of 0.45 μm was obtained.

TABLE 5

|  | Solution (I) | Solution (II) | Solution (III) | Solution (IV) |
|---|---|---|---|---|
| $AgNO_3$ | 25.0 g | — | 75.0 g | — |
| $NH_4NO_3$ | 0.06 g | — | 0.06 g | — |
| KBr | — | 6.2 g | — | 21.1 g |
| NaCl | — | 5.6 g | — | 15.5 g |
| $K_4[Fe(CN)_6]$ | — | — | — | 4 mg |
|  | Water to make 120 ml | Water to make 120 ml | Water to make 225 ml | Water to make 225 ml |

Light-Sensitive Silver Halide Emulsion (5) (for blue-sensitive emulsion layer)

To a well stirred aqueous gelatin solution (obtained by adding 20 g of gelatin, 0.5 g of potassium bromide, 5 g of sodium chloride and 15 mg of Chemical (A) described above to 690 ml of water and kept at 46° C.), Solution (I) and Solution (II) shown in Table 6 were added simultaneously at a constant flow rate over 8 minutes. After 10 minutes, Solution (III) and Solution (IV) shown in Table 6 were further added simultaneously at a constant flow rate over 18 minutes. One minute after completion of the addition of Solution (III) and Solution (IV), an aqueous solution of dyes (containing 225 mg of Dye (e) shown below and 225 mg of Dye (f) shown below in 95 ml of water and 5 ml of methanol and kept at 30° C.) was added collectively.

The mixture was washed with water and desalted by a usual method, 22 g of a lime-processed ossein gelatin, 50 mg of Chemical (B) described above and 3 g of Chemical (D) described above were added, the pH and the pAg were adjusted to 6.0 and 7.7, respectively, optimal chemical sensitization was conducted at 65° C. by adding 4-hydroxy-6-methyl-1,3,3a,7-tetrazaindene and then adding sodium thiosulfate, and after adding Antifoggant (1) shown below, the mixture was cooled. As a result, 635 g of a monodisperse cubic silver chlorobromide emulsion having an average grain size of 0.27 μm was obtained.

TABLE 6

|  | Solution (I) | Solution (II) | Solution (III) | Solution (IV) |
|---|---|---|---|---|
| $AgNO_3$ | 20.0 g | — | 80.0 g | — |
| $NH_4NO_3$ | 0.06 g | — | 0.06 g | — |
| KBr | — | 9.9 g | — | 45.0 g |
| NaCl | — | — | — | 7.6 g |
| $K_4[Fe(CN)_6]$ | — | — | — | 7 mg |
|  | Water to make 110 ml | Water to make 110 ml | Water to make 240 ml | Water to make 240 ml |

Dye (e):

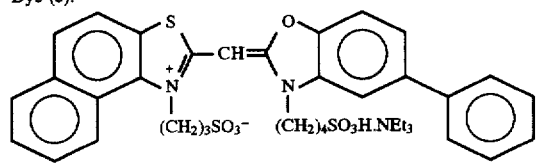

TABLE 6-continued

|  | Solution (I) | Solution (II) | Solution (III) | Solution (IV) |
|---|---|---|---|---|

Dye (f):

$$\underset{\underset{(CH_2)_4SO_3^-}{|}}{\overset{S}{\underset{N}{\bigodot}}}\!\!-\!\!CH\!=\!\!\!\underset{\underset{(CH_2)_4SO_3H\cdot NEt_3}{|}}{\overset{S}{\underset{N}{\bigodot}}}\!\!-\!\!Cl$$

Light-Sensitive Silver Halide Emulsion (6) (for blue-sensitive emulsion layer)

To a well stirred aqueous gelatin solution (obtained by adding 20 g of gelatin, 0.3 g of potassium bromide, 9 g of sodium chloride and 15 mg of Chemical (A) described above to 710 ml of water and kept at 59° C.), Solution (I) and Solution (II) shown in Table 7 were added simultaneously at a constant flow rate over 8 minutes. After 10 minutes, Solution (III) and Solution (IV) shown in Table 7 were further added simultaneously at a constant flow rate over 18 minutes. One minute after completion of the addition of Solution (III) and Solution (IV), an aqueous solution of dyes (containing 113 mg of Dye (e) described above and 113 mg of Dye (f) described above in 82 ml of water and 6 ml of methanol and kept at 40° C.) was added collectively.

The mixture was washed with water and desalted by a usual method, 33 g of a lime-processed ossein gelatin, 50 mg of Chemical (B) described above and 3 g of Chemical (D) described above were added, the pH and the pAg were adjusted to 6.0 and 7.7, respectively, optimal chemical sensitization was conducted at 65° C. by adding 4-hydroxy-6-methyl-1,3,3a,7-tetrazaindene and then adding sodium thiosulfate and chloroauric acid, and after adding Antifoggant (1) shown below, the mixture was cooled. As a result, 635 g of a monodisperse cubic silver chlorobromide emulsion having an average grain size of 0.47 μm was obtained.

TABLE 7

|  | Solution (I) | Solution (II) | Solution (III) | Solution (IV) |
|---|---|---|---|---|
| AgNO$_3$ | 20.0 g | — | 80.0 g | — |
| NH$_4$NO$_3$ | 0.06 g | — | 0.06 g | — |
| KBr | — | 10.0 g | — | 45.0 g |
| NaCl | — | 4.2 g | — | 5.5 g |
|  | Water to make 100 ml | Water to make 100 ml | Water to make 260 ml | Water to make 260 ml |

Light-Sensitive Material K101 shown in Table 8 was prepared using the followings.

TABLE 8

| Structure of Light-Sensitive Material 101 | | | |
|---|---|---|---|
| Layer No. | Name of Layer | Additives | Coated Amount (mg/m2) |
| Seventh Layer | Protective Layer II | Acid-processed gelatin | 340 |
|  |  | PMMA Latex (size 3 μm) | 13.3 |
|  |  | Colloid silver | 0.8 |
|  |  | Surfactant (3) | 15.8 |
|  |  | Fluorine Surfactant | 5 |
|  |  | Calcium nitrate | 6 |
| Sixth Layer | Protective Layer I | Lime-processed gelatin | 590 |
|  |  | Zinc hydroxide | 490 |
|  |  | Electron Donor (2) | 100 |
|  |  | Development Inhibitor Precursor | 18.8 |
|  |  | High Boiling Point Solvent (2) | 21 |
|  |  | High Boiling Point Solvent (3) | 21 |
|  |  | Dextran | 17 |
|  |  | Water-Soluble Polymer (1) | 3 |
|  |  | Polymer Latex (1) | 33 |
|  |  | Surfactant (4) | 18 |
|  |  | Surfactant (2) | 3 |
| Fifth Layer | Blue-Sensitive Emulsion Layer | Light-Sensitive Silver Halide Emulsion (5) | as Ag 440 |
|  |  | Light-Sensitive Silver Halide Emulsion (6) | 135 |
|  |  | Dye Donating Compound (4) | 300 |
|  |  | Gelatin | 631 |
|  |  | Electron Donor (1) | 130 |
|  |  | Electron Donor (3) | 17 |
|  |  | Electron Transfer Agent Precursor | 27 |
|  |  | Compound (1) | 6 |
|  |  | High Boiling Point Solvent (1) | 114 |
|  |  | High Boiling Point Solvent (2) | 114 |
|  |  | Surfactant (2) | 45 |
|  |  | Antifoggant (1) | 1.2 |
|  |  | Water-Soluble Polymer (1) | 23 |
| Fourth Layer | Interlayer | Lime-processed gelatin | 520 |
|  |  | Electron Donor (2) | 151 |
|  |  | Development Inhibitor | 29 |

TABLE 8-continued

| | | Structure of Light-Sensitive Material 101 | | |
|---|---|---|---|---|
| | | Precursor | | |
| | | High Boiling Point Solvent (2) | | 32 |
| | | High Boiling Point Solvent (3) | | 32 |
| | | Surfactant (2) | | 5 |
| | | Polymer Latex (1) | | 19 |
| | | Electron Transfer Agent | | 77 |
| | | Dextran | | 36 |
| | | Hardening Agent (1) | | 43 |
| | | Surfactant (4) | | 10 |
| | | Water-Soluble Polymer (1) | | 20 |
| | | Carboxymethyl cellulose | | 3 |
| | | Surfactant (1) | | 1.5 |
| Third Layer | Green-Sensitive Emulsion Layer | Light-Sensitive Silver Halide Emulsion (3) | as Ag | 280 |
| | | Light-Sensitive Silver Halide Emulsion (4) | | 110 |
| | | Dye Donating Compound (3) | | 366 |
| | | Lime-processed gelatin | | 460 |
| | | Electron Donor (1) | | 136 |
| | | Electron Donor (3) | | 6 |
| | | Electron Transfer Agent Precursor | | 34 |
| | | Compound (1) | | 6 |
| | | Compound (2) | | 46 |
| | | Compound (3) | | 46 |
| | | High Boiling Point Solvent (1) | | 46 |
| | | High Boiling Point Solvent (2) | | 183 |
| | | Antifoggant (1) | | 1.0 |
| | | Water-Soluble Polymer (1) | | 16 |
| | | Surfactant (2) | | 8 |
| | | Carboxymethyl cellulose | | 23.6 |
| Second Layer | Interlayer | Lime-processed gelatin | | 970 |
| | | Zinc hydroxide | | 800 |
| | | Electron Donor (2) | | 165 |
| | | Development Inhibitor Precursor | | 31 |
| | | High Boiling Point solvent (2) | | 35 |
| | | High Boiling Point Solvent (3) | | 35 |
| | | Surfactant (2) | | 5 |
| | | Dextran | | 28 |
| | | Water-Soluble Polymer (1) | | 5 |
| | | Polymer Latex (1) | | 55 |
| | | Surfactant (4) | | 30 |
| First Layer | Red-Sensitive Emulsion Layer | Light-Sensitive Silver Halide Emulsion (1) | as Ag | 145 |
| | | Light-Sensitive Silver Halide Emulsion (2) | | 80 |
| | | Dye Donating Compound (1) | | 188 |
| | | Dye Donating Compound (2) | | 128 |
| | | Lime-processed gelatin | | 322 |
| | | Electron Donor (1) | | 90 |
| | | Electron Transfer Agent Precursor | | 29 |
| | | Compound (1) | | 4 |
| | | Compound (2) | | 31 |
| | | Compound (3) | | 31 |
| | | High Boiling Point Solvent (1) | | 39 |
| | | High Boiling Point Solvent (2) | | 158 |
| | | Antifoggant (1) | | 0.7 |
| | | Water-Soluble Polymer (1) | | 12 |
| | | Surfactant (2) | | 22 |
| Support (1) | | Polyethylene-laminated paper support (thickness: 131 μm) | | |

Support (1)

| Name of Layer | Composition | | Layer Thickness (μm) |
|---|---|---|---|
| Surface Subbing Layer | Gelatin | | 0.1 |
| Surface PE Layer | Low-density polyethylene (density: 0.923): | 89.2 parts | 36.0 |

TABLE 8-continued

| Structure of Light-Sensitive Material 101 | | | |
|---|---|---|---|
| (glossy) | Surface-treated titanium oxide: | 10.0 parts | |
| Pulp Layer | Wood free paper (LBKP/NBKP = 1/1, density: 1.080) | | 64.0 |
| Back PE Layer (mat) | High-density polyethylene (density: 0.960) | | 31.0 |
| Back Subbing Layer | Gelatin | | 0.05 |
| | Colloidal Silica | | 0.05 |
| | Total | | 131.2 |

Surfactant (3):

$$NaO_3S-CHCOOCH_2CHC_4H_9$$
with $CH_2COOCH_2CHC_4H_9$ group, $C_2H_5$ branches Surfactant (4):

$C_9H_{19}$—⬡—$O(CH_2CH_2O)_n H$  
$n = 50$

Antifoggant (1):

benzimidazole with $CH_3SO_2NH$ substituent and $-SH$ group

Fluorine Surfactant:
$C_8F_{17}SO_2N(CH_2CH_2O)_nC_2H_8SO_3Na$  
with $C_3H_7$ branch, $n = 4.5$ Water-Soluble Polymer (1):
$+CH_2CH+$ with phenyl-$SO_3K$ side group Hardening Agent (1):
$CH_2=CHSO_2CH_2SO_2CH=CH_2$ Polymer Latex (1):
$+CH_2CH)_{0.475} +CH_2CH)_{0.04} +CH_2CH)_{0.385} +CH_2CH)_{0.05} +CH_2CH)_{0.05}$
with phenyl, phenyl-$CH_2Cl$, phenyl-$CH_2N^+(CH_3)$(piperidine), phenyl-$CH_2OH$, $+CH-CH_2)_n$ side groups $^-O_3S-CHCOOC_6H_{13}$
$\phantom{^-O_3S-}CH_2COOC_6H_{13}$ Light-Sensitive Materials K102 to K107 were prepared thoroughly in the same manner as Light-Sensitive Material K101 except for using a dye donating compound which releases the dye of the present invention, as a dye donating compound in the third layer.

TABLE 9

| Light-Sensitive Material | Dye Donating Compound | Remarks |
|---|---|---|
| K101 | Dye Donating Compound (3) | Comparison |
| K102 | Compound 41 | Invention |

TABLE 9-continued

| Light-Sensitive Material | Dye Donating Compound | Remarks |
|---|---|---|
| K103 | Compound 42 | Invention |
| K104 | Compound 43 | Invention |
| K105 | Compound 44 | Invention |
| K106 | Compound 45 | Invention |
| K107 | Compound 46 | Invention |

Preparation of the image receiving material is described below.

Image-Receiving Material R101 having a structure shown in Table 10 was prepared.

TABLE 10

Structure of Image-Receiving Material R101

| Number of Layer | Additives | Coating Amount (mg/m²) |
|---|---|---|
| Sixth Layer | Water-Soluble Polymer (1) | 130 |
| | Water-Soluble Polymer (2) | 35 |
| | Water-Soluble Polymer (3) | 45 |
| | Potassium nitrate | 20 |
| | Anionic Surfactant (1) | 6 |
| | Anionic Surfactant (2) | 6 |
| | Amphoteric Surfactant (1) | 50 |
| | Stain Inhibitor (1) | 7 |
| | Stain Inhibitor (2) | 12 |
| | Matting Agent (1) | 7 |
| Fifth Layer | Gelatin | 250 |
| | Water-Soluble Polymer (1) | 25 |
| | Anionic Surfactant (3) | 9 |
| | Hardening Agent (1) | 185 |
| Fourth Layer | Mordant (1) | 1,850 |
| | Water-Soluble Polymer (2) | 260 |
| | Water-Soluble Polymer (4) | 1,400 |
| | Latex Dispersion (1) | 600 |
| | Anionic Surfactant (3) | 25 |
| | Nonionic Surfactant (1) | 18 |
| | Guanidine picolinate | 2,550 |
| | Sodium quinolinate | 350 |
| Third Layer | Gelatin | 370 |
| | Mordant (1) | 300 |
| | Anionic Surfactant (3) | 12 |
| Second Layer | Gelatin | 700 |
| | Mordant (1) | 290 |
| | Water-Soluble Polymer (1) | 55 |
| | Water-Soluble Polymer (2) | 330 |
| | Anionic Surfactant (3) | 30 |
| | Anionic Surfactant (4) | 7 |
| | High Boiling Point Organic Solvent (1) | 700 |
| | Fluorescent Brightening Agent (1) | 30 |
| | Stain inhibitor (3) | 32 |
| | Guanidine picolinate | 360 |
| | Potassium quinolinate | 45 |
| First Layer | Gelatin | 280 |
| | Water-Soluble Polymer (1) | 12 |
| | Anionic Surfactant (1) | 14 |
| | Sodium metaborate | 35 |
| | Hardening Agent (1) | 185 |
| Support (2) | Polymethylene-laminated paper support (thickness: 215 μm) | |

Support (2)

| Name of Layer | Composition | Layer Thickness (μm) |
|---|---|---|
| Surface Subbing Layer | Gelatin | 0.1 |

TABLE 10-continued

Structure of Image-Receiving Material R101

| | | | |
|---|---|---|---|
| Surface PE Layer (glossy) | Low-density polyethylene (density: 0.923): | 90.2 parts | 36.0 |
| | Surface-treated titanium oxide: | 9.8 parts | |
| | Ultramarine: | 0.001 part | |
| Pulp Layer | Wood free paper (LBKP/NBSP = 6/4, density: 1.053) | | 152.0 |
| Back PE Layer (mat) | High-density polyethylene (density: 0.955) | | 27.0 |
| Back Subbing Layer | Styrene/acrylate copolmer Colloidal Silica Sodium polystyrenesulfonate | | 0.1 |
| Total | | | 215.2 |

Anionic Surfactant (1):

$$NaO_3S-\underset{\underset{C_2H_5}{|}}{\underset{|}{CHCOOCH_2CHC_4H_9}}$$
$$CH_2COOCH_2CHC_4H_9$$
$$|$$
$$C_2H_5$$

Anionic Surfactant (2):

$$C_8F_{17}SO_2NCH_2COOK$$
$$|$$
$$C_3H_7$$

Anionic Surfactant (3):

$$C_nH_{2n+1}-\langle\text{phenyl}\rangle-SO_3Na \quad n = 12.6$$

Anionic Surfactant (4):

$$\left[\left(\underset{O(CH_2)_4SO_3Na}{\underset{|}{C_9H_{19}}}\text{-Ar-}\underset{H_2}{C}\right)_x\left(\underset{OH}{\underset{|}{C_9H_{19}}}\text{-Ar-}\underset{H_2}{C}\right)_y\right]_m$$

x:y = 4:6
m = 6.8

Nonionic Surfactant (1):

$$C_9H_{19}-\langle\text{phenyl}\rangle-O(CH_2CH_2O)_nH \quad n = 85$$

Amphoteric Surfactant (1):

$$C_{13}H_{27}-\underset{}{\overset{O}{\underset{}{C}}}-\underset{H}{\underset{|}{N}}-CH_2CH_2CH_2-\underset{CH_3}{\underset{|}{\overset{CH_3}{\underset{|}{N^\oplus}}}}-CH_2COO^\ominus$$

Fluorescent Brightening Agent (1):

(benzoxazole-thiophene-benzoxazole structure)

TABLE 10-continued

Structure of Image-Receiving Material R101

Mordant (1):

[Polymer structure with three repeating units: 62.5 (N-vinylpyridine-like with pyridine ring), 31.25 (N-vinyl pyrrolidone-like with C=O), 6.25 (styrene with SO$_2$K group)]

Stain Inhibitor (1):

[Benzotriazole structure with NH]

Stain Inhibitor (2):

[1,3,4-thiadiazole structure: N=N, N-N, with SH and phenyl substituent]

Stain Inhibitor (3):

$$C_4H_9OC(CH_2)_2$$
$$\parallel$$
$$O$$
$$\diagdown$$
$$N-OH$$
$$\diagup$$
$$C_4H_9OC(CH_2)_2$$
$$\parallel$$
$$O$$

High-Boiling Point Organic Solvent (1):
$C_{26}H_{46.9}Cl_{7.1}$
Empara40 (produced by Ajinomoto Co., Inc.)

High-Boiling Point Organic Solvent (2):

[Phosphate ester structure: O=P with three phenoxy groups (3-n) and phenoxy-CH(CH$_3$)$_2$ groups (n); n = 3]

Water-Soluble Polymer (1):
Sumikagel L5-H (produced by Sumitomo Chemical Co., Ltd.)
Water-Soluble Polymer (2):
Dextran (molecular weight: 70,000)
Water-Soluble Polymer (3):
κ-Carrageenan (produced by Taito Co., Ltd.)
Water-Soluble Polymer (4):
MP Polymer MP-102 (produced by Kuraray Co., Ltd.)
Latex Dispersion (1):
LX-438 (produced by Nippon Zeon Co., Ltd.)
Matting Agent (1):
SYLOID79 (produced by Fuji Devison Co., Ltd.)

TABLE 10-continued

Structure of Image-Receiving Material R101

Hardening Agent (1):
$$CH_2CH—CH_2O(CH_2)_2OCH_2CHCH_2$$
$$\diagdown\diagup \qquad\qquad\qquad \diagdown\diagup$$
$$O \qquad\qquad\qquad\qquad\qquad O$$

A sharp color image was obtained by using a processed positive of Fuji Color Belvia on which a standard image was photographed using each of Light-Sensitive Materials K101 to K107, and Image-Receiving Material R101 by means of Pictrostat 300 manufactured by Fuji Photo Film Co., Ltd. For evaluation of the fastness to light, each image obtained was covered with an ultraviolet cut filter and allowed to stand in a xenon discoloration tester (weatherometer manufactured by ATLAS Co., Ltd.) for 10 days under intermittent light irradiation (intermittence cycle: irradiation of light of 85,000 lux: 3.8 hours, dark time: 1 hour). For evaluation of the fastness to humidity and heat, each image obtained was allowed to stand in an atmosphere of 80° C. and 70% RH for 10 days. Under the above two kinds of conditions, color image densities before and after aging were measured using a reflection densitometer (X-Rite 310TR, manufactured by X-Rite Co., Ltd.) and change in the magenta density was evaluated.

The results obtained are shown in Table 11.

TABLE 11

| | Density Immediately After Image | Density after 10 Days | | |
|---|---|---|---|---|
| Light-Sensitive Material | Formation Magenta in Monochromatic Area | Aging under Irradiation of Xe Light | Aging under High Temperature and High Humidity (80° C.–70% RH) | Remarks |
| K101 | 1.15 | 0.86 | 0.98 | Comparison |
| K102 | 1.19 | 1.02 | 1.07 | Invention |
| K103 | 1.21 | 1.03 | 1.06 | Invention |
| K104 | 1.08 | 0.93 | 1.03 | Invention |
| K105 | 1.12 | 0.94 | 1.05 | Invention |
| K106 | 1.11 | 0.95 | 1.02 | Invention |
| K107 | 1.10 | 0.92 | 1.03 | Invention |

As seen from the foregoing, the magenta dye image forming compounds of the present invention give an image having high fastness to light, heat and humidity.

EXAMPLE 2

Preparation of Light-Sensitive Silver Halide Emulsion
Light-Sensitive Silver Halide Emulsion (1) (for red-sensitive emulsion layer)

To a well stirred aqueous gelatin solution (obtained by adding 800 g of gelatin, 12 g of potassium bromide, 80 g of sodium chloride and 1.2 g of Compound (a) to 26.3 l of water and kept at 53° C.), Solution (I) shown in Table 12 was added at a constant flow rate over 9 minutes and Solution (II) was added at a constant flow rate starting from 10 seconds before the addition of Solution (I) over 19 minutes and 10 seconds. After 36 minutes, Solution (III) shown in Table 12 was added at a constant flow rate over 24 minutes and Solution (IV) was added simultaneously with Solution (III) at a constant flow rate over 25 minutes.

The mixture was washed with water and desalted by a usual method. 880 g of a lime-processed ossein gelatin and 2.8 g of Compound (b) were added, the pH was adjusted to 6.0, optimal chemical sensitization was conducted at 60° C. for 71 minutes by adding 12.8 g of a ribonucleic acid decomposed product and 32 mg of trimethylthiourea, and after adding in sequence 2.6 g of 4-hydroxy-6-methyl-1,3,3a,7-tetrazaindene, 3.2 g of Dye (a), 5.1 g of KBr and 2.6 of a stabilizer described below, the mixture was cooled. As a result, 28.1 kg of a monodisperse cubic silver chlorobromide emulsion having an average grain size of 0.35 μm was obtained.

minute after completion of the addition of Solution (III) and Solution (IV), 60 ml of a methanol solution of dyes (containing 360 mg of Dye (b1) and 73.4 mg of Dye (b2)) was added collectively.

The mixture was washed with water and desalted (performed using Precipitant (a) at a pH of 4.0) by a usual method, 22 g of a lime-processed ossein gelatin was added, the pH and the pAg were adjusted to 6.0 and 7.6, respectively, by adding NaCl and NaOH each in an appro-

TABLE 12

|  | Solution (I) | Solution (II) | Solution (III) | Solution (IV) |
|---|---|---|---|---|
| AgNO₃ | 1,200 g | — | 2,800 g | — |
| NH₄NO₃ | 2.5 g | — | 2.5 g | — |
| KBr | — | 546 g | — | 1,766 g |
| NaCl | — | 144 g | — | 96 g |
| K₂IrCl₆ | — | 3.6 mg | — | — |
|  | Water to make 6.5 l | Water to make 6.5 l | Water to make 10 l | Water to make 10 l |

Compound(a):

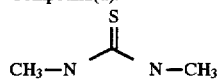

Compound (b):

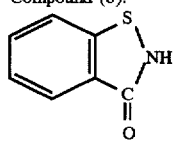

Dye (a):

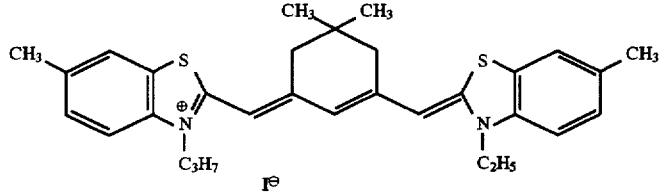

Light-Sensitive Silver Halide Emulsion (2) (for green-sensitive emulsion layer)

To a well stirred aqueous gelatin solution (obtained by adding 20 g of gelatin, 0.3 g of potassium bromide, 2 g of sodium chloride and 30 mg of Compound (a) to 600 ml of water and kept at 46° C.), Solution (I) and Solution (II) shown in Table 13 were added simultaneously at a constant flow rate over 9 minutes. After 5 minutes, Solution (III) and Solution (IV) shown in Table 13 were further added simultaneously at a constant flow rate over 32 minutes. One priate amount, optimal chemical sensitization was conducted at 60° C. by adding 1.8 mg of sodium thiosulfate and 180 mg of 4-hydroxy-6-methyl-1,3,3a,7-tetrazaindene, and after adding 90 mg of Antifoggant (1), the mixture was cooled. Further, 70 mg of Compound (b) and 3 ml of Compound (c) were added as antiseptics. As a result, 635 g of a monodisperse cubic silver chlorobromide emulsion having an average grain size of 0.30 μm was obtained.

TABLE 13

|  | Solution (I) | Solution (II) | Solution (III) | Solution (IV) |
|---|---|---|---|---|
| AgNO₃ | 10.0 g | — | 90.0 g | — |
| NH₄NO₃ | 0.06 g | — | 0.38 g | — |
| KBr | — | 3.50 g | — | 57.1 g |
| NaCl | — | 1.72 g | — | 3.13 g |
| K₂IrCl₆ | — | — | — | 0.03 mg |
|  | Water to make 126 ml | Water to make 131 ml | Water to make 280 ml | Water to make 289 ml |

TABLE 13-continued

| | Solution (I) | Solution (II) | Solution (III) | Solution (IV) |
|---|---|---|---|---|

Dye (b1):

[chemical structure]

Dye (b2):

[chemical structure]

Precipitant (a):

[chemical structure]

Antifoggant (1):

[chemical structure with NHCONHCH$_3$]

Compound (c):

[chemical structure with OCH$_2$CH$_2$OH]

Light-Sensitive Silver Halide Emulsion (3) (for blue-sensitive emulsion layer)

To a well stirred aqueous gelatin solution (obtained by adding 1.582 g of gelatin, 127 g of KBr and 660 mg of Compound (a) to 29.2 l of water and kept at 72° C.), Solution (I) and Solution (II) each having the composition shown in Table 14 were added such that Solution (I) was added after 10 seconds and each solution was added over 30 minutes. Two minutes after completion of the addition of Solution (I), Solution (V) was added. 5 minutes after completion of the addition of Solution (II), Solution (IV) was added, and 10 seconds after then, Solution (III) was added. Solution (III) was added over 27 minutes and 50 seconds and Solution (IV) was added over 28 minutes.

Thereafter, the mixture was washed with water and desalted (conducted using 32.4 g of Precipitant (b) at a pH of 3.9) by a usual method, and the pH and the pAg were adjusted to 6.1 and 8.4 by adding 1,230 g of a lime-processed ossein gelatin and 2.8 mg of Compound (b). Then optimal chemical sensitization was performed at 65° C. for about 70 minutes by adding 24.9 mg of sodium thiosulfate, and after adding 13.1 g of Dye (c) and 118 ml of Compound (c) in sequence, the mixture was cooled. The silver halide grains of the thus-obtained emulsion were a potato-shaped grain, the grain size was 0.53 μm, and the yield was 30.7 kg.

TABLE 14

|  | Solution (I) | Solution (II) | Solution (III) | Solution (IV) | Solution (V) |
|---|---|---|---|---|---|
| $AgNO_3$ | 939 g | — | 3,461 g | — | — |
| $NH_4NO_3$ | 3.4 g | — | 15.4 g | — | — |
| KBr | — | 572 g | — | 2,464 g | — |
| KI | — | — | — | — | 22.0 g |
|  | Water to make 6.69 l | Water to make 6.68 l | Water to make 9.70 l | Water to make 9.74 l | Water to make 4.40 l |

Precipitant (b):

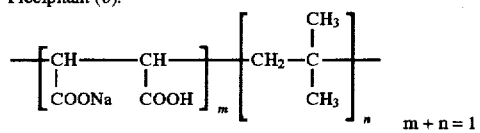

m + n = 1

Dye (c):

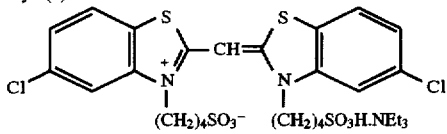

Preparation of the gelatin dispersion of Compound (d) is described below.

Compound (d), High Boiling Point Organic Solvent (1), Compound (f), Compound (g), Compound (h) and Surfactant (1) were weighed to 0.4 g, 1.2 g, 0.12 g, 0.25 g, 0.05 g and 0.2 g, respectively, and 9.5 ml of ethyl acetate was added thereto and dissolved under heating at about 60° C. to obtain a uniform solution. The resulting solution and 29.1 g of a 18% solution of a lime-processed gelatin were mixed while stirring and dispersed in a homogenizer for 10 minutes at 10,000 rpm. After the dispersion, 18.5 ml of water for dilution was added. The dispersion solution obtained was designated as the dispersion of Compound (d).

Compound (d):

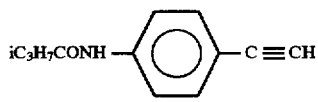

High Boiling Point Organic Solvent (1):

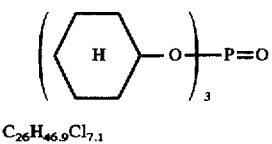

Compound (f): $C_{26}H_{46.9}Cl_{7.1}$

Compound (g):

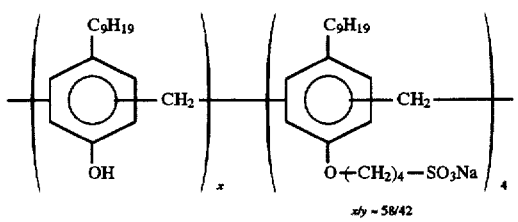

x/y = 58/42

Surfactant (1):

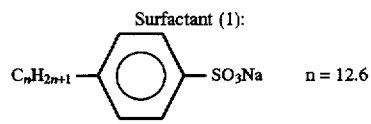

n = 12.6

-continued

Compound (h):

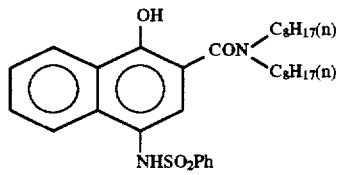

The preparation method of the dispersion of zinc hydroxide is described below.

To 100 ml of a 4% aqueous gelatin solution, 12.5 g of zinc hydroxide having an average particle size of 0.2 μm, 1 g of carboxymethyl cellulose as a dispersant and 0.1 g of sodium polyacrylate were added, and the mixture was ground in a mill using glass beads having an average particle size of 0.75 mm for 30 minutes. The glass beads were separated and a dispersion of zinc hydroxide was obtained.

Preparation of a gelatin dispersion of a dye donating compound is described below.

Cyan Dye Donating Compound (A1), Cyan, Dye Donating Compound (A2), Surfactant (1), Compound (h), Compound (i), High Boiling Point Organic Solvent (1) and High Boiling Point Organic Solvent (2) were weighed to 7.3 g, 11.0 g, 0.8 g, 1 g, 2.2 g, 7 g and 3 g, respectively, and 26 ml of ethyl acetate and 1.2 ml of water were added thereto and dissolved under heating at about 60° C. to obtain a uniform solution. The resulting solution, 65 g of a 16% solution of a lime-processed gelatin and 87 ml of water were mixed while stirring and dispersed in a homogenizer for 10 minutes at 10,000 rpm. After the dispersion, 216 ml of water for dilution was added. The resulting dispersion solution was designated as the dispersion of a cyan dye donating compound.

Cyan Dye Donating Compound (A1)

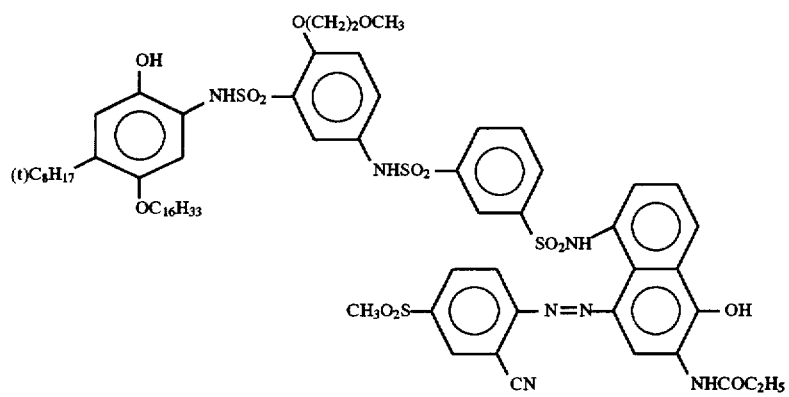

Cyan Dye Donating Compound (A2)

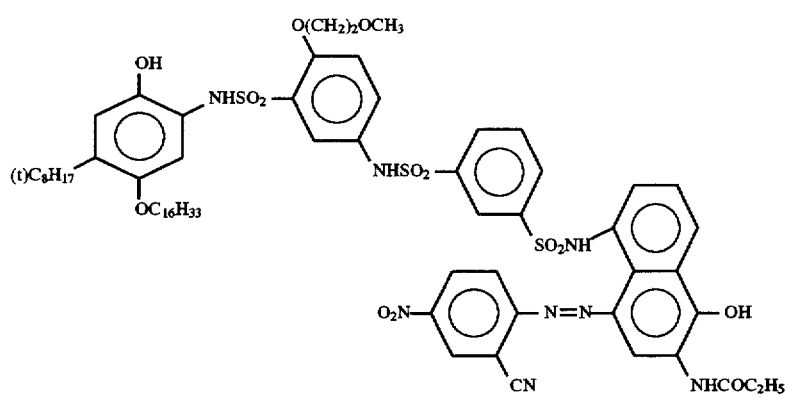

Compound (i)

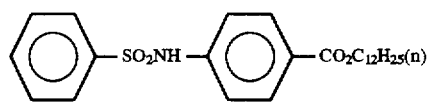

High Boiling Point Solvent (2)

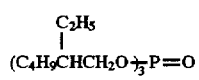

Magenta Dye Donating Compound (B), Compound (m), Compound (h), Surfactant (1) and High Boiling Point Organic Solvent (2) were weighed to 4.50 g, 0.05 g, 0.05 g, 0.094 g and 2.25 g, respectively, and 10 ml of ethyl acetate was added thereto and dissolved under heating at about 60° C. to obtain a uniform solution. The resulting solution, 15.2 g of a 16% solution of a lime-processed gelatin and 23.5 ml of water were mixed while stirring and dispersed in a homogenizer for 10 minutes at 10,000 rpm. Thereafter, 42 ml of water for dilution was added. The resulting dispersion solution was designated as the dispersion of a magenta dye donating compound.

Magenta Dye Donating Compound (B):

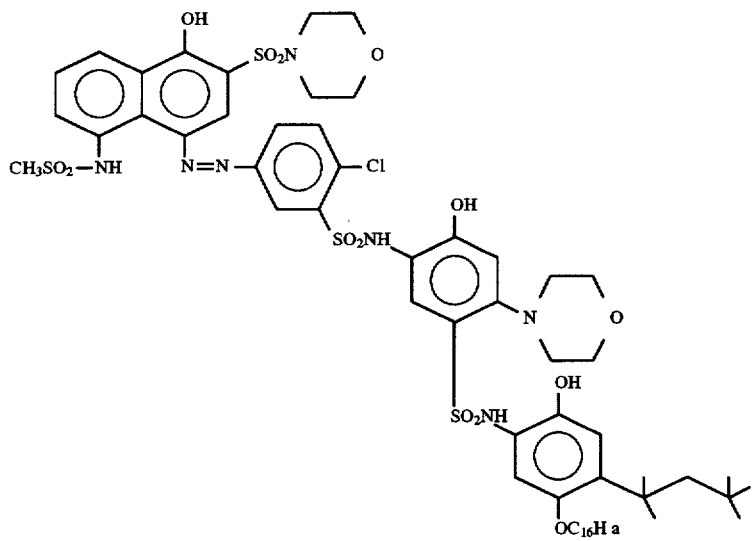

Compound (m):

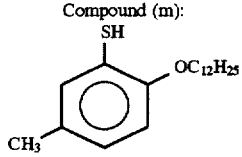

Yellow Dye Donating Compound (C), Compound (d), Compound (h), Surfactant (1), Compound (j), Compound (k) and High Boiling Point Organic Solvent (1) were weighed to 15 g, 2.3 g, 0.9 g, 0.88 g, 3.9 g, 1.9 g and 16.9 g, respectively, and 49 ml of ethyl acetate was added thereto and dissolved under heating at about 60° C. to obtain a uniform solution. The resulting solution, 63.5 g of a 16% solution of a lime-processed gelatin and 103 ml of water were mixed while stirring and dispersed in a homogenizer for 10 minutes at 10,000 rpm. Thereafter, 94 ml of water for dilution was added. The resulting dispersion solution was designated as the dispersion of a yellow dye-donating Compound.

Yellow Dye Donating Compound (C):

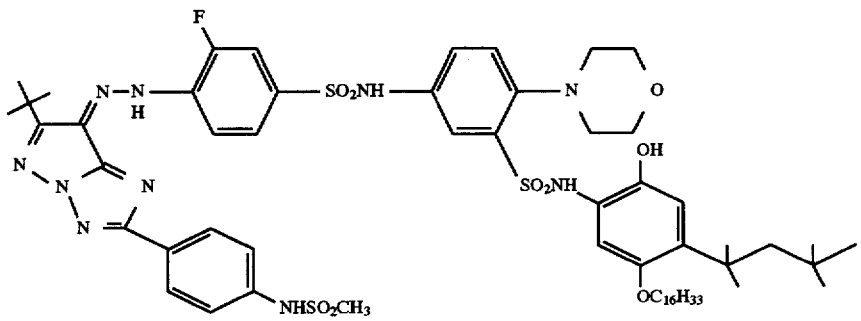

Compound (j)

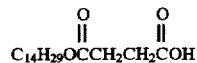

Compound (k)

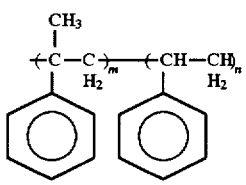

Using these, Heat-Developable Light-Sensitive Material K201 was prepared to have a structure shown in Tables 18, 19 and 20.

TABLE 15

Structure of Light-Sensitive Material
(Light-Sensitive Material 101)

| Layer No. | Name of Layer | Additives | | Coated Amount (g/m2) |
|---|---|---|---|---|
| Seventh Layer | Protective Layer | Acid-processed gelatin | | 0.387 |
| | | PMMA Matting agent | | 0.017 |
| | | Surfactant (2) | | 0.006 |
| | | Surfactant (3) | | 0.016 |
| Sixth Layer | Interlayer | Gelatin | | 0.763 |
| | | Zn(OH)$_2$ | | 0.558 |
| | | Surfactant (3) | | 0.002 |
| | | Compound (d) | | 0.036 |
| | | Compound (f) | | 0.011 |
| | | Compound (g) | | 0.022 |
| | | Compound (h) | | 0.005 |
| | | High Boiling Point Organic Solvent (1) | | 0.107 |
| | | Ca(NO$_3$)$_2$ | | 0.012 |
| | | Surfactant (1) | | 0.022 |
| | | Water-Soluble Polymer (1) | | 0.003 |
| Fifth Layer | Blue-sensitive Layer | Silver Halide Emulsion (3) | as Ag | 0.399 |
| | | Gelatin | | 0.532 |
| | | Yellow Dye Donating Compound (c) | | 0.348 |
| | | Compound (d) | | 0.054 |
| | | Compound (h) | | 0.021 |
| | | Compound (j) | | 0.091 |
| | | Compound (k) | | 0.045 |
| | | High Boiling Point Organic Solvent (1) | | 0.391 |
| | | Surfactant (1) | | 0.021 |
| | | Water-Soluble Polymer (1) | | 0.006 |
| Fourth Layer | Interlayer | Gelatin | | 0.467 |
| | | Zn(OH)$_2$ | | 0.341 |
| | | Surfactant (3) | | 0.001 |
| | | Compound (d) | | 0.022 |
| | | Compound (f) | | 0.007 |
| | | Compound (g) | | 0.014 |
| | | Compound (h) | | 0.003 |
| | | High Boiling Point Organic Solvent (1) | | 0.066 |
| | | Ca(NO$_3$)$_2$ | | 0.008 |
| | | Surfactant (1) | | 0.014 |
| | | Water-Soluble Polymer (1) | | 0.002 |
| Third Layer | Green-Sensitive Layer | Silver Halide Emulsion (2) | as Ag | 0.234 |
| | | Gelatin | | 0.311 |
| | | Magenta Dye Donating Compound (B) | | 0.357 |
| | | Compound (m) | | 0.004 |
| | | Compound (h) | | 0.004 |
| | | High Boiling Point Organic Solvent (2) | | 0.178 |
| | | Surfactant (1) | | 0.010 |
| | | Water-Soluble Polymer (1) | | 0.008 |
| Second Layer | Interlayer | Gelatin | | 0.513 |
| | | Surfactant (4) | | 0.069 |

TABLE 15-continued

Structure of Light-Sensitive Material
(Light-Sensitive Material 101)

| | | | | |
|---|---|---|---|---|
| | | Surfactant (3) | | 0.007 |
| | | Compound (d) | | 0.022 |
| | | Compound (f) | | 0.007 |
| | | Compound (g) | | 0.014 |
| | | Compound (h) | | 0.003 |
| | | High Boiling Point Organic Solvent (1) | | 0.066 |
| | | Ca(NO$_3$)$_2$ | | 0.004 |
| | | Water-Soluble Polymer (1) | | 0.020 |
| First Layer | Red-Sensitive Layer | Silver Halide Emulsion (I) | as Ag | 0.160 |
| | | Gelatin | | 0.294 |
| | | Cyan Dye Donating Compound (A1) | | 0.141 |
| | | Cyan Dye Donating Compound (A2) | | 0.211 |
| | | Compound (i) | | 0.041 |
| | | Compound (h) | | 0.020 |
| | | High Boiling Point Organic Solvent (1) | | 0.060 |
| | | High Boiling Point Organic Solvent (2) | | 0.138 |
| | | Surfactant (1) | | 0.015 |
| | | Water-Soluble Polymer (1) | | 0.017 |
| | | Stabilizer | | 0.005 |
| | | Hardening agent | | 0.035 |
| Support (1) | | Polyethylene-laminated paper support (thickness: 131 μm) | | |

Support (1)

| Name of Layer | Composition | | Layer Thickness (μm) |
|---|---|---|---|
| Surface Subbing Layer | Gelatin | | 0.1 |
| Surface PE Layer (glossy) | Low-density polyethylene (density: 0.923): | 89.2 parts | 36.0 |
| | Surface-treated titanium oxide: | 10.0 parts | |
| | Ultramarine: | 0.8 part | |
| Pulp Layer | Wood free paper (LBKP/NBKP = 1/1, density: 1.080) | | 64.0 |
| Back PE Layer (mat) | High-density polyethylene (density: 0.960) | | 31.0 |
| Back Subbing Layer | Gelatin | | 0.05 |
| | Colloidal Silica | | 0.05 |
| Total | | | 131.2 |

Surfactant (2):
C$_8$F$_{17}$SO$_2$NCH$_2$CH$_2$O(CH$_2$CH$_2$O)$_n$H
       |                           n = 15
      C$_3$H$_7$ Surfactant (3):
Aerosol OT

TABLE 15-continued

Structure of Light-Sensitive Material
(Light-Sensitive Material 101)

Surfactant (4):

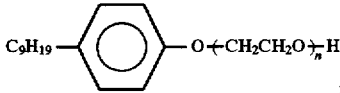

n = 20

Water-Soluble Polymer (1):

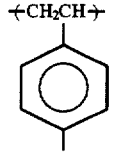

Hardening Agent (1):

$CH_2=CHSO_2CH_2SO_2CH=CH_2$

Stabilizer:

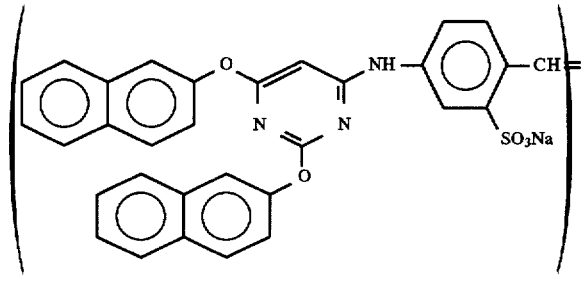

Light-Sensitive Materials K202 to K207 were prepared thoroughly in the same manner as Light-Sensitive Material K201 except for using a dye donating compound which releases the dye of the present invention, as a magenta dye donating compound in the third layer.

TABLE 16

| Light-Sensitive Material | Dye Donating Compound | Remarks |
|---|---|---|
| K201 | Magenta Dye Donating Compound (B) | Comparison |
| K202 | Compound 48 | Invention |
| K203 | Compound 49 | Invention |
| K204 | Compound 51 | Invention |
| K205 | Compound 52 | Invention |
| K206 | Compound 54 | Invention |
| K207 | Compound 55 | Invention |

A sharp color image was obtained by using a processed negative of Fuji Color Super G400ACE on which a standard image was photographed using each of Light-Sensitive Materials K201 to K207, and Image-Receiving Material R101 by means of Pictrostat 330 manufactured by Fuji Photo Film Co., Ltd. Each color image obtained was examined in the same manner as in Example 1 and almost the same results as in Example were obtained. The results obtained are shown in Table 17.

TABLE 17

| Light-Sensitive Material | Density Immediately After Image Formation Magenta in Monochromatic Area | Density after 10 Days | | Remarks |
|---|---|---|---|---|
| | | Aging under Irradiation of Xe Light | Aging under High Temperature and High Humidity (80° C.–70% RH) | |
| K201 | 1.25 | 0.93 | 1.09 | Comparison |
| K202 | 1.24 | 1.07 | 1.12 | Invention |
| K203 | 1.15 | 0.98 | 1.06 | Invention |
| K204 | 1.31 | 1.10 | 1.21 | Invention |
| K205 | 1.20 | 1.00 | 1.08 | Invention |
| K206 | 1.21 | 0.95 | 1.00 | Invention |
| K207 | 1.19 | 0.94 | 1.03 | Invention |

EXAMPLE 3

Preparation of light-sensitive silver halide emulsions is described below.

Light-Sensitive Silver Halide Emulsion (1) (emulsion for the fifth layer (680 nm light-sensitive layer))

To an aqueous solution having a composition shown in Table 18 under well stirring, Solution (I) and Solution (II) each having a composition shown in Table 19 were simultaneously added over 13 minutes, and 10 minutes after then, Solution (III) and Solution (IV) each having a composition shown in Table 19 were added over 33 minutes.

TABLE 18

| Composition | |
|---|---|
| H₂O | 620 ml |
| Lime-processed gelatin | 20 g |
| KBr | 0.3 g |
| NaCl | 2 g |
| Silver Halide Solvent (1) | 0.030 g |
| Nitric Acid (1N) | 16 ml |
| Temperature | 45° C. |

TABLE 19

| | Solution (I) | Solution (II) | Solution (III) | Solution (IV) |
|---|---|---|---|---|
| AgNO₃ | 30.0 g | — | 70.0 g | — |
| KBr | — | 13.7 g | — | 44.2 g |
| NaCl | — | 3.62 g | — | 2.4 g |
| K₂IrCl₆ | — | — | — | 0.039 mg |
| Total | Water to make 126 ml | Water to make 132 ml | Water to make 254 ml | Water to make 252 ml |

Silver Halide Solvent (1):

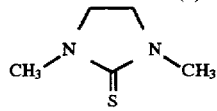

Further, 13 minutes after initiation of the addition of Solution (III), 150 ml of an aqueous solution containing 0.350% of Sensitizing Dye (a) was added over 27 minutes.

Sensitizing Dye (a):

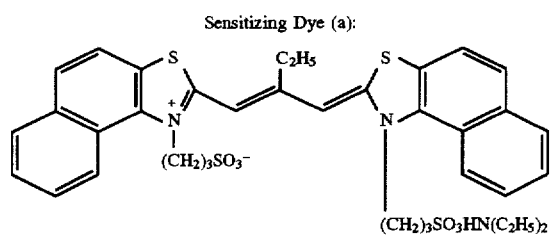

The mixture was washed with water and desalted (performed using Precipitant (a) at a pH of 4.1) by a usual method, the pH and the pAg were adjusted to 6.0 and respectively by adding 22 g of a lime-processed ossein gelatin, and chemical sensitization was performed at 60° C. The compounds used in the chemical sensitization are shown in Table 20. The resulting emulsion in a yield of 630 was a monodisperse cubic silver chlorobromide emulsion having coefficient of variation of 10.2% and an average grain size of 0.2 μm.

Precipitant (a):

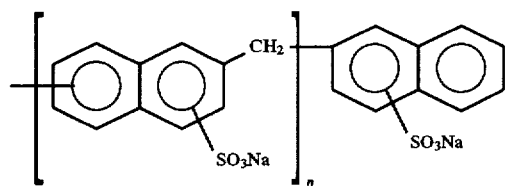

Precipitant (b):

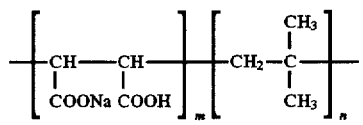

TABLE 20

| Chemicals used in Chemical Sensitization | Amount added |
|---|---|
| 4-Hydroxy-6-methyl-1,3,3a,7-tetrazaindene | 0.36 g |
| Sodium thiosulfate | 6.75 mg |
| Antifoggant (1) | 0.11 g |
| Antiseptic (1) | 0.07 g |
| Antiseptic (2) | 3.13 g |

Antifoggant (1):

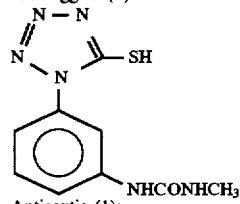

Antiseptic (1):

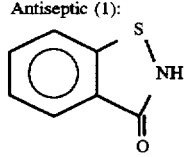

TABLE 20-continued

| Chemicals used in Chemical Sensitization | Amount added |
|---|---|

Antiseptic (2):

OCH$_2$CH$_2$OH

Antiseptic (3):

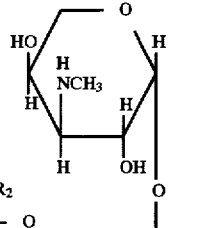

| $R_1$ | $R_2$ | |
|---|---|---|
| H$_3$C— | —NHCH$_3$ | |
| H$_3$C— | —NH$_2$ | Mixture |
| H— | —NH$_2$ | |
| H— | —NHCH$_3$ | |

Light-Sensitive Silver Halide Emulsion (2) (emulsion for the third layer (750 nm light-sensitive layer))

To an aqueous solution having a composition shown in Table 21 under well stirring, Solution (I) and Solution (II) each having a composition shown in Table 22 were simultaneously added over 18 minutes, and 10 minutes after then, Solution (III) and Solution (IV) each having a composition shown in Table 22 were added over 24 minutes.

TABLE 21

| Composition | |
|---|---|
| H$_2$O | 620 ml |
| Lime-processed gelatin | 20 g |
| KBr | 0.3 g |
| NaCl | 2 g |
| Silver Halide Solvent (1) | 0.030 g |
| Nitric Acid (1N) | 16 ml |
| Temperature | 45° C. |

TABLE 22

| | Solution (I) | Solution (II) | Solution (III) | Solution (IV) |
|---|---|---|---|---|
| AgNO$_3$ | 30.0 g | — | 70.0 g | — |
| KBr | — | 13.7 g | — | 44.2 g |
| NaCl | — | 3.62 g | — | 2.4 g |
| K$_4$[Fe(CN)$_6$]·H$_2$O | — | — | — | 0.07 g |
| K$_2$IrCl$_6$ | — | — | — | 0.040 mg |

TABLE 22-continued

|  | Solution (I) | Solution (II) | Solution (III) | Solution (IV) |
|---|---|---|---|---|
| Total | Water to make 188 ml | Water to make 188 ml | Water to make 250 ml | Water to make 250 ml |

The mixture was washed with water and desalted (performed using Precipitant (b) at a pH of 3.9) by a usual method. 22 g of a lime-processed ossein gelatin subjected to removal of calcium (calcium content: 150 ppm or lower) was added and re-dispersed at 40° C., 0.39 g of 4-hydroxy-6-methyl-1,3,3a,7-tetrazaindene was added, and the pH and the pAg were adjusted to 5.9 and 7.8, respectively. Thereafter, chemical sensitization was performed at 70° C. using chemicals shown in Table 23. At the final of chemical sensitization. Sensitizing Dyes (2) and (3) as a methanol solution (solution having a composition shown in Table 24) were added. Further, after chemical sensitization, the temperature was lowered to 40° C., 200 g of a gelatin dispersion of Stabilizer (1) shown below was added and well stirred, and then the mixture was stored. The resulting emulsion in a yield of 938 g was a monodisperse cubic silver chlorobromide emulsion having a coefficient of variation of 12.6% and an average grain size of 0.25 μm.

TABLE 23

| Chemicals used in Chemical Sensitization | Amount added |
|---|---|
| 4-Hydroxy-6-methyl-1,3,3a,7-tetrazaindene | 0.39 g |
| Triethylthiourea | 3.3 mg |
| Nucleic acid decomposition product | 0.39 g |
| NaCl | 0.15 g |
| KI | 0.12 g |
| Antistatic Agent (2) | 0.10 g |
| Antiseptic (1) | 0.07 g |

TABLE 24

| Composition of Dye Solution | Amount added |
|---|---|
| Sensitizing Dye (2) | 0.12 g |
| Sensitizing Dye (3) | 0.06 g |
| p-Toluene sulfonic acid | 0.71 g |
| Methanol | 18.7 ml |

Antifoggant (2):

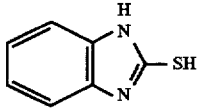

Sensitizing Dye (2):

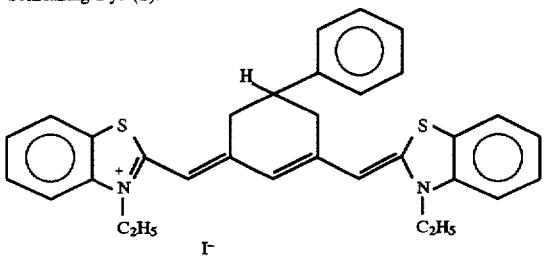

TABLE 24-continued

| Composition of Dye Solution | Amount added |
|---|---|

Sensitizing Dye (3):

Stabilizer (1):

Light-Sensitive Silver Halide Emulsion (3) (emulsion for the first layer (810 nm light-sensitive layer))

To an aqueous solution having a composition shown in Table 25 under well stirring, Solution (I) and Solution (II) each having a composition shown in Table 26 were simultaneously added over 18 minutes, and 10 minutes after then, Solution (III) and Solution (IV) each having a composition shown in Table 26 were added over 24 minutes.

TABLE 25

| Composition | |
|---|---|
| $H_2O$ | 620 ml |
| Lime-processed gelatin | 20 g |
| KBr | 0.3 g |
| NaCl | 2 g |
| Silver Halide Solvent (1) | 0.030 g |
| Nitric Acid (1N) | 16 ml |
| Temperature | 50° C. |

TABLE 26

|  | Solution (I) | Solution (II) | Solution (III) | Solution (IV) |
|---|---|---|---|---|
| $AgNO_3$ | 30.0 g | — | 70.0 g | — |
| KBr | — | 13.7 g | — | 44.1 g |
| NaCl | — | — | — | 2.4 g |
| $K_2IrCl_6$ | — | — | — | 0.020 mg |
|  | Water to make 180 ml | Water to make 180 ml | Water to make 242 ml | Water to make 250 ml |

The mixture was washed with water and desalted (performed using Precipitant (a) at a pH of 3.8) by a usual method. 22 g of a lime-processed ossein gelatin was added, the pH and the pAg were adjusted to 7.4 and 7.8, respectively, and chemical sensitization was performed at 60° C. The chemicals used in the chemical sensitization are shown in Table 27. The resulting emulsion in a yield of 680 g was a monodisperse cubic silver chlorobromide emulsion having a coefficient of variation of 9.7% and an average grain size of 0.32 μm.

TABLE 27

| Chemicals used in Chemical Sensitization | Amount added |
|---|---|
| 4-Hydroxy-6-methyl-1,3,3a,7-tetrazaindene | 0.38 g |
| Triethylthiourea | 3.10 mg |
| Antifoggant (2) | 0.19 g |
| Antiseptic (1) | 0.07 g |
| Antiseptic (2) | 3.13 g |

The preparation method of a gelatin dispersion of colloid silver is described below.

To a well stirred aqueous solution having a composition shown in Table 28, a solution having a composition shown in Table 29 was added over 24 minutes. Thereafter, the mixture was washed with water using Precipitant (a) and then 43 g of a lime-processed ossein gelatin was added to adjust the pH to 6.3. The average grain size was 0.02 μm and the yield was 512 g (dispersion containing 2% of silver and 6.8% of gelatin).

TABLE 28

| Composition | |
|---|---|
| H$_2$O | 620 ml |
| Dextrin | 16 g |
| NaOH (5N) | 41 ml |
| Temperature | 30° C. |

TABLE 29

| Composition | |
|---|---|
| H$_2$O | 135 ml |
| AgNO$_3$ | 17 g |

The preparation method of a gelatin dispersion of each hydrophobic additive is described below.

A gelatin dispersion of each of a yellow dye donating compound, a magenta dye donating compound and a cyan dye donating compound was prepared according to the formulation in Table 30. More specifically, each oil phase component was dissolved under heating at about 70° C. to form a uniform solution, an aqueous phase component heated at about 60° C. was added to the solution, and the components were mixed under stirring and then dispersed in a homogenizer for 10 minutes at 10,000 rpm. Water was added thereto and the mixture was stirred to obtain a homogenous dispersion. Further, the gelatin dispersion of the cyan dye donating compound was subjected to repetition of dilution with water and concentration using an ultrafiltration module (Ultrafiltration Module ACV-3050, manufactured by Asahi Chemical Industry Co., Ltd.) to reduce the weight of ethyl acetate to 1/17.6 of the weight of ethyl acetate in Table 30.

TABLE 30

| | Composition of Dispersion | | |
|---|---|---|---|
| | Yellow | Magenta | Cyan |
| Oil phase | | | |
| Cyan Dye Donating Compound (1) | — | — | 7.3 g |
| Cyan Dye Donating Compound (2) | — | — | 10.7 g |
| Magenta Dye Donating Compound (1) | — | 18.1 g | — |
| Yellow Dye Donating Compound (1) | 12.3 g | — | — |
| Reducing Agent (1) | 0.9 g | 0.2 g | 1.0 g |
| Antifoggant (3) | 0.1 g | — | 0.2 g |
| Antifoggant (4) | — | 0.7 g | — |
| Surfactant (1) | 1.1 g | — | — |
| High Boiling Point Solvent (1) | 6.2 g | 25.1 g | 4.6 g |
| High Boiling Point Solvent (2) | — | — | 4.9 g |
| High Boiling Point Solvent (3) | — | — | 1.2 g |
| Dye (a) | 1.1 g | — | 0.5 g |
| Water | 0.4 ml | — | — |
| Ethyl Acetate | 9.6 ml | 50.1 ml | 55.2 ml |
| Aqueous phase | | | |
| Lime-processed gelatin | 10.0 g | 10.0 g | 10.0 g |
| Calcium nitrate | 0.1 g | 0.1 g | — |
| Surfactant (1) | — | 0.2 g | 0.8 g |
| Sodium hydroxide aq. soln. (1N) | — | 1.9 ml | — |
| Carboxymethyl cellulose | — | — | 0.3 g |
| Water | 26.1 ml | 139.7 ml | 95.9 ml |
| Water added | 99.9 ml | 157.3 ml | 209.0 ml |
| Antiseptic (1) | 0.004 g | 0.04 g | 0.1 g |

A gelatin dispersion of Reducing Agent (2) was prepared according to the formulation in Table 31. More specifically, each oil phase component was dissolved under heating at about 60° C., an aqueous phase component heated at about 60° C. was added to the solution, and the components was mixed under stirring and then dispersed in a homogenizer for 10 minutes at 10,000 rpm to obtain a homogenous dispersion. From the resulting dispersion, ethyl acetate was removed using a vacuum organic solvent-removing apparatus.

TABLE 31

| Composition of Dispersion | |
|---|---|
| Oil phase | |
| Reducing Agent (2) | 7.5 g |
| High Boiling Point Solvent (1) | 4.7 g |
| Surfactant (1) | 1.9 g |
| Ethyl Acetate | 14.4 ml |
| Aqueous phase | |
| Acid-processed gelatin | 10.0 g |
| Antiseptic (1) | 0.02 g |
| Antiseptic (3) | 0.04 g |
| Sodium hydrogensulfite | 0.1 g |
| Water | 136.7 ml |

A gelatin dispersion of Stabilizer (1) was prepared according to the formulation in Table 32. More specifically, each oil phase component was dissolved at room temperature, an aqueous phase component heated at about 40° C. was added to the solution, and the components were mixed while stirring and dispersed in a homogenizer for 10 minutes at 10,000 rpm. Water was added thereto and stirred to obtain a homogenous dispersion.

TABLE 32

| Composition of Dispersion | |
|---|---|
| Oil phase | |
| Stabilizer (1) | 4.0 g |
| Sodium hydroxide | 0.3 g |
| Methanol | 62.8 g |
| High Boiling Point Solvent (4) | 0.9 g |
| Aqueous phase | |
| Gelatin subjected to removal of calcium (Ca content: 100 ppm or less) | 10.0 g |
| Antiseptic (1) | 0.04 g |
| Water | 320.5 ml |

A gelatin dispersion of zinc hydroxide was prepared according to the formulation in Table 33. More specifically, respective components were mixed, dissolved and dispersed for 30 minutes in a mill using glass beads having an average particle size of 0.75 mm. The glass beads were separated and removed to obtain a homogenous dispersion. (Zinc hydroxide used had an average particle size of 0.25 μm.)

TABLE 33

| Composition of Dispersion | |
|---|---|
| Zinc hydroxide | 15.9 g |
| Carboxy methyl cellulose | 0.7 g |
| Sodium polyacrylate | 0.07 g |
| Lime-processed gelatin | 4.2 g |
| Water | 100 ml |
| High Boiling Point Solvent (4) | 0.4 g |

The preparation method of a gelatin dispersion of a matting agent added to the protective layer is described below. PMMA was dissolved in methylene chloride and the resulting solution was added to gelatin together with a slight amount of a surfactant and dispersed while stirring at a high revolution speed. Then, methylene chloride was removed using a vacuum solvent-removing apparatus and a homogenous dispersion having an average particle size of 4.3 μm was obtained.

Cyan Donating Compound (1):

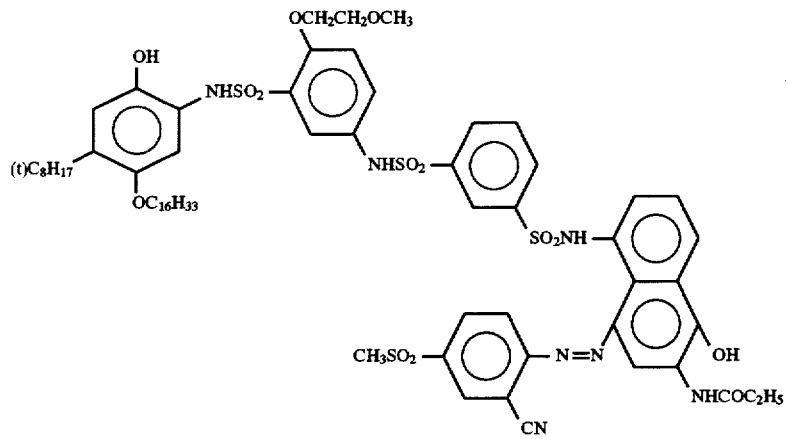

Cyan Donating Compound (2):

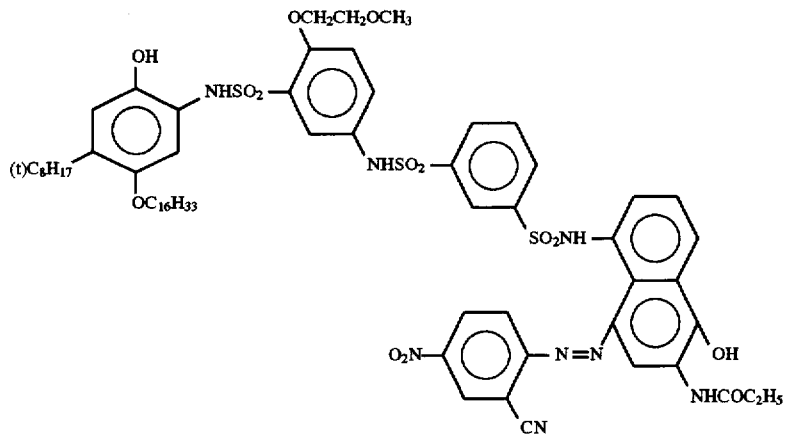

-continued
Magenta Dye Donating Compound (1):
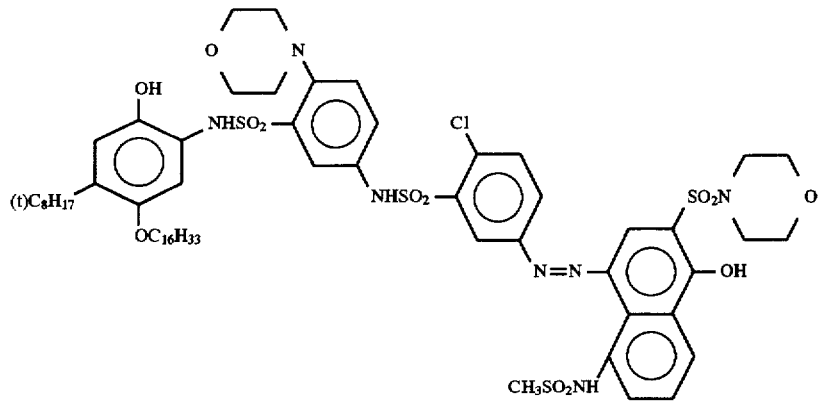
Yellow Dye Donation Compound (1):
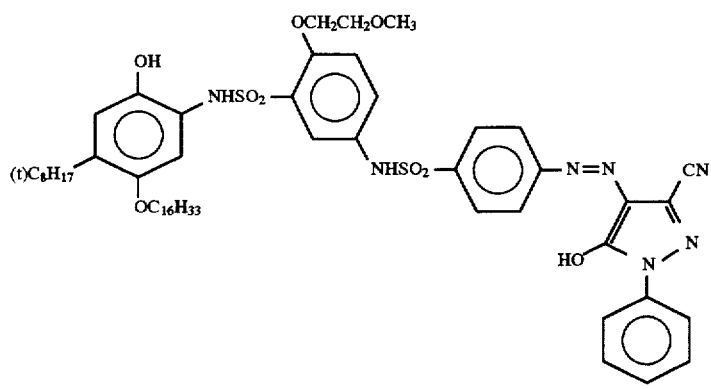
Reducing Agent (1):
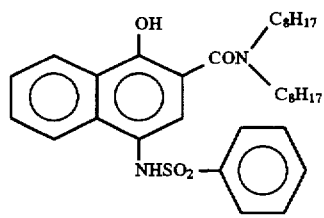
Antifoggant (3):
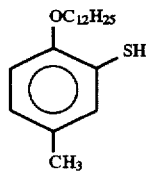
Antifoggant (4):
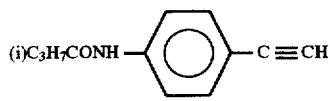
Surfactant (1):
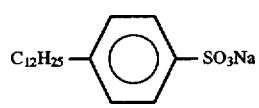

High Boiling Point Solvent (1):

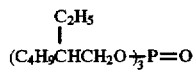

High Boiling Point Solvent (2):

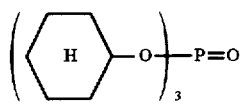

High Boiling Point Solvent (3):

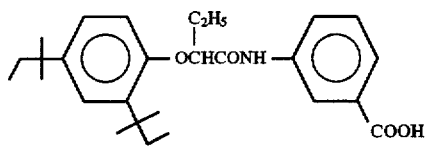

Dye (a):

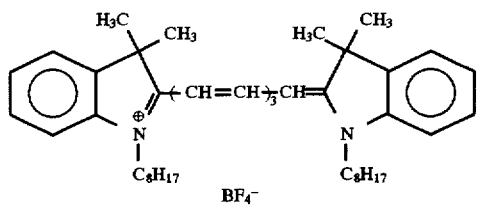

Reducing Agent (2):

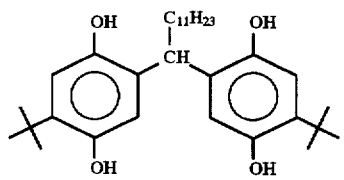

High Boiling Point Solvent (4):
(the same compound as Antiseptic (2))

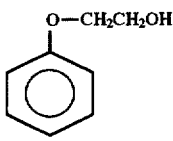

Using the above-described compounds and additives, Light-Sensitive Material K301 shown in Tables 34 and 35 was prepared.

TABLE 34

Main Material Structure of Heat-Developable Light-Sensitive Material 100

| Layer No. | Name of Layer | Additives | Coated Amount (mg/m2) |
|---|---|---|---|
| Seventh Layer | Protective Layer | Acid-processed gelatin | 442 |
| | | Reducing Agent (2) | 47 |
| | | High Boiling Point Solvent (1) | 30 |
| | | Colloid silver grains | 2 |
| | | Matting agent (PMMA resin) | 17 |
| | | Surfactant (2) | 16 |
| | | Surfactant (1) | 9 |
| | | Surfactant (3) | 2 |

TABLE 34-continued

Main Material Structure of Heat-Developable Light-Sensitive Material 100

| Layer No. | Name of Layer | Additives | | Coated Amount (mg/m2) |
|---|---|---|---|---|
| Sixth Layer | Interlayer | Lime-processed gelatin | | 862 |
| | | Zinc hydroxide | | 480 |
| | | Water-soluble Polymer (1) | | 4 |
| | | Surfactant (2) | | 0.4 |
| | | Calcium nitrate | | 14 |
| Fifth Layer | Red-Sensitive Layer | Lime-processed gelatin | | 452 |
| | | Light-Sensitive Silver Halide Emulsion (1) | as Ag | 301 |
| | | Magenta Dye Donating Compound (1) | | 441 |
| | | High Boiling Point Solvent (2) | | 221 |
| | | Reducing Agent (1) | | 6 |
| | | Antifoggant (4) | | 20 |
| | | Surfactant (1) | | 0.3 |
| | | Water-Soluble Polymer (1) | | 11 |
| Fourth Layer | Interlayer | Lime-processed gelatin | | 485 |
| | | Zinc hydroxide | | 270 |
| | | Water-Soluble Polymer (1) | | 2 |
| | | Surfactant (2) | | 0.3 |
| | | Calcium nitrate | | 8 |
| Third Layer | Second Infrared-Sensitive Layer | Lime-processed gelatin | | 373 |
| | | Light-Sensitive Silver Halide Emulsion (2) | as Ag | 106 |
| | | Stabilizer (1) | | 9 |
| | | Cyan Dye Donating Compound (2) | | 233 |
| | | Cyan Dye Donating Compound (1) | | 159 |
| | | Dye (a) | | 10 |
| | | High Boiling Point Solvent (1) | | 101 |
| | | High Boiling Point Solvent (2) | | 108 |
| | | High Boiling Point Solvent (3) | | 27 |
| | | Reducing Agent (1) | | 22 |
| | | Antifoggant (3) | | 4 |
| | | Surfactant (1) | | 0.9 |
| | | Carboxymethyl cellulose | | 5 |
| | | Water-Soluble Polymer (1) | | 11 |
| Second Layer | Interlayer | Lime-processed gelatin | | 438 |
| | | Surfactant (2) | | 4 |
| | | Surfactant (4) | | 123 |
| | | Water-Soluble Polymer (1) | | 26 |
| | | Antifoggant (5) | | 6 |
| | | Calcium nitrate | | 8 |
| First Layer | First Infrared-Sensitive Layer | Lime-processed gelatin | | 587 |
| | | Light-Sensitive Silver Halide Emulsion (3) | as Ag | 311 |
| | | Stabilizer (1) | | 8 |
| | | Yellow Dye Donating Compound (1) | | 504 |
| | | Sensitizing bye (4) | | 0.1 |
| | | Dye (a) | | 44 |
| | | High-Boiling Point Solvent (1) | | 252 |
| | | Reducing Agent (1) | | 35 |
| | | Antifoggant (3) | | 4 |
| | | Surfactant (1) | | 32 |
| | | Water-Soluble Polymer (1) | | 46 |
| | | Hardening Agent (1) | | 45 |
| Support | | Polyethylene-laminated paper support (thickness: 131 μm) | | |

Note: Trace additives such as an antiseptic were omitted in the Tables above.

Surfactant (2):

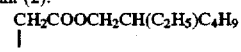

$$NaO_3S-CHCOOCH_2CH(C_2H_5)C_4H_9$$

Surfactant (3):

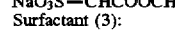

$$C_3H_7$$

Surfactant (4):

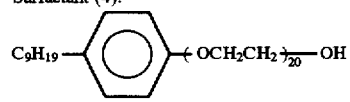

TABLE 34-continued

Main Material Structure of Heat-Developable Light-Sensitive Material 100

| Layer No. | Name of Layer | Additives | Coated Amount (mg/m2) |
|---|---|---|---|

Water-Soluble Polymer (1):

Limiting viscosity number
[η] = 1.6 (0.1N NaCl, 30° C.)
Molecular weight ≈ 1,000,000

Sensitizing Dye (4):

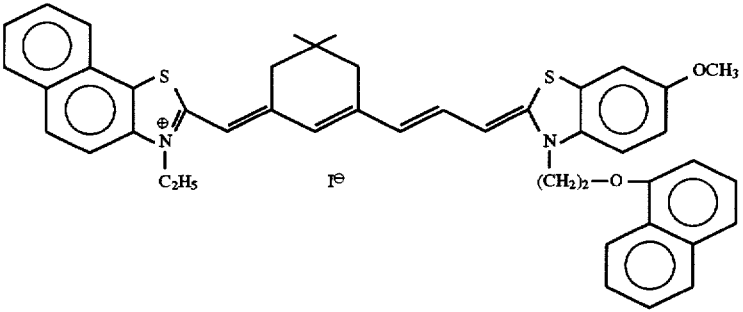

Antifoggant (5):

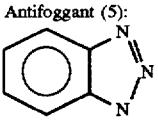

Hardening Agent (1):
$CH_2=CHSO_2CH_2SO_2CH=CH_2$

Light-Sensitive Materials K302 to K307 were prepared thoroughly in the same manner as Light-Sensitive Material K301 except for using a dye donating compound which releases a dye of the present invention, as a magenta dye donating compound in the fifth layer.

TABLE 35

| Light-Sensitive Material | Dye Donating Compound | Remarks |
|---|---|---|
| K301 | Magenta Dye Donating Compound (1) | Comparison |
| K302 | Compound 48 | Invention |
| K303 | Compound 49 | Invention |
| K304 | Compound 50 | Invention |
| K305 | Compound 53 | Invention |
| K306 | Compound 54 | Invention |
| K307 | Compound 55 | Invention |

A self-contained calibration pattern was output using each of Light-Sensitive Materials K-301 to 307, and Image-Receiving Material R101 by means of Digital Color Printer Pictrography 3000 manufactured by Fuji Photo Film Co., Ltd. Each color image obtained was examined in the same manner as in Example 1 and almost the same results as in Example 1 were obtained. The results obtained are shown in Table 36.

TABLE 36

| Light-Sensitive Material | Density Immediately After Image Formation Magenta in Monochromatic Area | Density after 10 Days | | Remarks |
|---|---|---|---|---|
| | | Aging under Irradiation of Xe Light | Aging under High Temperature and High Humidity (80° C.–70% RH) | |
| K301 | 1.20 | 0.88 | 1.04 | Comparison |
| K302 | 1.22 | 1.05 | 1.10 | Invention |
| K303 | 1.17 | 1.00 | 1.06 | Invention |
| K304 | 1.25 | 1.04 | 1.17 | Invention |
| K305 | 1.24 | 1.03 | 1.11 | Invention |
| K306 | 1.20 | 0.91 | 0.98 | Invention |
| K307 | 1.22 | 0.90 | 1.03 | Invention |

EXAMPLE 4

Comparative Light-Sensitive Material 401 was prepared by coating layers on a 150 μm-thick transparent polyethylene terephthalate film support to have a layer structure shown in Table 37.

TABLE 37

Structure of Comparative Light-Sensitive Element 401

| Layer No. | Name of Layer | Additives | Coated Amount (g/m$^2$) |
|---|---|---|---|
| 24th Layer | Protective Layer | Gelatin | 0.26 |
| | | Additive (1) | 0.08 |
| | | Matting Agent (1) | 0.05 |
| | | Hardening Agent (1) | 0.07 |
| 23rd Layer | Ultra-violet-absorbing Layer | Gelatin | 0.48 |
| | | Ultraviolet Absorbent (1) | 0.09 |
| | | Ultraviolet Absorbent (2) | 0.08 |
| | | Additive (3) | 0.08 |
| 22nd Layer | Blue-Sensitive Layer (high sensitive) | Internal Latent Image-Type Direct Positive Emulsion: A | as Ag 0.67 |
| | | Sensitizing Dye (4) | $1.4 \times 10^{-3}$ |
| | | Sensitizing Dye (5) | $3.6 \times 10^{-4}$ |
| | | Nucleating Agent (1) | $8.9 \times 10^{-6}$ |
| | | Additive (2) | $4.1 \times 10^{-2}$ |
| | | Additive (4) | $1.1 \times 10^{-3}$ |
| | | Additive (5) | $7.0 \times 10^{-6}$ |
| | | Gelatin | 1.00 |
| 21st Layer | Blue-Sensitive Layer (medium sensitive) | Internal Latent Image-Type Direct Positive Emulsion: B | as Ag 0.11 |
| | | Sensitizing Dye (4) | $3.3 \times 10^{-4}$ |
| | | Sensitizing Dye (5) | $8.5 \times 10^{-5}$ |
| | | Nucleating-Agent (1) | $2.0 \times 10^{-6}$ |
| | | Additive (2) | $9.2 \times 10^{-3}$ |
| | | Additive (4) | $2.4 \times 10^{-4}$ |
| | | Additive (5) | $1.7 \times 10^{-6}$ |
| | | Gelatin | 0.20 |
| 20th Layer | Blue-Sensitive Layer (low sensitive) | Internal Latent Image-Type Direct Positive Emulsion: C | as Ag 0.18 |
| | | Sensitizing Dye (4) | $3.3 \times 10^{-4}$ |
| | | Sensitizing Dye (5) | $1.5 \times 10^{-4}$ |
| | | Nucleating Agent (1) | $7.8 \times 10^{-6}$ |
| | | Additive (2) | $2.0 \times 10^{-6}$ |
| | | Additive (4) | $2.7 \times 10^{-4}$ |
| | | Additive (5) | $2.4 \times 10^{-6}$ |
| | | Gelatin | 0.43 |
| 19th Layer | White Reflecting Layer | Titanium dioxide | 1.10 |
| | | Additive-(1) | $2.5 \times 10^{-2}$ |
| | | Gelatin | 0.32 |
| 18th Layer | Yellow Coloring Material Layer | Yellow Dye Releasing Compound (1) | 0.47 |
| | | High Boiling Point Organic Solvent (1) | $9.4 \times 10^{-2}$ |
| | | Gelatin | 0.42 |
| 17th Layer | Interlayer | Gelatin | 0.23 |
| 16th Layer | Color Mixing Inhibiting Layer | Additive (1) | 0.90 |
| | | Polymethyl methacrylate | 0.25 |
| | | Gelatin | 0.51 |
| 15th Layer | Green-Sensitive Layer (high sensitive) | Internal Latent Image-Type Direct Positive Emulsion: D | as Ag 0.60 |
| | | Sensitizing Dye (2) | $1.3 \times 10^{-3}$ |
| | | Sensitizing Dye (3) | $1.1 \times 10^{-3}$ |
| | | Nucleating Agent (1) | $2.7 \times 10^{-6}$ |
| | | Additive (2) | $5.7 \times 10^{-2}$ |
| | | Additive (4) | $2.8 \times 10^{-3}$ |
| | | Additive (5) | $6.0 \times 10^{-6}$ |
| | | Gelatin | 1.14 |
| 14th Layer | Green-Sensitive Layer (medium sensitive) | Internal Latent Image-Type Direct Positive Emulsion: E | as Ag 0.09 |
| | | Sensitizing Dye (2) | $9.0 \times 10^{-5}$ |
| | | Sensitizing Dye (3) | $7.0 \times 10^{-5}$ |
| | | Nucleating Agent (1) | $1.6 \times 10^{-6}$ |
| | | Additive (2) | $1.9 \times 10^{-2}$ |
| | | Additive (4) | $2.4 \times 10^{-4}$ |
| | | Gelatin | 0.19 |
| 13th Layer | Green-Sensitive Layer (low sensitive) | Internal Latent Image-Type Direct Positive Emulsion: F | as Ag 0.11 |
| | | Sensitizing Dye (2) | $7.0 \times 10^{-5}$ |
| | | Sensitizing Dye (3) | $5.0 \times 10^{-5}$ |
| | | Nucleating Agent (1) | $1.3 \times 10^{-6}$ |
| | | Additive (2) | $2.3 \times 10^{-2}$ |
| | | Additive (4) | $2.3 \times 10^{-4}$ |
| | | Gelatin | 0.18 |
| 12th Layer | White Reflecting Layer | Titanium dioxide | 1.20 |
| | | Additive (1) | $4.8 \times 10^{-2}$ |
| | | Additive (3) | $2.7 \times 10^{-2}$ |
| | | Gelatin | 0.36 |
| 11th Layer | Magenta Coloring Material Layer | Magenta Dye releasing Compound (1) | 0.33 |
| | | Additive (1) | $1.6 \times 10^{-4}$ |
| | | Gelatin | 0.19 |
| 10th Layer | Interlayer | Gelatin | 0.29 |
| 9th Layer | Color Mixing Inhibiting Layer | Additive (1) | 1.70 |
| | | Polymethyl methacrylate | 0.43 |
| | | Gelatin | 0.86 |
| 8th Layer | Red-Sensitive Layer (high sensitive) | Internal Latent Image-Type Direct Positive Emulsion: G | as Ag 0.52 |
| | | Additive (6) | $1.2 \times 10^{-4}$ |
| | | Sensitizing Dye (1) | $6.4 \times 10^{-4}$ |
| | | Nucleating Agent (1) | $3.5 \times 10^{-6}$ |
| | | Additive (2) | $3.9 \times 10^{-2}$ |
| | | Additive (4) | $2.8 \times 10^{-3}$ |
| | | Gelatin | 0.52 |
| 7th Layer | Red-Sensitive Layer (medium sensitive) | Internal Latent Iimage-Type Direct Positive Emulsion: H | as Ag 0.15 |
| | | Sensitizing Dye (1) | $2.3 \times 10^{-4}$ |
| | | Nucleating Agent (1) | $2.1 \times 10^{-5}$ |
| | | Additive (2) | $2.5 \times 10^{-2}$ |
| | | Additive (4) | $7.9 \times 10^{-4}$ |
| | | Gelatin | 0.62 |
| 6th Layer | Red-Sensitive Layer (low sensitive) | Internal Latent Image-Type Direct Positive Emulsion: I | as Ag 0.12 |
| | | Sensitizing Dye (1) | $2.9 \times 10^{-4}$ |
| | | Nucleating Agent (I) | $2.1 \times 10^{-5}$ |
| | | Additive (2) | $2.0 \times 10^{-2}$ |
| | | Additive (4) | $6.5 \times 10^{-4}$ |
| | | Gelatin | 0.51 |
| 5th Layer | White Reflecting Layer | Titanium Dioxide | 3.40 |
| | | Gelatin | 0.84 |
| 4th Layer | Cyan Coloring Material Layer | Cyan Dye Releasing Compound (1) | 0.36 |
| | | High Boiling Point Organic Solvent (1) | $3.0 \times 10^{-2}$ |
| | | Additive (2) | $3.0 \times 10^{-2}$ |
| | | Gelatin | 0.4 |
| 3rd Layer | Opaque Layer | Carbon black | 1.70 |
| | | Gelatin | 1.70 |
| 2nd Layer | White Reflecting Layer | Titanium Dioxide | 22.00 |
| | | Gelatin | 2.75 |
| 1st Layer | Image-Receiving Layer | Polymer mordant (1) | 3.00 |
| | | Gelatin | 3.00 |
| Support (polyethylene terephthalate, 120 μm) | | | |

TABLE 38

| Name of Emulsion | Halogen Composition | Core/Shell Ratio | Average Grain Size (μm)[*1] |
|---|---|---|---|
| Emulsion A | $AgBr_{100}$ | 1/5 | 1.40 |
| Emulsion B | $AgBr_{100}$ | 1/20 | 1.10 |
| Emulsion C | $AgBr_{100}$ | 1/11 | 0.83 |
| Emulsion D[*2] | $AgBr_{100}$ | 1/5 | 1.40 |
| Emulsion E | $AgBr_{100}$ | 1/20 | 1.00 |
| Emulsion F | $AgBr_{100}$ | 1/5 | 0.83 |
| Emulsion G | $AgBr_{100}$ | 1/5 | 1.40 |
| Emulsion H | $AgBr_{100}$ | 1/5 | 1.00 |
| Emulsion I | $AgBr_{100}$ | 1/10 | 0.56 |

Characteristic Values of Emulsions

[*1] sphere-corresponding diameter
[*2] aspect ratio = 6.34 (average grain diameter/average grain thickness)

Nucleating Agent (1):

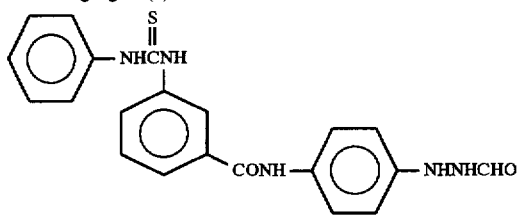

Sensitizing Dye (1):

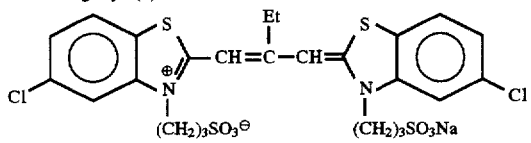

Sensitizing Dye (2):

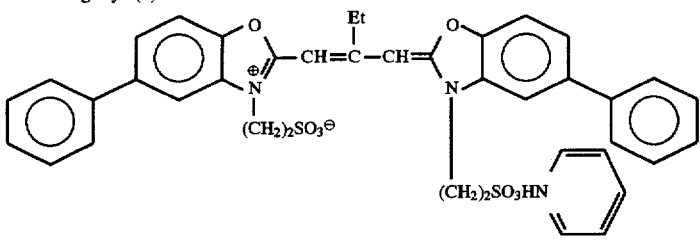

Sensitizing Dye (3):

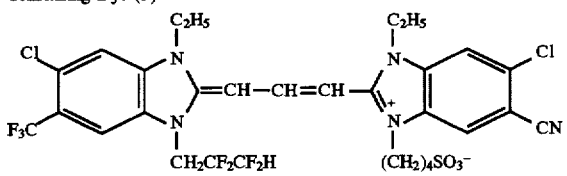

Yellow Dye Releasing Compound (1):

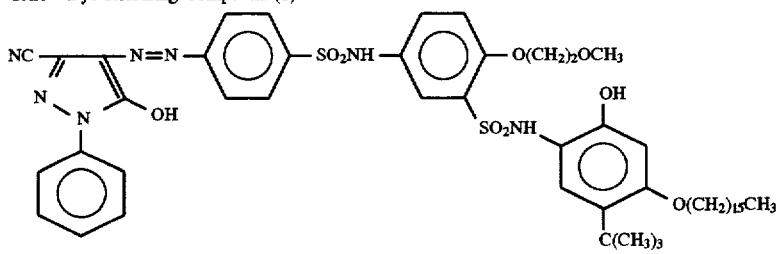

TABLE 38-continued
Additive (1):
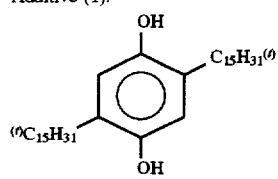
Additive (2):
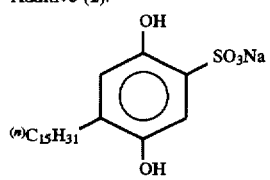
Additive (3):
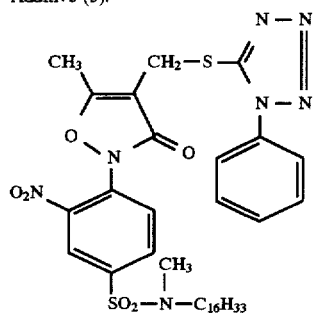
Additive (4):
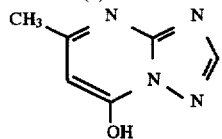
Additive (5)
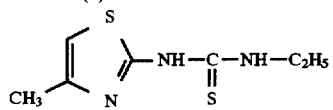
Additive (6)
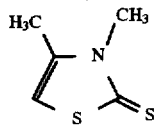
High Boiling Organic Solvent (1):
Tricyclohexyl phosphate
Hardening Agent (1):
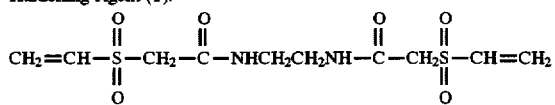
Sensitizing Dye (4):
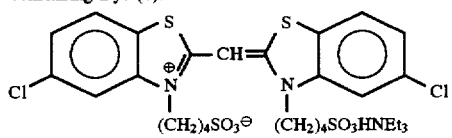

TABLE 38-continued
Sensitizing Dye (5):
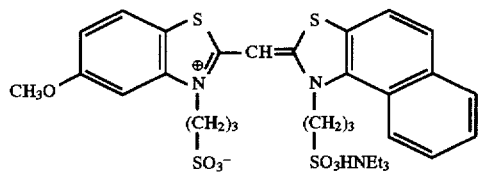
Cyan Dye Releasing Compound (1):
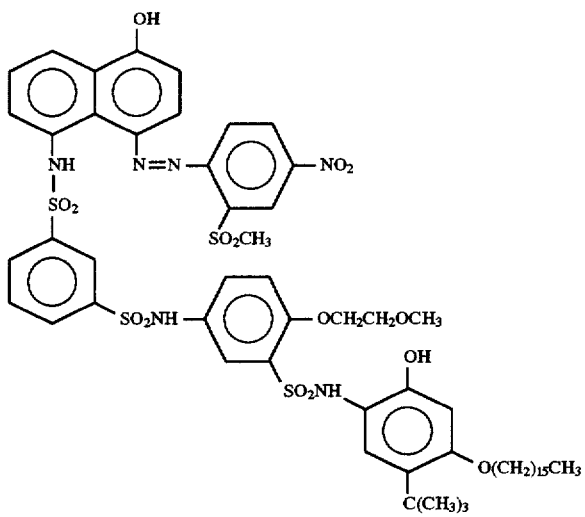
Magenta Dye Releasing Compound (1):
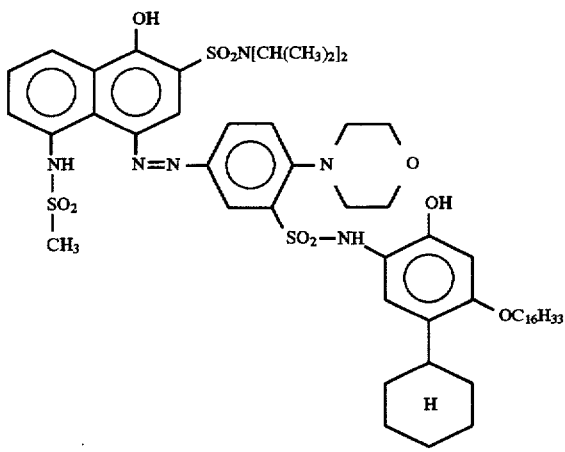
Polymer Mordant (1):
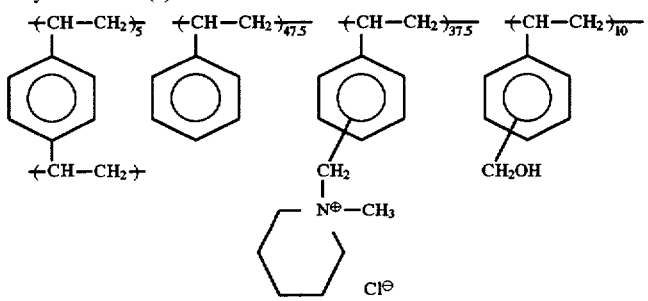

TABLE 38-continued

Ultraviolet Absorbent (1):

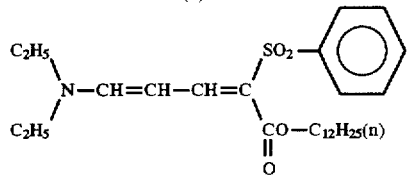

Ultraviolet Absorbent (2):

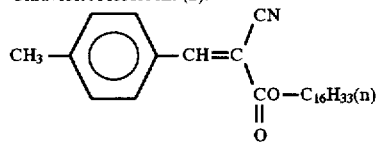

Matting Agent (1):
Polymethyl methacrylate spherical latex
(average particle size: 4 μm)

Light-sensitive materials were prepared in the same manner except for replacing Magenta Dye Releasing Compound (1) of the eleventh layer (magenta dye releasing layer) by the respective compounds shown in Table 39.

TABLE 39

| Light-Sensitive Material | Dye Donating Compound | Remarks |
|---|---|---|
| K401 | Compound 51 | Comparison |
| K402 | Compound 53 | Invention |
| K403 | Compound 55 | Invention |
| K404 | Compound 56 | Invention |
| K405 | Compound 58 | Invention |

A cover sheet was prepared as follows.

The following layers were coated on a polyethylene terephthalate transparent support subbed-with gelatin and containing a light piping preventing dye:

(1) a neutralization layer containing 10.4 g/m² of an acrylic acid/butyl acrylate (molar ratio: 8:2) copolymer having an average molecular weight of 50,000 and 0.1 g/m² of 1,4-bis(2,3-epoxypropoxy)butane;

(2) a neutralization timing layer containing 4.3 g/m² of acetyl cellulose having an acetylation degree of 51% and 0.2 g/m² of poly(methyl vinyl ether-co-monomethyl maleate); and (3) a layer containing a 6:4 (as a solid content ratio) blend of a polymer latex obtained by emulsion polymerizing styrene/butyl acrylate/acrylic acid/N-methylolacrylamide at a weight ratio of 49.7:42.3:4:4, with a polymer latex obtained by emulsion polymerizing methyl methacrylate/acrylic acid/N-methylolacrylamide at a weight ratio of 93:3:4, and having a total solid content of 1.0 g/m².

Formulation of an alkali processing composition is shown below.

The processing solution (0.8 g) having the following composition was packed in a rupturable container.

| | |
|---|---|
| 1-p-Tolyl-4-hydroxymethyl-4-methyl-3-pyrazolidone | 10.0 g |
| Methyl hydroquinone | 0.18 g |

-continued

| | |
|---|---|
| 5-Methylbenzotriazole | 3.0 g |
| Sodium sulfite (anhydrous) | 0.2 g |
| Benzyl alcohol | 1.5 ml |
| Carboxymethyl cellulose Na salt | 58 g |
| Carbon black | 150 g |
| Potassium hydroxide (28% aqueous solution) | 200 ml |
| Water | 680 ml |

The processing solution having the above-described composition was packed in a "container rupturable by pressure" in an amount of 0.8 g to every container.

Each of the above-described light-sensitive materials was exposed through a gray filter from the emulsion layer side and superposed on the cover sheet prepared above, and the processing solution prepared above was developed between two materials by means of a pressure roller at 25° C. to have a thickness of 75 μm.

Evaluation of fastness to light, humidity and heat was performed in the same manner as in Example 1 and as a result, in the case of using the compound of the present invention, a magenta image having high fastness to light, humidity and heat could be obtained as compared with comparative examples.

While the invention has been described in detail and with reference to specific embodiments thereof, it will be apparent to one skilled in the art that various changes and modifications can be made therein without departing from the spirit and scope thereof.

What is claimed is:

1. A color light-sensitive material comprising a support having thereon a silver halide emulsion layer and at least one layer containing at least one image forming compound represented by the following formula (2):

$$(Dye-X)_q—Y \qquad (2)$$

wherein Dye represents a dye moiety containing one or more 4-(5-pyrazolylazo)phenol dyes represented by formula (1) or precursors thereof; X represents a bond or linking group which is dissociated corresponding to or inversely corresponding to the development of the color light-sensitive material; Y represented a group having a property of causing difference in the diffusibility of dye components corresponding to or inversely corresponding to the reaction of a light-sensitive silver salt having imagewise a latent image;

Dye bonds to X at the position of at least one of $R^1$, $R^2$, $R^3$, $R^4$, $R^5$ and $R^6$ in formula (1); q represents 1 or 2; and when q is 2, the Dye-X groups may be the same or different: formula (1):

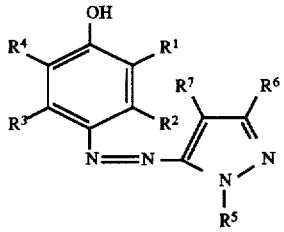
(1)

wherein $R^1$, $R^2$, $R^3$ and $R^4$ each independently represents a hydrogen atom, a cyano group, a carboxyl group, a sulfo group, a nitro group, a halogen atom, an alkyl group, an aryl group, a heterocyclic group, an acyl group, a sulfonyl group, an alkoxy group, an aryloxy group, a heterocyclic oxy group, a silyloxy group, an alkylthio group, an arylthio group, a heterocyclic thio group, a carbamoyl group, a sulfamoyl group, an acylamino group, a sulfonylamino group, an alkoxycarbonylamino group, an aryloxycarbonylamino group, an alkoxycarbonyloxy group, a ureido group, a carbamoyloxy group, a sulfamoylamino group, an amino group, an alkoxycarbonyl group, an aryloxycarbonyl group, an acyloxy group, an aryloxycarbonyloxy group or a sulfonyloxy group; $R^3$ and $R^4$ may be combined to form a ring structure; $R^5$ represents a hydrogen atom, an alkyl group, an aryl group or a heterocyclic group; $R^6$ represents a group defined for $R^5$, a cyano group or an alkylthio group; and $R^7$ represents a cyano group, a nitro group, an alkoxycarbonyl group or a carbamoyl group.

2. A color light-sensitive material as claimed in claim 1, wherein $R^1$, $R^2$, $R^3$ and $R^4$ each independently represents a hydrogen atom, a halogen atom, an alkyl group, a cyano group, an alkoxy group, a carbamoyl group, a sulfamoyl group, an acylamino group, a ureido group or an alkoxycarbonyl group.

3. A color light-sensitive material as claimed in claim 1, wherein $R^5$ represents an alkyl group or a phenyl group.

4. A color light-sensitive material as claimed in claim 1, wherein $R^6$ represents a hydrogen atom or an alkyl group.

5. A color light-sensitive material as claimed in claim 1, wherein $R^7$ represents a cyano group.

6. A color light-sensitive material as claimed in claim 1, wherein Dye in formula (2) is represented by the following formula (3):

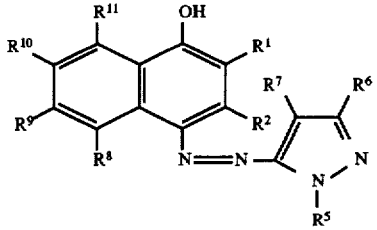
(3)

wherein $R^1$, $R^2$, $R^5$, $R^6$ and $R^7$ are as defined above for formula (1); and $R^8$, $R^9$, $R^{10}$ and $R^{12}$ have the same meaning as defined for $R^1$ in formula (1).

7. A color light-sensitive material as claimed in claim 1, wherein Dye in formula (2) is represented by the following formula (4):

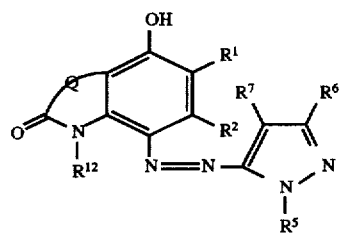
(4)

wherein $R^1$, $R^2$, $R^5$, $R^6$ and $R^7$ are as defined above for formula (1); $R^{12}$ represents a hydrogen atom or an alkyl group having 12 or less carbon atoms; and Q represents an atomic group necessary for forming a 5-, 6- or 7-membered ring.

* * * * *